United States Patent [19]
Nishiura et al.

[11] Patent Number: 5,455,676
[45] Date of Patent: Oct. 3, 1995

[54] METHOD OF DETECTING A SIGNAL AND MODULATION COEFFICIENT OF A PHASE-MODULATED FIBER-OPTIC GYROSCOPE BASED ON A DIFFERENCE IN THE DURATION OF MULTIPLE SUBWAVES IN A MODULATION PERIOD

[75] Inventors: Yozo Nishiura; Yasuhiko Nishi, both of Osaka, Japan

[73] Assignee: Sumitomo Electric Industries, Ltd., Osaka, Japan

[21] Appl. No.: 201,459

[22] Filed: Feb. 24, 1994

[30] Foreign Application Priority Data

Feb. 24, 1993 [JP] Japan .................................. 5-061169
Jan. 10, 1994 [JP] Japan .................................. 6-013145

[51] Int. Cl.$^6$ .................................................. G01C 19/72
[52] U.S. Cl. .................................................. 356/350
[58] Field of Search .................................. 356/350

[56] References Cited

U.S. PATENT DOCUMENTS 4,779,975 10/1988 Kim ........................................ 356/350
4,869,592 9/1989 Bergh ..................................... 356/350

FOREIGN PATENT DOCUMENTS

| 6078314 | 5/1985 | Japan . | |
|---|---|---|---|
| 60-135816 | 7/1985 | Japan . | |
| 61-117410 | 6/1986 | Japan . | |
| 61-124817 | 6/1986 | Japan . | |
| 61-147106 | 7/1986 | Japan . | |
| 61-284607 | 12/1986 | Japan | 356/350 |
| 62-080512 | 4/1987 | Japan . | |
| 62-212514 | 9/1987 | Japan | 356/350 |
| 63-138208 | 6/1988 | Japan . | |
| 3118415 | 5/1991 | Japan | 356/350 |

*Primary Examiner*—Samuel A. Turner
*Attorney, Agent, or Firm*—Cushman Darby & Cushman

[57] ABSTRACT

An AC component of the photodetector includes two quasi-sine waves in a cycle of phase-modulation. $T_1$ and $T_2$ are time lengths of the quasi-sine waves. When a fiber coil is rotating, $T_1$ differs from $T_2$. The difference between $T_1$ and $T_2$ is in proportion to an angular velocity of the fiber coil. This invention obtains the angular velocity by measuring time durations $T_1$, $T_2$ or both $T_1$ and $T_2$. Zero-crossing detection defines the moments of the beginning and the end of $T_1$ and $T_2$. Since this gyroscope depends on the measurement of time lengths, it is fully immune from the fluctuation of light power due to the light source, or the fluctuation of the gain in the electric circuit.

19 Claims, 28 Drawing Sheets

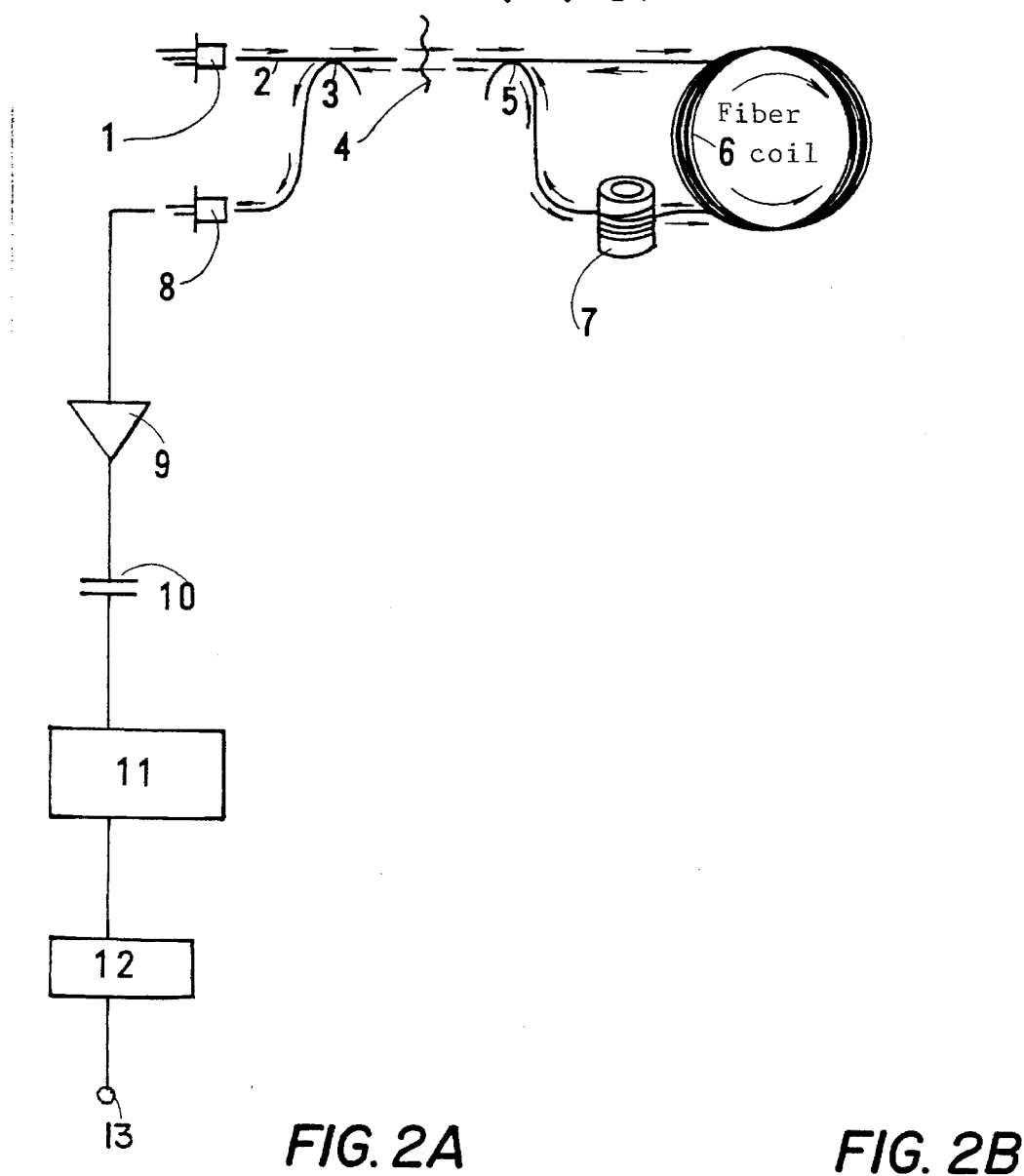
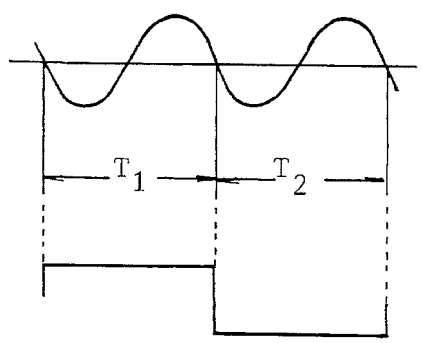
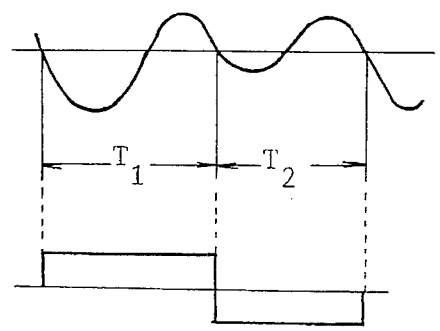

{ —— Δθ = 0
------ Δθ = 0.2 radian

{ ------ Δθ = 0.2 radian
—·—· Δθ = 0.1 radian
—— Δθ = 0
— — Δθ = -0.1 radian
—··— Δθ = -0.2 radian $T_1 = T_3 + T_4$
$T_2 = T_5 + T_6$ —— $\Delta\theta = 0$
------ $\Delta\theta = 0.2$ radian

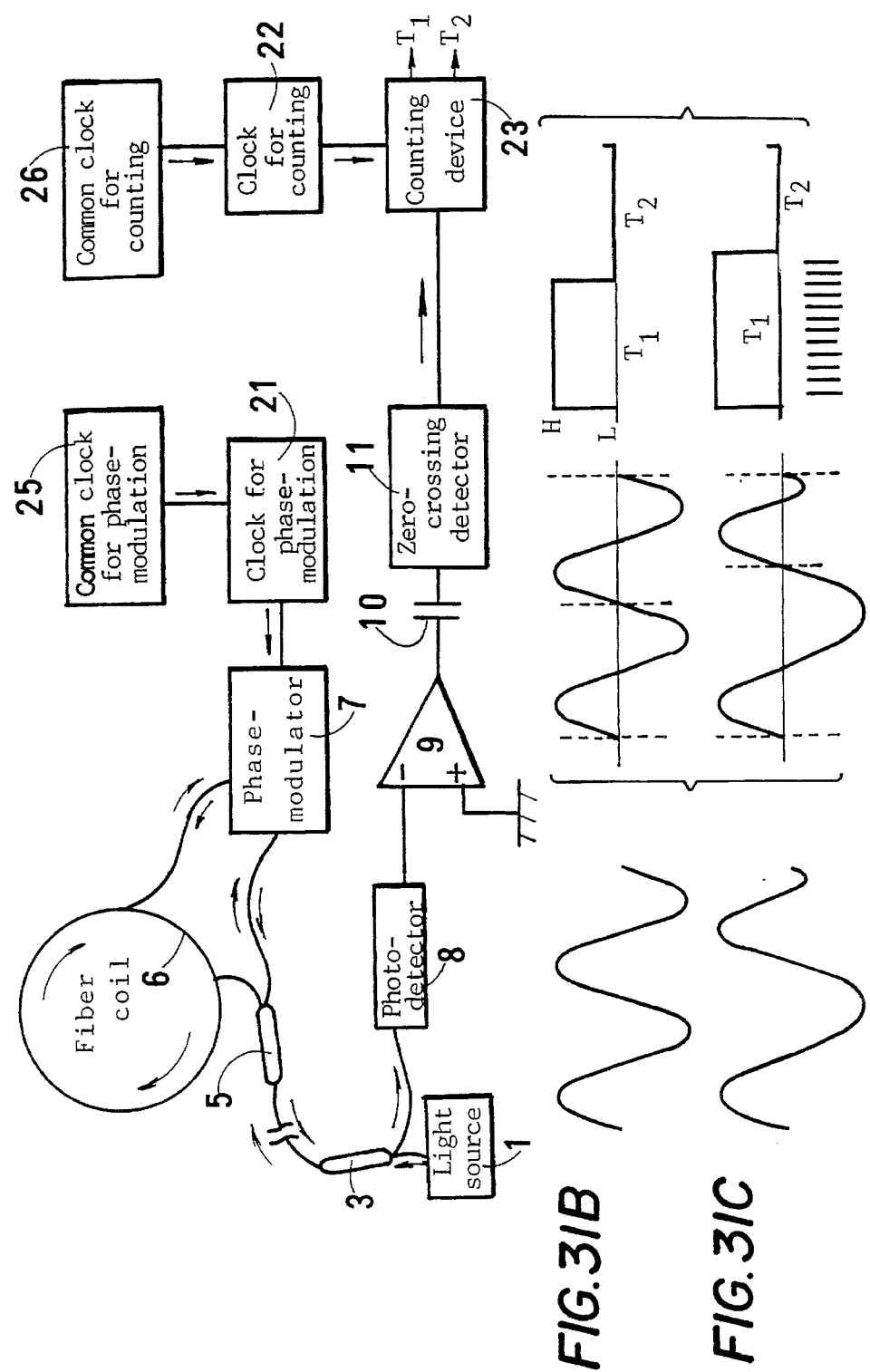

METHOD OF DETECTING A SIGNAL AND MODULATION COEFFICIENT OF A PHASE-MODULATED FIBER-OPTIC GYROSCOPE BASED ON A DIFFERENCE IN THE DURATION OF MULTIPLE SUBWAVES IN A MODULATION PERIOD

FIELD OF THE INVENTION

This invention relates to a new method of deducing an angular velocity signal of a phase-modulated fiber-optic gyroscope. A fiber-optic gyroscope obtains an angular velocity by dividing light beams emitted from a light source in halves, introducing the divided beams to both ends of a fiber coil, propagating the light beams clockwise and counterclockwise in the fiber coil, letting the clockwise beams and the counterclockwise beams interfere, measuring the intensity of the interfering beams by a photodiode and detecting a phase difference of the clockwise beams and counterclockwise beams. The angular velocity of the fiber coil is in proportion to the phase difference. The angular velocity is obtained from the phase difference $\Delta\theta$ between the clockwise waves (CW) and the counterclockwise (CCW) waves.

Without modulation, a small phase difference were not sensitively measured and the sign (positive or negative) of the phase difference could not be determined, because the phase difference was included in the form of $\cos \Delta\theta$ in the output signal of a photodetector. Thus, some form of modulation is applied to the light waves spreading in a fiber path. For example, phase-modulation, frequency modulation and phase shift modulation.

BACKGROUND OF THE INVENTION

This application claims the priority of Japanese Patent Applications No. 61169/1993 filed Feb. 24, 1993 and No. 13145/1994 filed Jan. 10, 1994, which are incorporated herein by reference.

This invention relates to a new method for detecting the phase difference $\Delta\theta$ from a phase-modulated gyroscope. Thus, a phase-modulated gyroscope will be now explained by FIG. 11. A light source 111 emits light beams. The light beams ( waves ) enter an end of a single-mode fiber, pass through a first coupler and attain a polarizer P. The light waves are converted into linearly-polarized waves. The polarized waves are divided into halves by a second coupler. The divided waves are introduced to two ends of a fiber coil 112 of a single-mode fiber wound a plurality of turns around a bobbin. The divided, 5partial waves propagate clockwise and counterclockwise in the fiber coil. No phase difference occurs between the clockwise spreading waves and the counterclockwise spreading waves, when the fiber coil is at rest.

However, when the fiber coil rotates, some phase difference occurs between the clockwise waves and the counterclockwise waves in proportion to the angular velocity of the fiber coil. The coupler combines the once divided clockwise and counterclockwise waves together. The combined waves pass reversely through the polarizer P and through the first coupler. Then the waves reach a photodetector 113 which converts the light power into an electric signal. Synchronous detection of the output of the photodetector originates a value which is proportional to the phase difference $\Delta\theta$.

The phase of light waves must be modulated. There are some kinds of phase modulators. A phase modulator 114 is constructed by winding a part of the fiber coil around a columnar or cylindrical vibrator having electrodes. Application of alternating voltage upon the electrodes induces vibrations of the piezoelectric column or cylinder. The fiber is subjected to a periodic expansion and shrink. The expansion and contraction of the fiber changes the phase of the light waves passing in the fiber due to the optoelastic effect.

The phase modulator endows periodic changes of phase to the clockwise waves and the counterclockwise waves at different times. Thus the phase changes given by the modulator to the CW waves and CCW waves do not cancel each other at the photodetector. The periodic phase changes survive the interference of the CW and CCW waves at the photodetector.

The output of the photodetector includes a Fundamental component and all harmonies of the modulation frequency. Odd number harmonics contain the phase difference $\Delta\theta$ in the form of $\sin \Delta\theta$. Even number harmonies include the same phase difference $\Delta\theta$ in the form of $\cos \Delta\theta$. The coefficients of the n-th order harmonies are the n-th order Bessel function of $\xi$, i.e. the phase modulation depth.

The phase modulation method of a fiber-optic gyroscope gives the electric field $E_R(t)$ of the clockwise-propagation waves and $E_L(t)$ of the counterclockwise-propagation waves as follows;

$$E_R(t) = E_R \sin\{\omega t = b \sin(\omega t - \phi/2) + \Delta\theta/2\} \quad (1)$$

$$E_L(t) = E_L \sin\}\omega t = b \sin(\omega t - \phi/2) - \Delta\theta/2\} \quad (2)$$

where $E_R$ and $E_L$ are amplitudes of the clockwise light waves and the counterclockwise light waves, $\Omega$ is the angular frequency of the phase modulation, $\omega$ is the angular frequency of the light, $\Delta\theta$ is Sagnac phase difference in proportion to the rotation of the fiber coil. "5426 " is the phase difference induced from the time difference $\tau$ of passing through the phase-modulator between the clockwise and counterclockwise waves.

$$\phi = \Omega\tau \quad (3)$$

$$\tau = n\ L/c \quad (4)$$

Sagnac phase difference is given by $$\Delta\theta = 4\pi L\ a\Omega c/(c\ \lambda) \quad (5)$$

Since the phase-modulator is placed at an end of the fiber coil, $\tau$ is equal to the time for light to pass through the fiber coil. "n" is the refractive index of the core of the fiber, and "L" is the length of the optical fiber of the fiber coil. "c" is the velocity of light in vacuum. $\Omega$ c is the angular velocity of the fiber coil, i.e. the object of the measurement.

The photodetector makes the CW waves and CCW waves interfere with each other and detects the intensity of the interfering Waves by converting the light power into an electric signal. Namely the output of the photodetector is the square of the sum of the CW waves and CCW waves. However, the light frequency $\omega$ is too high for the photodetector to detect it. Thus, the output of the photodetector gives a time average of the square of the sum regarding $\omega$. The output signal I(t) of the photodetector is given by the square of the sum of the electric fields of the CW and CCW waves.

$$I(t) = |E_R + E_L|^2 \quad (6)$$

Substituting Eq.(1) and Eq.(2) into Eq.(6), we obtain $$I(t) = |(E_R^2 + E_L^2)/2 + 2E_R E_L \sin\{\omega t + b \sin(\Omega t + \phi/2) + \Delta\theta/2\} \sin\{\omega t + b$$

$$\sin(\omega t-(\emptyset/2))-\Delta\theta/2\}] \quad (7)$$

From the product-to-sum formula of sine function and the omission of high frequency vibration of light waves, the output of the photodetector becomes $$I(t)=(E_R^2+E_L^2)/2+E_R E_L \cos[b\{\sin(\Omega t+(\emptyset/2))-\sin(\omega t-(\emptyset/2))\}+\Delta\theta] \quad (8)$$

The sum-to-product formula of sine function changes Eq.(8) to $$E(t)=(E_R^2+E_L^2)/2+E_R E_L \cos[\{\}2b\sin(\emptyset/2)\cos(\Omega t)\}+\Delta\theta\} \quad (9)$$

The cosine law transforms Eq.(9) to $$I(t)=(E_R^2 E_L^2)/2+E_r E_L[\cos\{2b\sin(\emptyset/2)\cos(\Omega t)\}\cos\Delta\theta-\sin\{2b\sin(\emptyset/2)\cos(\Omega t)\}\sin"\theta] \quad (10)$$

Bessel functions give a series of expansion of a cosine function and a sine function including variable t in the form of cosine or sine.

$$I(t)=(E_R^2+E_L^2)/2+E_R E_L[\{J_o(\xi)+2\Sigma_{n=1}(-1)^n J_{2n}(\xi)\cos(2n\Omega t)\}\cos\Delta\theta-\{2\Sigma_{n=o}(-1)^n J_{2n+1}(\xi)\cos(2n+1)\Omega t\}\sin\Delta\theta] \quad (11)$$

The range of the order number n is from n=1 to n=∞ or from n=0 to n=∞ in the summations. Eq.(11) is a Bessel function representation of the output of the detector. The output contains a basic signal and all harmonies of the phase-modulation frequency $\Omega$. The n-th order harmonies has the n-th order Bessel function $J_n(\xi)$ as the coefficient. $\xi$ is a parameter of phase-modulation determined by the amplitude b of phase change and the phase delay ø in the fiber coil.

$$\xi=2b\sin(\emptyset/2) \quad (12)$$

Eq.(11) teaches that all harmonies of the modulation frequency are included in the output of the photodetector as a series of Bessel function expansion.

If the output is synchronously detected with a carrier of the frequency of n times as high as the modulation frequency $\Omega$, the n-th harmonies will be obtained.

I Among the components of the photodetector, the basic (fundamental) component I($\Omega$,t) with the frequency $\Omega$ is written as $$I(\Omega,t)=E_R E_L J_1(\xi)\cos(\Omega t)\sin\Delta\theta \quad (13)$$

The basic component includes $\Delta\theta$ in the form of $\sin\Delta\theta$. Synchronous detection by $\cos(\Omega t)$ results in a first order component.

$$I(\Omega,t)=E_R E_L J_1(\xi)\sin\Delta\theta \quad (14)$$

The angular velocity of the fiber coil is obtained from the basic component I($\Omega$). This is an ordinary way for measuring the angular velocity by the phase-modulation method. Synchronous detection is the most popular technique for the phase-modulation method.

However, the output of the synchronous detection (demodulation) fluctuates according to the variation of the gain of a signal processing circuit and the displacement of optics. Such factors change the basic component I($\xi$) even for the same $\Delta\theta$. The proportion constant between the basic component and the angular velocity is called a scale factor. The variation of output of the photodetector for the constant rotation is called a fluctuation of the scale factor. Since the scale factor is determined by various parameters, the scale factor fluctuates by many reasons. For example, the changes of gains of electric circuit or the displacement of optical parts induce the fluctuation of the scale factor.

The light amplitude ($E_R$ and $E_L$) is changed by a misalignment of optics, by a variation of light power at the light source or by a degradation of sensitivity of the photodetector. The amplitude b of the phase modulation is also changed by the temperature dependence of the piezoelectricity of the piezoelectric oscillator. Various reasons cause the fluctuation of the scale factor.

Some improvements have been proposed to solve the difficulty of the fluctuation of the scale factor. ① Japanese Patent Laying Open No. 60-78314 (78314/'85) ② Japanese Patent Laying Open No. 60-135816 (135816/'85) ③ Japanese Patent Laying Open No. 61-117410 (117410/'86) ④ Japanese Patent Laying Open No. 61-124817 (124817/'86) ⑤ Japanese Patent Laying Open No. 61-147106 (147106/'86) ⑥ Japanese Patent Laying Open No. 63-138208 (138208/'88)

Some calibrate the light power or the phase modulation constant by higher order harmonies of the output of the detector. Others adjust the light power or the phase modulation constant parameters for feeding the fluctuation negatively back to the light source or tile power source of the modulator. These proposals have succeeded in the purpose of suppressing the fluctuation of the scale factor to some extent. Some of them have been put into practice in optical fiber gyroscopes of automobiles. However, these methods incur drawbacks of complexity of signal processing circuits and high cost of production. Calibration or feeding back of the light power or the modulation constant causes a new ground of fluctuation of the light power or the modulation. These improvements require additional devices for reducing the newly brought fluctuation.

Other methods have been proposed so far for deducing the angular velocity by measuring the times of some signals instead of synchronous detection. ⑦ Japanese Patent Laying Open No. 61-284607 (284607/'86) ⑧ Japanese Patent laying Open No. 62-80512 (80512/'87) ⑨ Japanese Patent Laying Open No. 62-212514 (212514/'87) ⑩ Japanese Patent Laying Open No. 3-118415 (118415/'91)

Among them, ⑦ and ⑨ apply a phase-modulation of triangle waves to the light signal. The triangle waves demand a high speed phase modulation, because a triangle wave is constructed by an assembly of many sine waves of higher frequencies. A cheap piezoelectric oscillator is inappropriate for the phase modulator because of the low speed action of piezoelectricity. ⑧ and ⑩ employ the sine wave modulation. The phase modulator can be composed by a cheap piezoelectric device. However, they are perhaps annoyed with the complexity of the signal processing circuits. ⑧ divides the output of a photodetector into halves and modulates two partial outputs by two modulation signals with a phase difference of 90 degrees. Although this is a dexterous method, new problems are originated on the signal processing by the phase difference and the amplitude error between two,phase modulation signals. This drawback also plagues ⑩ which searches maximum points and minimum points. The performance for a gyroscope is deteriorated by the instability of the additional circuit for searching maximum points and minimum points. Each prior art is annoyed with inherent drawbacks.

SUMMARY OF THE INVENTION

One purpose of this invention is to provide a fiber-optic gyroscope which is immune from the problem of the instability oil the scale factor. Another purpose is to provide a fiber-optic gyroscope which is not afflicted with the fluctuation of the light power or the fluctuation of the gain of the electric circuits. Another purpose of this invention is to provide a totally new fiber-optic gyroscope based upon a new principle which measures lengths of time instead of the synchronous detection for obtaining the angular velocity.

FIG. 1 briefly shows the structure of a fiber-optic gyroscope of this invention. The configuration of optical parts is entirely as same as a conventional phase-modulation fiber-optic gyroscope. A light source (1) emits monochromatic light or quasi-monochromatic light. The light beams enter an end of an optical fiber (2). "Light beams" will often be called as "light waves", because the light meanders according to the curves of the optical fiber. "Light beams" is a synonym for "light waves". The light waves go through a first coupler (3) and a polarizer (4). The waves become linearly polarized beams. The linearly polarized beams are divided into halves by a second coupler (5). A fiber coil (6) is a sensor of angular velocity which is made by winding a single-mode fiber a plurality of times around a bobbin. The second coupler (5) combines two ends of the fiber coil (6). One half of the waves propagates clockwise in the fiber coil. The other half of the waves spreads counterclockwise in the fiber coil. The divided half waves are sometimes called a wave packet.

A phase-modulator (7) is furnished at an end of the fiber coil (6). The clockwise propagation (CW) waves and the counterclockwise propagation (CCW) waves are phase-modulated by the phase-modulator (7) at different timing. The CW waves and CCW waves meet together at the second coupler (5). Then the waves pass through the polarizer (4) and the first coupler (3). Half of the combined waves reaches a photodetector (8). The photodetector (8) lets the CW beams and CCW beams interfere with each other and transduces the light power of the interfering beams into a photocurrent. The output photocurrent includes a basic component and all harmonics of the phase modulation frequency.

An amplifier (9) converts the photocurrent to a voltage and amplifies the voltage. The signal voltage includes a DC (direct current) component and an AC (alternating current) component. A capacitor (10) shuts off the DC component. Only the AC component passes through the capacitor (10). A zero-crossing detector (11) is a device which reverses its output at the time when the input signal changes its sign at a certain time. Namely the zero-crossing detector monitors the timing when tile input signal passes at OV upward or downward. A counter (12) counts the time of zero-crossing of the input signal. The counter counts tile timing from a negative voltage to a positive voltage and the timing from a positive voltage to a negative voltage. The counter can be adjusted to convert the sign of the output signal 13 at an arbitrary time of zero-crossing. FIG. 1 indicates an example of a counter which reverses the sign at every twice inversion (N=2) of the input.

FIGS. 2A and 2B shows the wave form of the AC component passing through the capacitor (10). Upper waves are the original AC components which are the input of the zero-crossing detector (11). Lower waves are the output of the zero-crossing detector (11). The time length of the waves is one period $T_o$ of the phase modulation frequency fm=$\Omega$/$2\pi$ (T=$2\pi$/$\Omega$). A period $T_o$ includes two waves. The zero-crossing detector (11) changes twice the output. Two time durations $T_1$ and $T_2$ can be defined by the zero-crossing detector (1). The first term $T_1$ is expressed by a positive value of the zero-crossing detector. The second term $T_2$ is expressed by a negative value. $T_1$ is a front half of a period $T_o$. $T_2$ is a rear half of a period $T_o$. $T_1$+$T_2$=$T_o$. At rest, $T_1$−$T_2$=0.

If the fiber coil is at rest, $T_1$=$T_2$(FIG. 2A). The wave form of $T_1$ subwave is the same as that of $T_2$ subwave. The waves are symmetric. But the waves are not sine waves.

If the fiber coil is rotating, the waves are distorted (FIG. 2B). The first duration time $T_1$ is no more equal to the second duration time $T_2$. $T_1 \neq T_2$, when the coil is rotating. This invention takes an advantage of the inequality $T_1 \neq T_2$ for measuring the angular velocity $\Omega$c. This invention determines the angular velocity $\Omega$c of the fiber toil by the duration difference $\Delta$ T=$T_1$−$T_2$. Prior phase-modulation gyroscopes are used of deducing the basic component in the output of a photodetector by a synchronous detection of the modulation frequency fm(=$\Omega$/$2\pi$=1/($T_1$+$T_2$)). This invention is based upon an entirely different principle from prior ones.

The method of this invention is quite novel, because it dispenses With synchronous detection, although it belongs to a category of the phase-modulation method. This invention has been originated from a profound consideration of the time-dependent change of tie phase modulated signal. Mathematical explanation will be useful for clarifying the principle of this invention.

Eq. (9) includes all portions of the output of the photodetector. Eq.(11) shows the DC component and the AC component in the Bessel function expansion. The AC component is obtained by subtracting the DC part of Eq. (11from Eq. (9). The AC component $I_{ao}$ of the output of the photocurrent is given by $$I_{ao}=E_R E_L[cos \{2\ b\sin(\phi/2)\cos(\Omega t)+\Delta\theta\}-J_o(\xi)\cos \Delta\theta]=E_R E_L[cos \{\xi\cos(\Omega t)+\Delta\theta\}-J_o(\xi)\cos \Delta\theta] \quad (15)$$

The DC component of Eq. (11) is $(E_R^2+E_L^2)/2$ and $E_R E_L J_o(\xi)\cos \Delta\theta$. Since Eq. (9) and Eq. (11) are equal, subtracting them from Eq. (9) gives the AC part $I_{ao}$. cos {2 b sin($\phi$/2)cos($\Omega$t)+a $\Delta\phi$} includes a DC part, though it seems an AC part. Then the true AC component is obtained by subtracting $J_o(\xi)\cos \Delta\theta$ from cos {2 b sin($\phi$/2)cos($\Omega$t) +$\Delta\theta$}. Eq. (15) is the result of the subtraction. Eq. (15) itself is novel. Eq. (15) includes all odd order and even order terms of harmonics from n=0 to n=$\infty$. The harmonics have been used to be written by the form of the expansion of harmonics like Eq. (11). However, the AC part has never been written in an integral form such as Eq. (15). The time average of $I_{ao}$ is of course 0. $I_{ao}$ is a periodic function of time with the period T(=$2\pi$/$\Omega$) of the modulation. However, $I_{ao}$ is not a simple sine function of time t. One period T includes two subwaves $T_1$ and $T_2$. The subwaves are asymmetric for the front one and for the rear one, when the fiber coil is rotating. This invention utilizes the asymmetry of the subwaves in one period T. The asymmetry teaches the phase difference $\Delta\theta$ and the angular speed $\Omega$.

FIG. 3 exhibits the wave forms of $I_{ao}$ of $\Delta\theta$=0 (solid line) or $\Delta\theta$=0.2 radian (dotted line) in the case of $\xi$(=2 b sin($\phi$/2)=1. The full length $T_1$+$T_2$ is $2\pi$/$\Omega$. If the gyroscope is at rest, the duration times $T_1$ and $T_2$ are equal ($\Delta\theta$=O, $T_1$=$T_2$). The solid line curve shows the symmetric property at rest. It is testified by the invariance of $I_{ao}$ by substituting $\Omega$ t by ($\Omega$t+$\pi$). The period of $I_{ao}$ ($\Delta\theta$=0) is T/2=$\pi$/$\Omega$.

But when the fiber coil is in rotation, subwaves $T_1$ and $T_2$ are asymmetric ($T_1 \neq T_2$). Dotted line in FIG. 3 shows the ease of $\Delta\theta$=0.2 radian. The lower half of the first subwave $T_1$ becomes bigger. The lower half of the second subwave $T_2$ becomes smaller. $T_1$>$T_2$. The asymmetry will be bigger in proportion to $\Delta\theta$. The proportionality implies the possibility of obtaining a $\Delta\theta$.

Another question is whether the sign of $\Delta\theta$ can be known by the wave forms. The sign of $\Delta\theta$ can be determined by this method. FIG. 4 shows the wave forms of $I_{ao}$ of $\Delta\theta=-0.2$, $-0.1, 0, +0.1$ and $+0.2$ radian in the case of $\xi=1$. Halves of the subwaves are numbered for facilitating the explanation. "a" is the negative half of the first subwave. "b" is the positive half of the first subwave. "c" is the negative half of the second subwave. "d" is the positive half of the second subwave. The positive halves (b) and (d) scarcely vary for five cases. But the negative halves (a) and (c) change for different phase differences $\Delta\theta$. Positive $\Delta\theta$ enhances (a) and reduces (c). Negative $\Delta\theta$ reduces (a) and heightens (c). The comparison of the negative halves (a) and (c) can discern the sign of $\Delta\theta$. When $T_1-T_2$ is positive, $\Delta\theta$ is also positive. If $T_1=T_2$ is negative, $\Delta\theta$ is negative. Therefore, the time difference $\Delta T=(T_1-T_2)$ determines $\Delta\theta$, including the sign.

FIG. 5 shows the result of numerical simulation for determining the relation between Sagnac's phase difference $\Delta\theta$ and the time difference $\Delta T$. The abscissa is Sagnac's phase difference $\Delta\theta$ in logarithmic scale. The unit is radian (1 radian=180/$\pi$ degrees). The ordinate is the normalized time difference $2\pi\Delta T/(T_1+T_2)$ in logarithmic scale. $2\pi/(T_1+T_2)=\Omega$. The unit is also radian. The inclination of the lines is the scale factor. More specifically, FIG. 5 shows linearity of scale factor (theory) in the case of $\xi=1, 2, 3$ and $4$.

The result shows an excellent stability of the scale factor in a wide range. For $\xi=2$ to 3, $\Delta T$ rises in proportion to $\Delta\theta$ in the range from $\Delta\theta=10^{-4}$ to 1 (rad). Thus the angular speed $\Omega c$ can be obtained by measuring the durations $T_1$ and $T_2$ of the subwaves and calculating the difference.

FIG. 6 is a graph showing the theoretical relation of the scale factor to the phase-modulation coefficient $\xi$ at $\Delta\theta=0.01$ rad. The scope of the value of $\xi$ is 1 to 4. This is the result of numerical simulations. A scale factor is defined as the ratio of $2\pi\Delta T/T(T_1+T_2)$ to $\Delta\theta$. The scale factor is $2\pi\Delta T/(T_1 40\ T_2)\Delta\theta$. The meaning of the divisor/$\Delta\theta\times0.01$ is $\Delta\theta=0.01$. The scale factor $2\pi\Delta T/(T_1+T_2)\Delta\theta$ changes as a function of $\xi$. The scale factor becomes bigger for a smaller $\xi$. Since the scale factor is defined as the ratio of $\Delta T$ to $\Delta\theta$, the sensitivity is in proportion to the scale factor. The smaller $\xi$ becomes, the larger the sensitivity rises. A smaller $\xi$ ensures higher sensitivity. This property sharply contradicts prior phase-modulation gyroscopes in which a smaller $\xi$ is annoyed with smaller sensitivity.

The change of $\Delta T$ is not linearly related to the change of $\xi$. FIG. 7 is an enlarged graph of the part of FIG. 6. The scope of variation of $\xi$ is 2.5 to 3.5 in FIG. 7. In the limited scope, the decrease of $\Delta T$ is in proportion to the increase of $\xi$. For example, $2\pi\Delta T/(T_1+T_2)\Delta\theta=0.017$ rad for $\xi=3$ and $\Delta\theta=0.01$ rad.

The results of the numerical simulations can be explained by mathematical analysis of the AC components of Eq. (15). Mathematical consideration starts from Eq.(15).

$$I_{ao}=E_rE_L[\cos\{\xi\cos(\Omega t)+\Delta\theta\}-J_o(\xi)\cos\Delta\theta] \quad (16)$$

Quasi-sine Waves of FIGS. 2A and 2B, FIG. 3, FIG. 4 or FIG. 8 must be expressed by Eq. (15) or Eq. (16). Symmetry at $\Delta\theta=0$ or asymmetry at $\Delta\theta\neq0$ shall derive from Eq. (16). The amplitude of light beams does not relate to the determination of the time durations $T_1$ and $T_2$. Thus the following function $W(\Theta)$ will be into consideration. The independent variable is $\Theta=\Omega t$.

$$W(\Theta)=\cos\{\xi\cos\Theta+\Delta\theta\}-J_o(\xi)\cos\Delta\theta \quad (17)$$

In the first term, a cosine function has a variable of $(\xi\cos\Theta+\Delta\theta)$.

The existence of double cosine functions divides one period into halves. Subwaves $T_1$ and $T_2$ are originated from the double cosine functions.

FIG. 10 shows $\xi\cos\Theta$ and $\cos(\xi\cos\Theta)$ dotted lines in the variable range from $-\pi$ to $+(5/2)\pi$. In FIG. 10, the abscissa is $\Theta$, and the ordinate is W. ($\xi\cos\Theta$) has two peaks in the range. ($\xi\cos\Theta$) is $\xi$ at $\Theta=0$ or $2\pi$, and $-\xi$ at $\Theta=-\pi$ or $+\pi$. Further, ($\xi\cos\Theta$) is 0 at $\Theta=-\pi/2, +\pi/2, +3\pi/2$ or $+5\pi/2$. FIG. 10 has been drawn under the assumption of $\pi>\xi>\pi/2$. However, if $\xi<\pi/2$, the explanation is similar to the case of $\xi>\pi/2$ and $\Delta\theta=\emptyset$. $\cos(\xi\cos\Theta)$ has four peaks in the range. $\cos(\xi\cos\Theta)$ is asymmetric with regard to $\Theta$ axis.

Solid lines show $\xi\cos\Theta+\Delta\theta$ and $\cos(\xi\cos\Theta+\Delta\theta)$. ($\xi\cos\Theta+\Delta\theta$) is simply obtained by displacing $\xi\cos\Theta$ vertically by $\Delta\theta$. $\cos(\xi\cos\Theta+\Delta\theta)$ has also four peaks in the range.

The constant part of Eq. (17) is briefly written as $J(=J_o(\xi)\cos\Delta\theta)$. Eq. (17) becomes $$W(\Theta)=\cos\{\xi\cos\Theta+\Delta\theta\}-J \quad (18)$$

The form of the asymmetric function $\cos(\xi\cos\Theta)$ is rather difficult to understand. $\cos(\xi\cos\Theta)$ takes a maximum value $+1$ at $\Theta=-\pi/2, +\pi/2$ and $+3\pi/2$. $\cos(\xi\cos\Theta)$ reaches a minimum value $\cos\xi$ at $\Theta=-\pi, 0, \pi$ and $2\pi$. Though $+1$ is the maximum, $-1$ is not the minimum. The minimum is $\cos\xi$ which is larger than $-1$ in any cases. The asymmetry is important to understand the principal concept supporting This invention. If $\xi$ is bigger than $\pi/2$, $\cos\xi$ is negative. If $\xi$ is smaller than $\pi/2$, $\cos\xi$ is positive. In any cases the following argument is valid.

$\cos(\xi\cos\Theta)$ is an even function regarding $\Theta$, because it contains $\Theta$ in the form of $\cos\Theta$. Furthermore, $\cos(\xi\cos\Theta)$ is symmetric with regard to the vertical lines of $\Theta=0, \pi, 2\pi$, etc. Cosine function contains $\cos\Theta$. Double cosine functions make $\cos(\xi\cos\Theta)$ symmetric also with regard to another vertical lines of $\Theta=$ half integer times of $\pi$, i.e. $\Theta=\pi/2$, $\Theta=3\pi/2$, etc. $\cos(\xi\cos\Theta)$ is invariant for the horizontal displacement of $\pi$. Namely $\cos(\xi\cos\Theta)$ is a periodic function of the period $\pi$ which is just half of the original period $2\pi$. Such symmetry and periodicity enable to make the whole form of $\cos(\xi\cos\Theta)$ by repeating and unfolding the basic shape of $\cos(\xi\cos\Theta)$ between $\Theta=0$ and $\Theta=\pi/2$. In brief, $\cos(\xi\cos\Theta)$ is not a trigonometric function. However, it is a periodic function. The period is $\pi$ which is half of the period of $\cos\Theta$. Double cosine function makes the period half. Namely when $\Delta\theta=0$, $W(\Theta)$ satisfies the following periodic condition and symmetry condition.

$W(\Theta)=W(\Theta+\pi N)$, $W(\Theta)=W(\pi M-\Theta)$, where M and N are integers. A horizontal line $W=J$ is drawn in FIG. 10. The horizontal line crosses $\cos(\xi\cos\Theta)$ once at every unit length of $\pi/2$. This is important. Crossing points are denoted by dots. We now consider a simplified equation.

$$\cos(\xi\Theta)=J \quad (19)$$

Analytical solutions of the equation are investigated. From Eq. (19)

$$\xi\cos\Theta=\pm\cos^{-1}J \quad (20)$$

where $\cos^{-1}J$ is assigned by the principal value from 0 to $\pi/2$. Since cosine is an even function, the sign $\pm$ should be affixed to the principal value. Eq. (20) can be solved as $$\Theta=\pm\cos^{-1}\{\pm\xi^{-1}\cos^{-1}J\}+2N\pi \text{(N is an integer)} \quad (21)$$

Such solutions exist at every unit term of $\pi/2$. Thus the solution between 0 and $\pi/2$ is denoted by C. This is the principal value of $\Theta$.

$$C=\text{principal value of } \cos^{-1}\{\xi^{-1}\cos^{-1}J\} \ (0<C<\pi/2) \quad (22)$$

Eq. (21) signifies a plurality of solutions which can be expressed by C. All solutions of Eq. (21) in FIG. 10 are now clarified in every terminal of the length of $\pi/2$.

① $\Theta=-\pi+C$ in the division between $-\pi$ and $-\pi/2$.
② $\Theta=-C$ in the division between $-\pi/2$ and 0.
③ $\Theta=+C$ in the division between 0 and $\pi/2$.
④ $\Theta=+\pi-C$ in the division between $+\pi/2$ and $+\pi$.
⑤ $\Theta=+\pi+C$ in the division between $+\pi$ and $+3\pi/2$.
⑥ $\Theta=2\pi-C$ in the division between $+3\pi/2$ and $+2\pi$.
⑦ $\Theta=2\pi+C$ in the division between $+2\pi$ and $+5\pi/2$.

All solutions are classified into $+C+N\pi$ and $-C+N\pi$ (N: integer). Such solutions of $+C+N\pi$ is understandable. The other solutions of $-C+N\pi$ may be less feasible. However all these solutions do exist for Eq. (19).

The behavior of e is now considered in the limit of $\xi \to 0$. In the limit of $\xi \to 0$, the 0-th Bessel function $J=J_o(\xi) \to +1 - \xi^2/4$. In the same limit, $\cos^{-1}(1-\xi^2/4) \to \xi/2^{1/2}$. Then $\cos^{-1}(\xi^{-1}\cos^{-1}J) \to \cos^{-1}2^{1/2} = \pi/4$. Namely the principal crossing point becomes $\pi/4$ in the limit of $\xi \to 0$.

When $\xi$ is small, the function $\xi \cos\Theta$ oscillates in a small amplitude in the vicinity of 0. Correspondingly $\cos(\xi\cos\Theta)$ oscillates in a small amplitude near W=1. In this case, since J approaches 1, there are crossing points of $W=\cos(\xi\cos\Theta)$ and $W=J$. Namely the solution of Eq. (19) always exists even when $\xi \to 0$. There are the crossing points of $\cos(\xi\cos\Theta)$ and J, or the solution of Eq. (19) in every unit length of $\pi/2$. The solutions are denoted by $\pi/4=M\pi/2$ (M: integer) in the limit of $\xi \to 0$.

Now general cases of $\Delta\theta \neq 0$ are considered. When $\Delta\theta$ is positive, $W=\Theta++\Delta\theta$ is a wave form which is obtained by an upward parallel transference of $W=\xi\cos\Theta$ by $\Delta\theta$. The function $W=\xi\cos\Theta+\Delta\theta$ is written by a solid line in FIG. 10. When $\Theta=0$ or $2\pi$, it takes $\xi+\Delta\theta$. When $\Theta=-\pi$ or $\pi$, it is $-\xi+\Delta\theta$.

The function $\cos(\xi\cos\Theta+\Delta\theta)$ is a cosine function of $(\xi\cos\Theta+\Delta\theta)$. The wave form of $W=\cos(\xi\cos\Theta+\Delta\theta)$ is signified by a solid line in FIG. 10. In the vicinity of $\Theta=0$ or $2\pi$, the values are slightly lower than the dotted line ($W=\cos(\xi\cos\Theta)$). Maximum points slightly deviate to the right from $\pi/2$ or $5\pi/2$. Other maximum points deviated to the left from $-\pi/2$ or $3\pi/2$. The function $\cos(\xi\cos\Theta+\Delta\theta)$ displaces upward at minimum points $\Theta=-\pi$, and $\pi$ due to $\Delta\theta$. On the contrary, the function displaces downward at other minimum points $\Theta=0$ and $2\pi$ owing to $\Delta\theta$. In general, the function $\cos(\xi\cos\Theta)+\Delta\theta$ deviates to the left in the regions of $-\pi<\Theta<0$ and $\pi<\Theta<2\pi$ for positive $\Delta\theta$. The same function deviates to the right in the other regions of $0<\Theta<\pi$ and $2\pi<\Theta<3\pi$ for positive $\Delta\theta$. In general, the wave form of $\cos(\xi\cos\Theta+\Delta\theta)$ displaces to the left in the regions of $(2M-1)\pi<\Theta<2M\pi$, but displaces to the right in the other regions between $2M\pi<\Theta<(2M+1)\pi$ for $\Delta\theta>0$.

In accordance with the asymmetric deviations, the crossing points of $W=\cos(\xi\cos\Theta+\Delta\theta)$ with $W=J$ deviate either leftward or rightward. The periodicity and the symmetry of the function allow to restrict the consideration within the fundamental region between $\Theta=0$ and $\Theta=\pi$. In the half region from 0 to $\pi/2$, the crossing point deviates to the right from point C which is one of solutions of $\cos(\xi\cos\Theta)-J=0$. In the other half region from $\pi/2$ to $\pi$, the crossing point deviates to the right from point $-C$ which is also one solution of $\cos(\xi\cos\Theta)-J=0$. How far do the solutions displace from C or $\pi-C$? The amount of the deviation is given by solving Eq. (18).

$$\cos(\xi\cos\Theta+\Delta\theta)=J \tag{23}$$

A glimpse of FIG. 10 teaches the plane symmetry with regard to the vertical lines $\Theta=M\pi$ (M is an integer). Thus the periodicity and the symmetry can be expressed by $$W(\Theta)=W(\Theta+2\pi N), W(\Theta)=W(2\pi M-\Theta) \text{ (M, N: integers)}$$

From Eq. (18) or Eq. (23), $$\xi\cos\Theta+\Delta\theta=\neq\cos^{-1}J \tag{24}$$

Since cosine is an even function, the solution requires the sign $\neq$.

$$\Theta=\neq\cos^{-1}\{\neq\xi^{-1}\cos^{-1}J-"\theta\}+2N\pi \text{ (N:integer)} \tag{25}$$

This is a general expression which includes all solutions. Two signs $\neq$ signify four independent solutions in a period $2\pi$.

In the half region from $\Theta=0$ to $\Theta=\pi/2$, solution $\Theta$ is the principal value of $\cos^{-1}\{\xi^{-1}\cos^{-1}J-\Delta\theta\}$. It is obtained by taking plus sign in the first $\neq$ sign and plus sign in the second $\neq$ sign. The solution converges to $\cos^{-1}\{\xi^{-1}\cos^{-1}J\}=C$ in the limit of $\Delta\theta \to 0$. I The solution is displaced to the right for positive $\Delta\theta$.

On the contrary, in the other half region from $\Theta=\pi/2$ to $\Theta=\pi$, solution $\Theta$ is a principal value of $\Theta=\pi-\cos^{-1}\{\xi^{-1}\cos^{-1}J+\Delta\theta\}$. This solution may be difficult to understand. This is obtained by taking plus and minus signs in the first and second $\neq$ signs in Eq. (25) and using the formula of $\cos^{-1}(-Z)=\pi-\cos^{-1}Z$. The solution is verified by the fact that it converges to $\pi-C$ for $\Delta\theta \to 0$ and a positive $\Delta\theta$ displaces the solution to the right from $\pi-C$. Since Eq. (25) designates a lot of solutions, the relation will now be explained by principal values A and B of the functions. Namely A and B are defined by $$A=\text{principal value of } \cos^{-1}\{\xi^{-1}\cos^{-1}J-\Delta\theta\} \quad (0<A<\pi/2) \tag{26}$$

$$B=\text{principal value of } \cos^{-1}\{\xi^{-1}\cos^{-1}J+\Delta\theta\} \quad (0<B<90/2) \tag{27}$$

Both A and B converge to C in the limit of $\Delta\theta \to 0$. The crossing points in each region with a width of $\pi/2$ have been explained at a paragraph succeeding Eq. (22). If $\Delta\theta$ is not 0, the crossing points or the solution of Eq. (23) or Eq. (25) deviate from the basic crossing points for $\Delta\theta=0$. All solutions or crossing points are given for the seven subregions from $-\pi$ to $5\pi/2$.

① for $-\pi<\Theta<-\pi/2$ $\Theta=-\pi+B$ (28)
② for $-\pi/2<\Theta<0$ $\Theta=-A$ (29)
③ for $0<\Theta<\pi/2$ $\Theta=+A$ (30)
④ for $\pi/2<\Theta<\pi$ $\Theta=+\pi-B$ (31)
⑤ for $\pi<\Theta<3\pi/2$ $\Theta=+\pi+B$ (32)
⑥ for $3\pi/2<\Theta<\pi$ $\Theta=2\pi-A$ (33)
⑦ for $2\pi<\Theta<5\pi/2$ $\Theta=2\pi+A$ (34)

The solutions are written in FIG. 10 at crossing points by explicit forms, where $\Delta$ means $\Delta\theta$.

This redundant expression includes some equivalent solutions which are separated only by $2\pi$ which is a basic period of trigonometric functions. ① is equivalent to ⑤. ② is equivalent to ⑥. ③ is equivalent to ⑦. Four subregions form a period. It is tantamount to explain the solutions in any period staring from any subregion.

Here time durations of half waves will be explained in one period consisting of ②, ③, ④ and ⑤. The wave of $\cos(\xi\cos\Theta+\Delta\theta)$ is cut in every subregion by solutions or crossing points of $W=J$. The wave is divided into upper half waves (W>J) and lower half waves W<J) by the horizontal line W=J. One period contains two upper half waves and two lower half waves.

$T_3$ denotes the duration of the first (lower) half wave (from $-A$ to $+A$). $T_4$ designates the duration of the second (upper) half wave (from $+A$ to $\pi-B$). $T_5$ is the duration of the third (lower) half wave (from $\pi-B$ to $\pi+B$). $T_6$ is defined as the duration of the fourth (upper) half wave (from $\pi+B$ to $2\pi-A$). The differences of the crossing points determine the durations of the half waves.

$$T_3=2A \tag{35}$$

$$T_4=\pi-A-B \tag{36}$$

$$T_5=2B \tag{37}$$

$$T_6=\pi-A-B \tag{38}$$

Upper half durations $T_4$ and $T_5$ are always commensurate among four duration times. Furthermore, the second upper half wave and the fourth upper half wave are entirely tantamount also with regard to the wave forms themselves from the symmetry rule $W(\Theta)=W(2\pi M-\Theta)$.

On the contrary, lower half waves $T_3$ and $T_5$ are totally different regarding the duration as well as the wave form. This invention takes advantage of the asymmetry of the lower half waves $T_3$ and $T_5$. Only when $\Delta\theta=0$, $A=B=C$, and $T_3=T_4$. When $\Delta\theta\neq 0$ in general, $T_3\neq T_5$. Furthermore, when $\Delta\theta$ is positive ($\Delta\theta>0$), A is bigger than B ($A>B$). As a positive $\Delta\theta$ grows bigger, $T_5$ decreases and $T_3$ increases. When $\Delta\theta$ is negative ($\Delta\theta<0$), A is smaller than B ($A<B$). As an absolute value of a negative $\Delta\theta$ increases, $T_5$ rises and $T_3$ declines. In the meantime, upper half waves $T_4$ and $T_5$ scarcely change, because the upper half waves vary by the second order of $\Delta\theta$.

This invention acquires $\Delta\theta$ by measuring two duration times $T_1(=T_3+T_4)$ and $T_2(=T_5+T_6)$ of the two waves and by subtracting $T_2$ from $T_1$. The first duration time $T_1$ is a sum of $T_3$ and $T_4$, because the first wave consists of the first half wave and second half wave. The second duration time $T_2$ is a sum of $T_5$ and $T_6$, because the second wave consists of the third half wave and fourth half wave. The first duration time $T_1$ and the second duration time $T_2$ are analytically determined by $$T_1=T_3+T_4=2A+\pi-A-B=\pi+A-B \tag{39}$$

$$T_2=T_5+T_6=2B+\pi-A-B=\pi-A+B \tag{40}$$

The difference between $T_1$ and $T_2$ is denoted by $\Delta T$.

$$\Delta T=T_1-T_2=2(A-B) \tag{41}$$

Since the independent variable has been $\Theta$, a period has been $2\pi$ so far. In practice, the independent variable is time $t$ ($\Theta=\Omega t$). And $\Delta T$ should be $2(A-B)/\Omega$, and $(T_1+T_2)$ should be $2\pi/\Omega$ in an actual time scale. The proportion constant $\Omega$ which is an angular frequency of the phase-modulation can be eliminated by dividing $\Delta T$ by the total period $T_1+T_2$. This is a normalization of time difference.

$$"T/(T_1+T_2)=\{2(A-B)/\Omega\}/(2\pi/\Omega)=(A-B)/\pi=\pi^{-1}(A-B) \tag{42}$$

The normalized time difference $\Delta T/(T_1+T_2)$ is an odd function of $\Delta\theta$. Substitution of A and B will clarify the relation between $\Delta\theta$ and $\Delta T/(T_1+T_2)$.

$$\Delta T/(T_1+T_2)=\pi^{-1}[cos\{\xi^{-1}cos^{-1}J-\Delta\theta\}-cos^{-1}\{\xi^{-1}cos^{-1}J+\Delta\theta\}] \tag{43}$$

This is a fundamental equation which determines the relation between the normalized time difference $\Delta T/(T_1+T_2)$ and Sagnac phase difference $\Delta\theta$. This equation includes no approximation. Eq. (43) is an exact expression. When $\Delta\theta$ is large enough, Eq. (43) should be calculated precisely as it is. However when $\Delta\theta$ is small, Eq. (43) can be treated by an approximation which linearizes Eq. (43) with regard to $\Delta\theta$.

$$\cos^{-1}(x+h)=\cos^{-1}x-h(1-x^2)^{-3/2}/2+h^3(1+2X^2)^{-5/2}/6 \tag{44}$$

This is Taylor's expansion for a small h of $\cos^{-1}(x+h)$. Eq. (26) is approximated as $$A=\cos^{-1}\{\xi^{-1}\cos^{-1}J-\Delta\theta\}=C+\Delta\theta(1-x^2)^{-\frac{1}{2}}-(\Delta\theta)^2X(1-X^2)^{-3/2}/2- \tag{45}$$

where $C=\cos^{-1}\{\xi^{-1}\cos^{-1}J\}$, $X=\xi^{-1}\cos^{-1}J$. If $\Delta\theta$ is far smaller than 1, this equation can be simplified by taking the first order of $\Delta\theta$. From the definition of x and C, $x=\cos C$. The same Eq. (45) is written as $$A=C+\Delta\theta\,\mathrm{cosec}C+(\Delta\theta)^2\cot C\mathrm{cosec}^2C/2 \tag{46}$$

B which is defined by Eq. (27) is obtained by changing the sign of $\Delta\theta$
from A.

$$B=C-\Delta\theta\,\mathrm{cosec}C+(\Delta\theta)^2\cot C\mathrm{cosec}^2C/2 \tag{47}$$

Calculation of (A−B) cancels the even order terms of $\Delta\theta$. Substituting the results, we obtain the expression of the normalized difference.

$$\Delta T/(T_1+T_2)=2\pi^{-1}[\Delta\theta\mathrm{cosec}C+(\Delta\theta)^3(\mathrm{cosec}^5C+2\cot^2C\mathrm{cosec}^3B/6] \tag{48}$$

This expression is valid till the first order of $\Delta\theta$ but is not valid up to the third order of $\Delta\theta$, because J contains $\Delta\theta$ in itself. However if $\Delta\theta$ is small enough than 1, the first order of $\Delta\theta$ will give a sufficient approximation.

The scale factor S (sensitivity) is defined as a quotient of the normalized time difference divided by $\Delta\theta$. $S=\Delta T/\{(T_1+T_2)\Delta\theta\}$. In order to convert the ratio to angle, S is multiplied by $2\pi$.

$$2\pi S=2\pi\Delta T/\{(T_1+T_2)\Delta\theta\}=4\,\mathrm{cosec}\,C \tag{49}$$

The same relation is expressed otherwise by $\Delta\theta=(\pi/2)\sin C\{(T_1-T_2)/(T_1+T_2)\}$ Eq. (49) is an angular scale factor which is analytically acquired. This is a very simple expression. The variation of the scale factor must be considered as a function of $\xi$. Since $\xi$ is the phase modulation coefficient, $\xi$ is a parameter which can be arbitrarily determined. Selection of an optimum $\xi$ requires the consideration about the stability of the sensitivity (scale factor). The scale factor S is proportionate to cosec $C(=\pi S/2)$. Thus the dependence of cosec C on $\xi$ becomes an important problem. Since $C=\cos^{-1}\{\xi^{-1}\cos^{-1}J_0(\xi)\cos\Delta\theta\}$, the explicit form of cosec C is $\mathrm{cosec}[\cos^{-1}\{\xi^{-1}\cos^{-1}J_0(\xi)\cos\Delta\theta\}]$.

Although the scale factor includes $\Delta\theta$ in the form of cos $\Delta\theta$, cos $\Delta\theta$ is now assumed to 1, because $\Delta\theta$ is far smaller than 1 in general. In the limit of $\xi\to\infty$, cosec C converges on 1(cosec $C\to 1$). For positive $\xi$, cosec C monotonously decreases as $\xi$ increases. When $\xi=0$, cosec $C=1.41$. For $\xi=1$, cosec $C=1.39$. If $\xi=2$, coSec $C=1.85$. For $\xi=3$, cosec $C=1.26$. For $\xi=4$, cosec $C=1.15$. For $\xi=5$, cosec $C=1.06$. For $\xi=6$, cosec $C=1.02$. For $\xi=7$, cosec $C=1.01$. In the limit of $\xi\to\infty$, $C=1$. In the limit, $\Delta\theta=(2^{-1}\pi)\{(T_1-T_2)/(T_1+T_2)\}$.

FIG. 29 shows the relation between the scale factor and phase modulation $\xi$. This result teaches that a smaller $\xi$ enhances the sensitivity or scale factor. The characteristic results from the fact that this invention essentially takes advantage of the 0-th order Bessel function $J_0(\xi)$ which takes the maximum value at $\xi=0$. On the contrary, the conventional phase-modulation method takes signals by synchronous detection of the modulation frequency. The prior method utilizes the first order Bessel function $J_1(\xi)$ which takes the maximum value at $\xi=1.8$. Thus the prior method obtains the highest sensitivity at $\xi=1.8$. The tendency of this invention is a great contrast to the prior method. Regarding the asymmetry of durations of $T_1$ and $T_2$, the highest sensitivity will be realized at the limit of $\xi \to 0$. In the limit, $\Delta\theta=(2^{-3/2}\pi)\{(T_1-T_2)/(T_1+T_2)\}$. For small $\xi$, $\Delta\theta=(2^{-3/2}\pi)\{1+(\xi/32)\{(T_1-T_2)/(T_1+T_2)\}$.

However, the amplitude of the AC output signal declines according to the decrease of $\xi$. The decision of the Liming of zero-crossing may become difficult.

The next problem is the stability of sensitivity against the fluctuation of the phase-modulation coefficient $\xi$. The sensitivity changes only $1.41(2^{1/2})$ times from $\xi=0$ to $\xi=\infty$. The maximum sensitivity at $\xi=0$ is only 1.41 times as big as the minimum sensitivity at $\xi=\infty$. The stability of sensitivity is satisfactory, because the change of the sensitivity is so small for the wide scope of $\xi$. Furthermore, the phase-modulation coefficient $\xi$ depends on the amplitude of the driving voltage imposed on the piezoelectric oscillator or the property of the piezoelectric device. But $\xi$ does not change much by the variation of the temperature or other external conditions. The influence of temperature upon $\xi$ is negligible in many cases. However, if the temperature dependence of $\xi$ should be suppressed at any rate, the following improvement will be able to monitor the variation of $\xi$ due to the change of the external conditions.

The monitoring method takes advantage of the difference between the upper half wave duration time $Q_1$ and the lower half Wave duration time $Q_2$. Sagnac's phase difference $\Delta\theta$ has been determined by the difference between the first wave duration $T_1(=T_3+T_4)$ and the second wave duration $T_2(=T_5+T_6)$. In the contradiction to $\Delta\theta$, the monitoring method takes the difference between the upper half wave duration $Q_1=T_4+T_5$ and the lower half Wave duration $Q_2=T_3+T_5$. The determination of the partial durations requires the start of measuring time both from the upward zero-crossing points and from the downward zero-crossing points. $Q_1$ and $Q_2$ are defined by $$Q_1=T_4+T_5=2\pi-2A-2B \tag{50}$$

$$Q_2=T_3+T_5=2A+2B \tag{51}$$

The difference between $Q_1$ and $Q_2$ is $$Q_2-Q_1=4A+4B-2\pi \tag{52}$$

Eq. (26) and Eq.(27) teach that $(Q_2-Q_1)$ is an even function of Sagnac's phase difference $\Delta\theta$. The sum $(A+B)$ can be safely approximated by $2C$. The error of the substitution is the second order of magnitude of $\Delta\theta$. Eq. (52) becomes $$Q_2Q_1=8[\cos^{-1}\{\xi^{-1}\cos^{-1}J_o(\xi)\}-\pi/4] \tag{53}$$

As explained before, $\cos^{-1}J_o(\xi)$ is nearly $2^{-1/2}\xi$. Thus in the limit of $\xi \to 0$, $Q_2-Q_1=0$. Namely $(Q_2-Q_1=0)$ signifies no phase modulation ($\xi=0$). $(Q_2-Q_1)$ increases for the increment of $\xi$. In the limit of $\xi \to \infty$, $(Q_2-Q_1)=2\pi$. The sum $(Q_2+Q_1)$ is always $2\pi$. The independent variable has been $\Theta$ so far for the durations $Q_1$ and $Q_2$. However, the length of time is the objects of measurement. The variables must be expressed in the actual time scale. Since $\Theta=\Omega t$, the durations $Q_1$ and $Q_2$ are simply written as $Q_1/\Omega$ and $Q_2/\Omega$. Normalization by dividing the quantity by $(Q_1+Q_2)$ will eliminated the proportion constant $\Omega$. The normalized difference $(Q_2-Q_1)/(Q_1+Q_2)$ is a function which monotonously increases from 0 to 1, while $\xi$ increases from 0 to $\infty$. The deviation of $\xi$ from the predetermined value can be monitored by the normalized difference $(Q_2-Q_1)/(Q_1+Q_2)$.

$(Q_2-Q_1)/8$ $(=\cos^{-1}\{\xi^{-1}\cos^{-1}J_o(\xi)\}-\xi/4)$ is 0 for $\xi=0$. $(Q_2-Q_1)/8$ is 0.010 for $\xi=1$. $(Q_2-Q_1)/8=0.044$ for $\xi=2$. $(Q_2-Q_1)/8=0.127$ for $\xi=3$. $(Q_2-Q_1)/8=0.266$ for $\xi=4$. $(Q_2-Q_1)/8=0.433$ for $\xi=5$. $(Q_2-Q_1)/=0.545$ for $\xi=6$. In general, for the small value of $\xi$, $(Q_2-Q_1)/8$ can be approximated as $$\cos^{-1}\{\xi-1\cos^{-1}J_o(\xi)\}-\pi/4 \ \xi^2/96 \tag{54}$$

Substitution of the approximation into Eq. (53) gives an approximate formula of the normalized difference.

$$2\pi(Q_2-Q_1)/(Q_1+Q_2)=\xi^2/12 \tag{55}$$

or $$(Q_2-Q_1)/(Q_1+Q_2)=\xi^2 24 \ \pi$$

The phase modulation constant can be monitored by the difference and can be adjusted to the predetermined value by the normalized difference. Therefore this method is self-consistent. The difference between $T_1$ and $T_2$ determines Sagnac's phase difference $\Delta\theta$. The other difference between $Q_1$ and $Q_2$ calibrates the phase-modulation coefficient $\xi$.

BRIEF DESCRIPTION OF THE DRAWINGS

FIG. 1 is a schematic view of a fiber-optic gyroscope of this invention.

FIGS. 2A and 2B are wave forms of the AC (alternate current) component of the output of a photodetector of a phase-modulation fiber-optic gyroscope, when a fiber coil is at rest or in rotation.

FIG. 25 shows a linear representation of theoretical linearity of scale factor in terms of Sagnac's phase difference.

FIG. 31A is a schematic view of a fiber-optic gyroscope of another embodiment using different clocks for the phase modulation and for time measurement of the time durations $T_1$ and $T_2$. FIGS. 31B–31E show relationships of input and output waves at rest and in rotation.

DETAILED DESCRIPTION OF THE PREFERRED EMBODIMENTS

Figure 3:
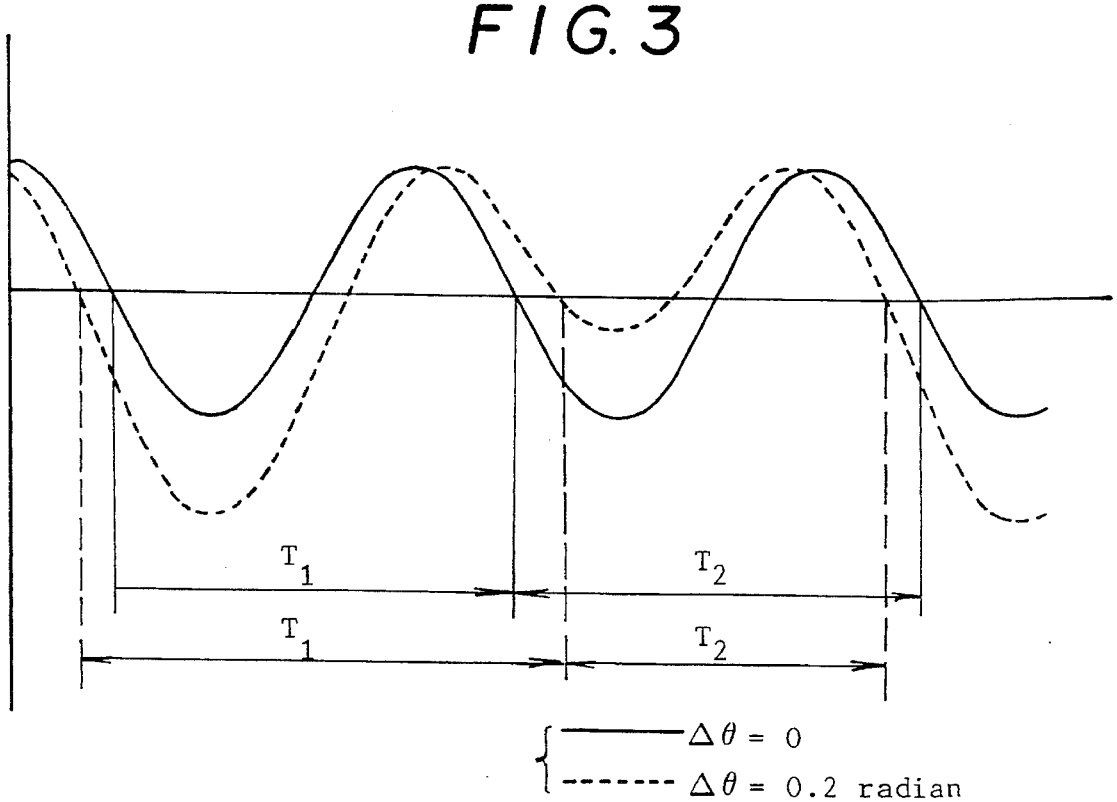
FIG. 3 is AC wave forms at the phase difference $\Delta\theta$ (between C and CCW waves)=0 or $\Delta\theta=0.2$ (rad) in the case of $\xi=1$.
Figure 4:
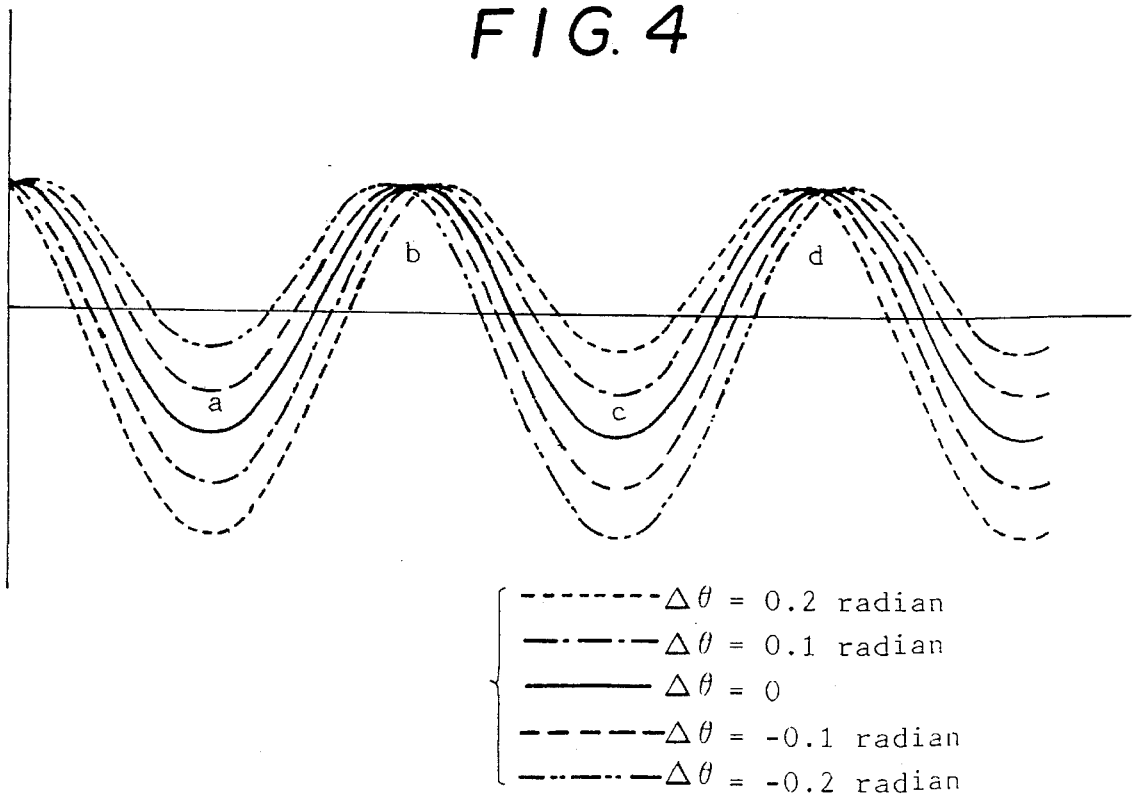
FIG. 4 is AC wave forms at the phase differences a $\Delta\theta=-0.2, -0, 0, +0.1, +0.2$ (rad) in the ease of $\xi=b\ 1$.
Figure 5:
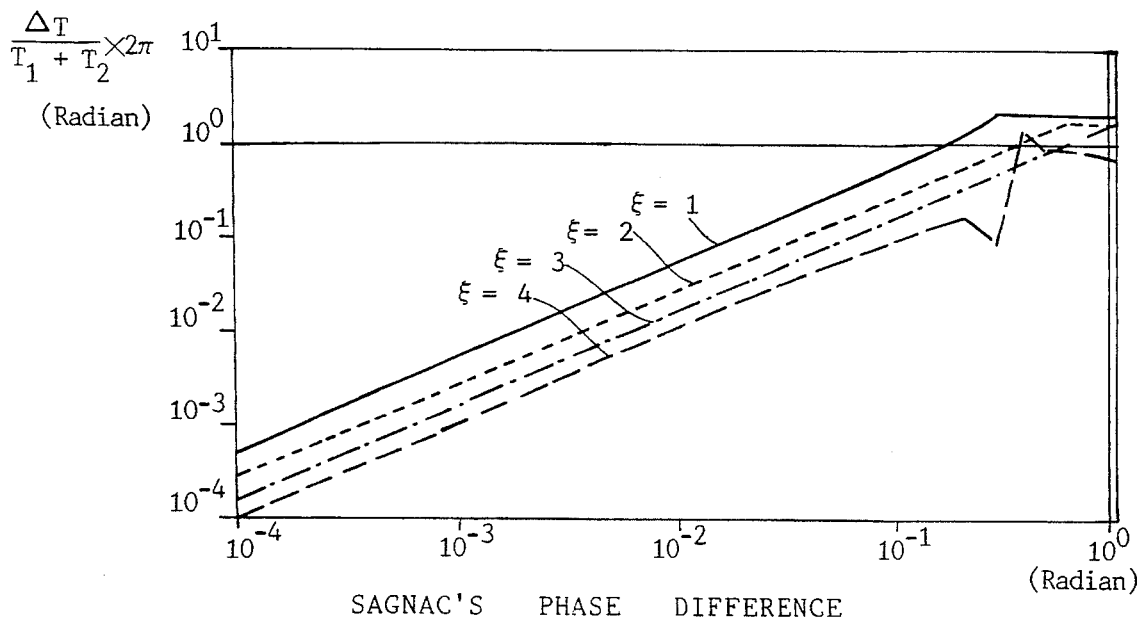
FIG. 5 is a graph between the time differences $\Delta T (= T_1 T_2)$ and the Sagnac's phase differences $\Delta\theta$ in the case of $\xi=1, 2, 3$ or $4$.
Figure 6:
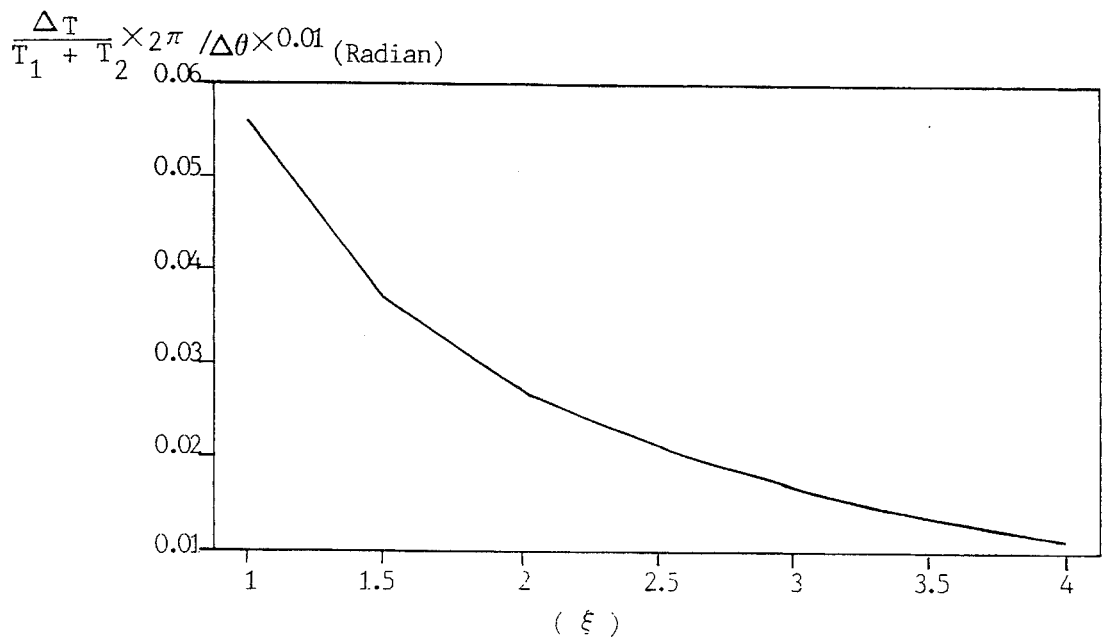
FIG. 6 is a graph showing the relation between the scale factor and the phase modulation coefficient $\xi$ (=1 to 4) determined by a numerical simulation.
Figure 7:
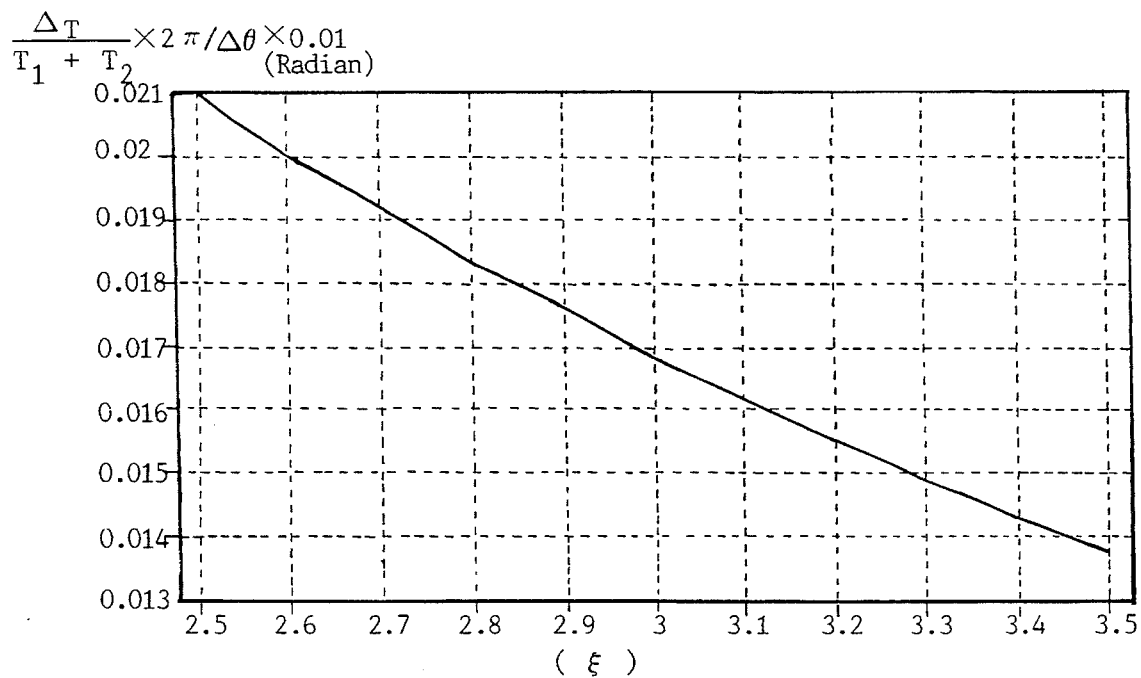
FIG. 7 is an enlarged graph of part of FIG. 6 $\xi$ (=2.5 to 3.5).
Figure 8:
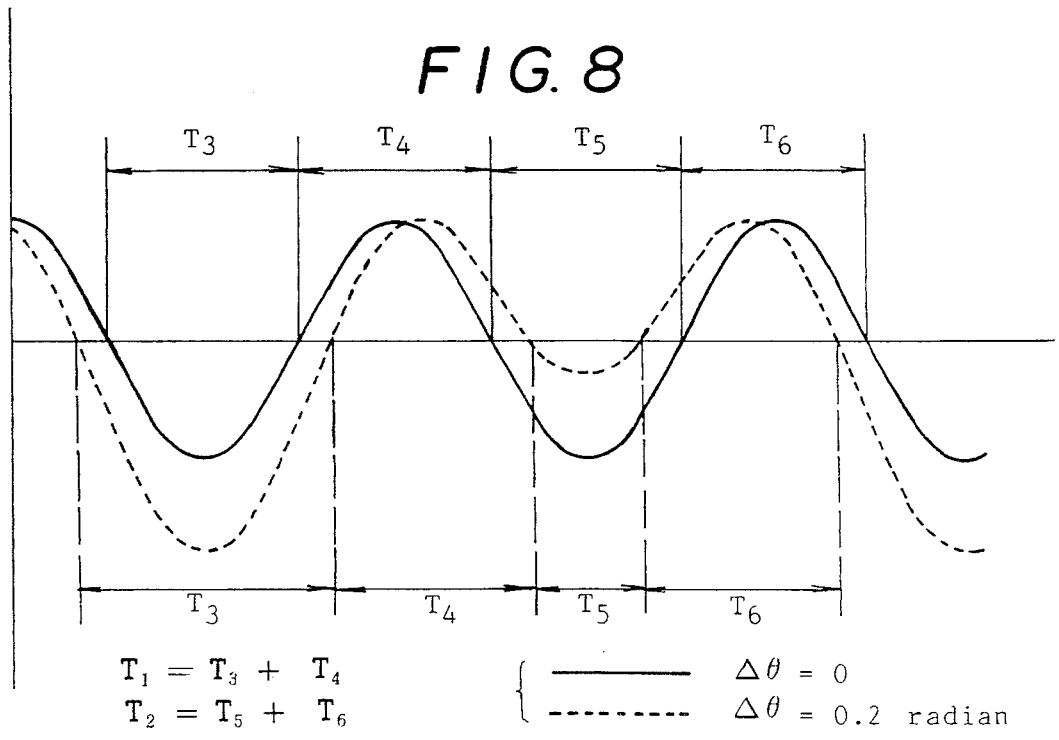
FIG. 8 is wave forms for showing the definition of the time lengths of half waves of the AC waves of the photodetector.
Figure 9:
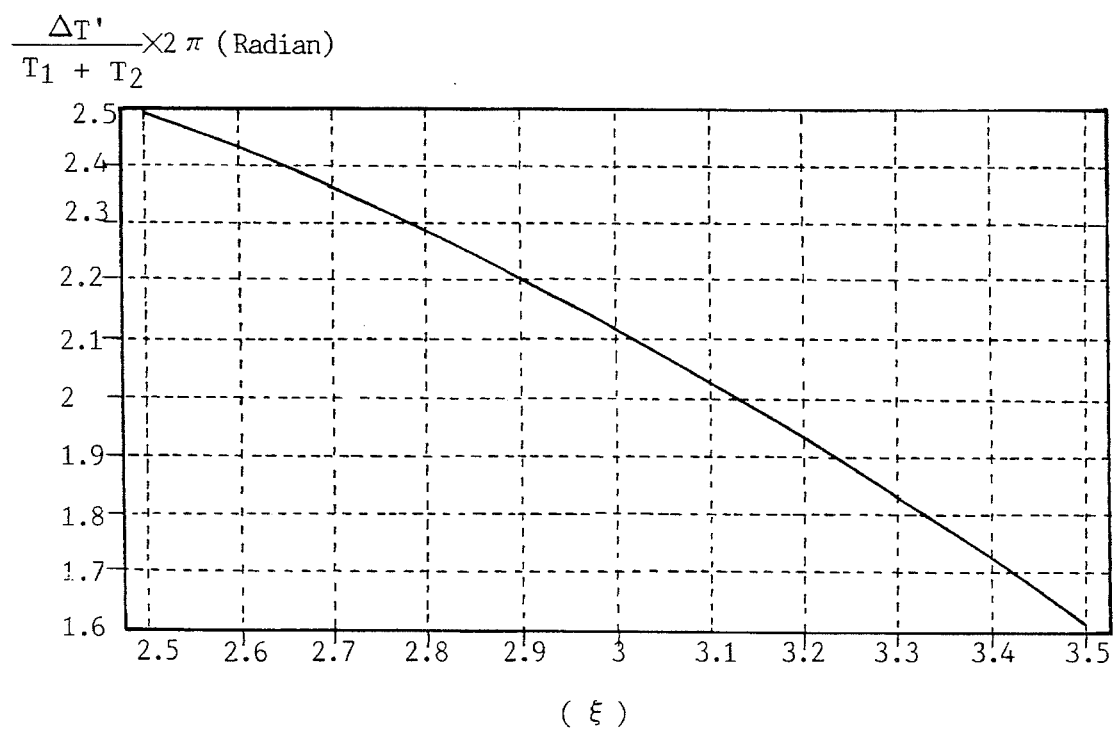
FIG. 9 is a graph showing the relation between the modulation constant $\xi$ and the time difference of upper half wave and the lower half wave in the ease of $\Delta\theta=0$.

First of all, Sagnac's phase difference $\Delta\theta$ should be estimated in a gyroscope having parts of ordinary parameters. The proportion constant of $\Delta\theta$ to the angular velocity $\Omega$ o is calculated for a gyroscope with a fiber coil of a 50 m length (L) and of a 50 mm diameter (a), and a light source of a 0.84 µm wavelength.

$$\Delta\theta = 4\pi La\Omega_o/c\lambda \qquad (56)$$
$$= 0.125\Omega_o \qquad (57)$$

For example, if the angular velocity $\Omega_o$ is assumed to be 0.05 deg/sec to 100 deg/see (8.73×10$^{-4}$ rad/sec to 1.7 rad/sec), the range of Sagnac's phase difference $\Delta\theta$ is $$\Delta\theta = .09 \times 10^{-4} \text{ rad to } .213 \text{ rad} \qquad (58)$$

The range of $\Delta\theta$ allows the gyroscope to approximate the time durations by Eq. (46) and Eq. (47). The detection of the minimum angular velocity 0.05 deg/sec demands a certain time resolution. The time resolution will be calculated, for example, in the case of the phase-modulation of 64 kHz ($\Omega=2\pi\times64$ kHz). The period of the modulation is $T_o=T_1+T_2=1/64\times10^3 \text{sec}^{-1}=1.5\times10^{-5}$ sec. The minimum $\Delta\theta$ to be detected is $10^{-4}$ rad(0.1 mrad). The normalized time difference of Eq. (49) is calculated for $\xi=3$ as $$2\pi\Delta T/(T_1+T_2)=4\Delta\theta\text{cosec } C=5 \Delta\theta \quad (59)$$

In the example, the actual time difference is $\Delta T=5\times10^{-4}\times1.5\times10^{-5}/2\pi=1.2\times10^{-9}\text{sec}=1.2$ ns. The minimum angular velocity $\Delta\theta=0.1$ mrad requires the time difference detection of 1.2 ns.

This is a short time. However, the current measurement technique can measure such a time without difficulty. Further, $64\times10^3$ times of measurements are carried out in one second in practice, because the time durations can be measured at every cycle of the modulation. Exact values of the time durations can be obtained by taking an average of a plurality of the results. If the sampling period is assumed to be 0.1 sec, $64\times10^3$ times of measurements are carried out for a single detection. Thus the time resolution actually required is $1.2\times10^{-9}\times64\times10^2$ sec$=7.68\times10^{-6}$ sec$=7.68$ μsec This is a time long enough to be measured by the present level of technology.

Figure 11:
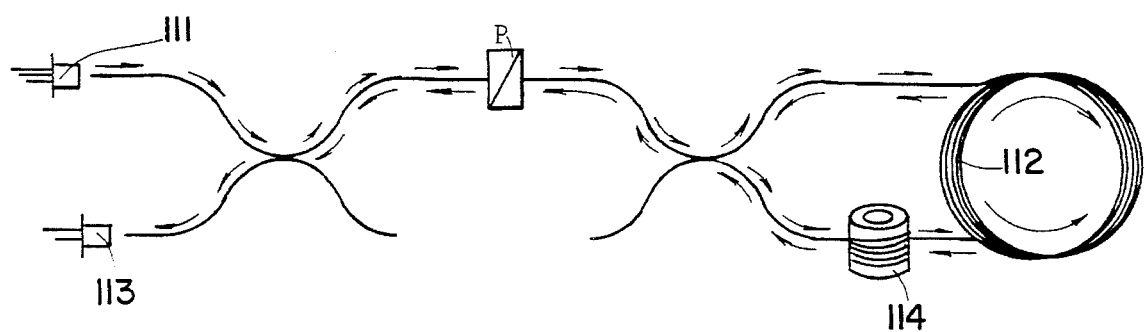
FIG. 11 is a schematic view of a fundamental configuration of a phase-modulating fiber-optic gyroscope.
Figure 10:
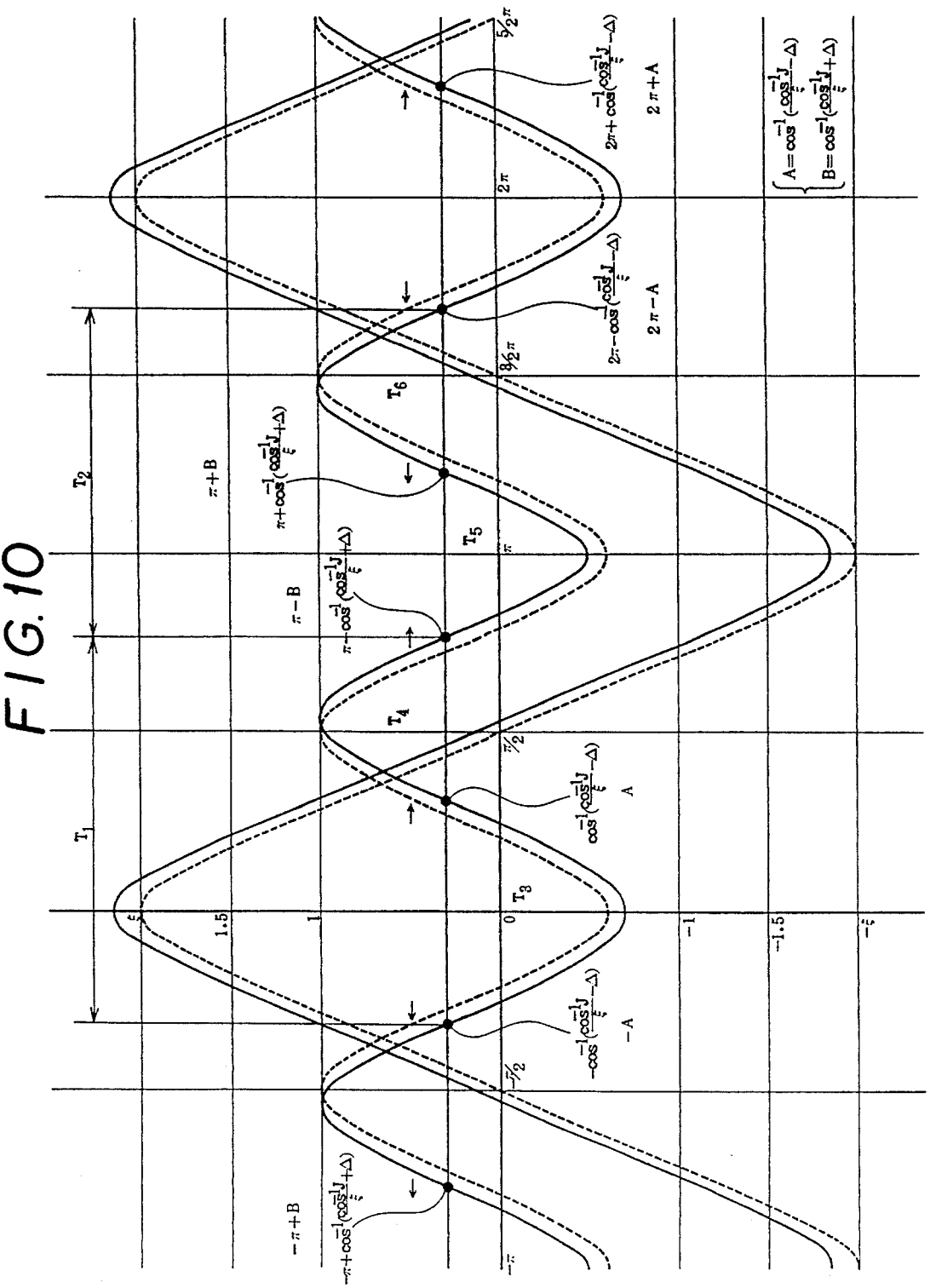
FIG. 10 is a graph of $\xi \cos \Theta$ (dotted line), $\xi \cos \Theta+\Delta\theta$ (solid line), $W=\cos(\xi \cos \Theta)$(dotted line) and $W=\cos(\xi \cos\Theta+\Delta\theta)$ (solid line) as a function of $\Theta$ which is the abscissa. Crossing points of $W=J$ and $W=\cos(\xi \cos \Theta+\Delta\theta)$ are indicated. $\Delta\theta$ is simplified is $\Delta$.

This invention is of course applicable to the conventional phase-modulated fiber-optic gyroscope shown by FIG. 11. In the gyroscope, light beams emitted from a light source enter an end of an optical fiber. The light waves pass through a first coupler, a polarizer and a second coupler. Then the light waves are divided into two wave packets. One wave packet propagates in a fiber coil in the clockwise direction. The other wave packet propagates in the same fiber coil in the counterclockwise direction. Then the two wave packets assemble in the second coupler. The combined waves spread in the polarizer and the first coupler. Then the combined waves reach a photodetector. The waves interfer with each other at the photo detector.

The photodetector transduces the light power into a photocurrent. This invention can be applied upon the output of the photodetector.

[Optical Parts ]

Figure 12:
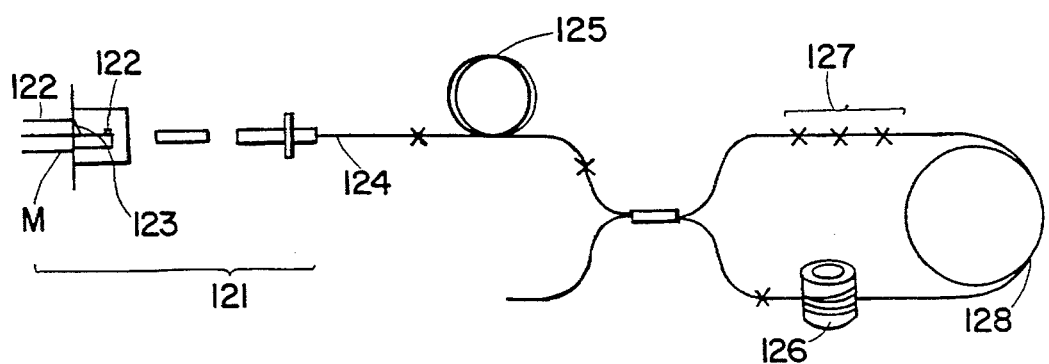
FIG. 12 is a simplified view of a experimental gyroscope for confirming the function of this invention showing the structure of optics of a fiber-optic gyroscope without a photodiode.

As mentioned before, this invention can be applied to the conventional gyroscope of FIG. 11. However, an experiment is carried out by another type of gyroscope demonstrated by FIG. 12. The gyroscope does not have an independent photodetector separated from the light source unlike the gyroscope of FIG. 11. A monolens light source 121 has a superluminescent diode (SLD) 122 and a photodiode for monitoring the light power of the SLD. The SLD emits light in both directions. The light beams emitted from the front end enter an end of a single-mode fiber (SM fiber) 124. The other light beams emitted from the rear end attain the rear photodiode. The light power of the SLD is monitored by the rear photodiode. The driving current is controlled to maintain the light power of the SLD. The SLD package has three pins. One is a ground pin. Another is fan SLD driving pin. The third is an output of the rear, monitoring photodiode. This simple structure of a gyroscope has been invented by the Inventors of this invention. The CW waves and CCW waves return the light source. The returning light varies the driving current, driving voltage of the SLD or the photocurrent of the monitoring photodiode. The gyroscope dispenses with one coupler and a photodiode. The example utilizes a fiber-type polarizer as a polarizer 125. The fiber coil 128 is made from a single mode fiber of a 100 m length radius=75 mm. The fiber is wound around a bobbin with a radius of 75 min. A phase-modulator produced from PZT ( a piezoelectric material 126) is provided in the vicinity of the fiber coil. A depolarizer 127is fabricated by connecting a polarization maintaining fiber of a 1.5 m length to another polarization maintaining fiber of a 3 m length with principal axes inclining at 45 degrees.

In the example, an auto power controlling circuit (APC) is constructed with the SLD, the monitoring photodiode m and the driving circuit. The signal is deduced by an AC coupling from the output of the monitoring photodiode. The AC component extracted out of the photocurrent is such a signal expressed by Eq. (16). In the embodiment, 2.5 V of a DC bias is added to the AC component for improving the matching of the AC signal with the following digital signal processing circuit. Since the digital circuit is driven by a power supply of 5 V, superposition of 2.5 V lifts the zero-point up to 2.5 V, i.e. a half of the source voltage.

Figure 13:
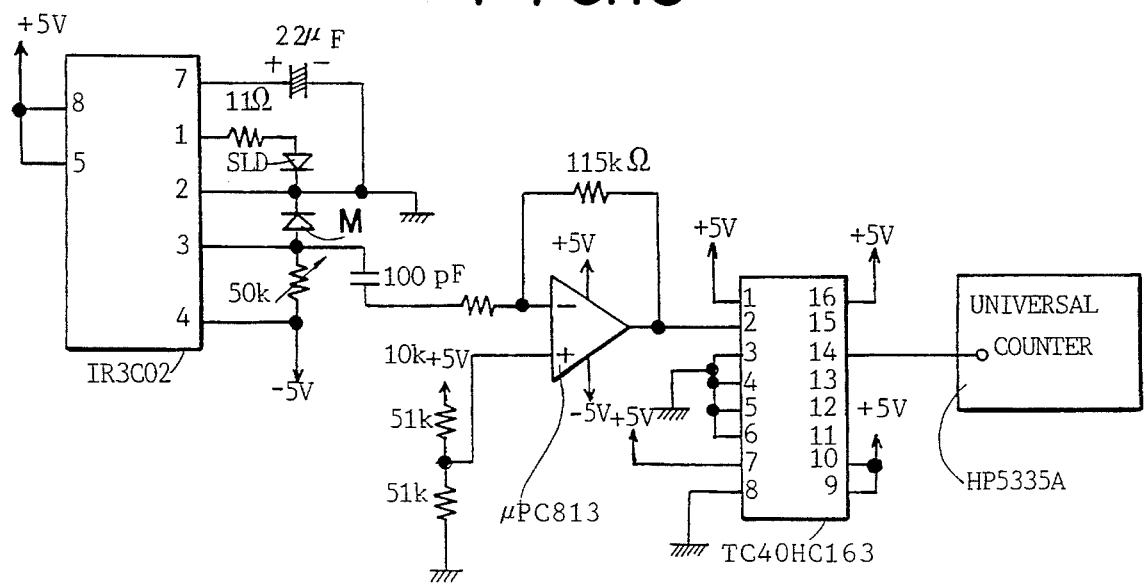
FIG. 13 is an experimental circuit for a zero-crossing detector.

FIG. 13 demonstrates an example of an electric circuit for digital processing the output AC signal. IR3C02 is an IC which drives the superluminescent diode (SLD). The driving IC controls the light lower of the SLD at a constant level by feeding back the photocurrent of the monitoring photodiode m. The monitoring photodiode has two roles. One is a monitor of the power of the SLD. The other is a photodetector of the returning light beams from the fiber coil. The AD component is extracted by a capacitor of 100 pF from the monitoring photodiode. Two resistors of 51 k$\Omega$ are connected In series between the source (5 V) and the ground (0 V). The middle point which is at 2.5 V is connected to a non-inversion input of μ PC813 (an operational amplifier) and the capacitor via a 10 k$\Omega$ resistor for giving them the 2.5 V bias. The capacitor is coupled to an inversion input of μ PC813 via a 1k$\Omega$ resistor. The AC signal of the capacitor is a small signal akin to a sine wave. μ PC813 amplifies the small signal near to saturation. The amp. acts like a comparator. The amplified signal becomes a rectangular wave with a high level and a low level. The high level is around 5 V. The low level is nearly 0 V. The rectangular signal is frequency-divided to half by TC40HC163, a counter. The ½ frequency-divided signal is supplied to HP5335A, a universal counter. The universal counter measures the time durations of two waves included in one period of the phase-modulation. Then the duty ratio $T_1:T_2$ is measured by the counter.

Figure 14:
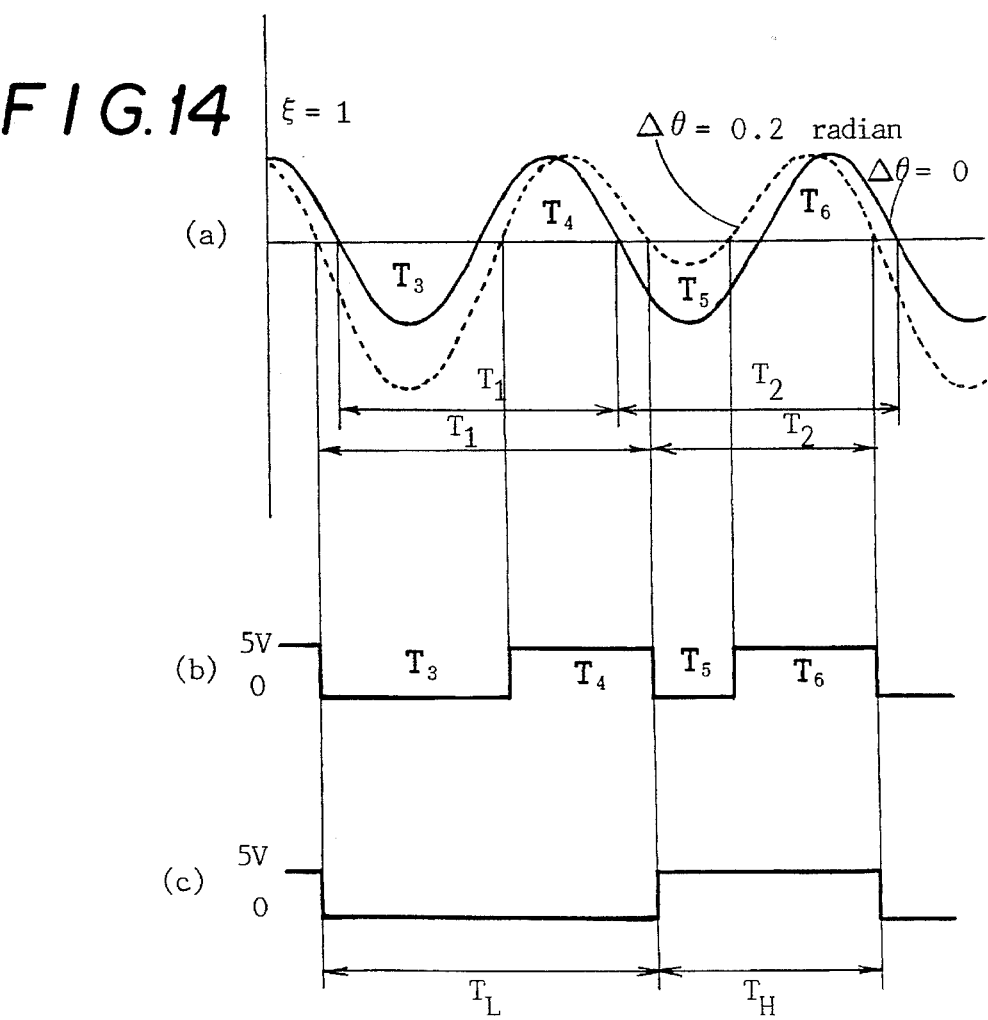
FIG. 14 is wave forms showing the principle of deducing the signal an experimental device when $\Delta\theta=0$ or 0.2 radian for $\xi=1$.

FIG. 14 exhibits the processing of the AC signal. In the example, $\xi=1$ is assumed. However, this circuit is similarly useful for an arbitrary modulation coefficient. FIG. 14($a$) is an original AC signal from the AC coupling (the capacitor). The solid line is the wave at rest ($\Delta\theta=0$). The wave has similar upper half waves and lower half waves. The first interval $T_1$ is defined as a sum of the first lower half wave and the second upper half wave. The second interval $T_2$ is defined as a sum of the third lower half wave and the fourth upper half wave. The sum of $T_1$ and $T_2$ is equal to the period $T_o$ of the phase-modulation, because the AC component takes the form of cos($\xi$cos $\Omega$ t) as a function of t. The second upper half wave is plane-symmetric with the fourth upper half wave, as explained before. When a $\Delta\theta=0$, $T_1=T_2$, as demonstrated by the solid line curve.

The dotted line curve shows a wave form of the general case of a non-zero Sagnac phase difference ($\Delta\theta\neq0$). A positive $\Delta\theta$ pushes down the lower half wave in $T_1$ and pulls up the other lower half Wave in $T_2$. Thus the $T_1$ lower half wave enlarges but the $T_2$ lower half wave diminishes. The upper half waves are left unchanged. The rectangular wave shown in FIG. 14($b$) is obtained by amplifying the dotted curve with a large amplification ratio. The rectangular wave has only two levels. The upper level corresponds to the upper half waves. The lower level corresponds to the lower half waves. A counter divides the rectangular wave by frequency into ½ of the frequency. FIG. 14 (c) is the ½ frequency-divided wave which consists of $T_L$ and $T_H$. $T_L$ is equal to $T_1$. $T_H$ is equal to $T_2$. The difference $(T_1-T_2=T_H-T_L)$ is in proportion to Sagnac's phase difference $\Delta\theta$. A pulse wave is specified by a concept of a duty which is the ratio of the time of H-level to the total of the time. The duty is defined as $T_H/(T_L+T_H)$ for the ½ divided pulse wave of FIG. 14(c). If $T_H=T_L$, the duty is 50%. The 50% duty is equivalent to $\Delta\theta=0$. Thus the deviation of duty D from 50% is another expression of the normalized difference $(T_1-T_2)/(T_1+T_2)$, because $D-0.5=(T_1-T_2)/2(T_1-T_2)$. The deviation of duty from 50% is only half of the normalized difference of the durations $T_1$ and $T_2$. The normalized difference is acquired by multiplying the deviation of duty from 50%.

Figure 15:
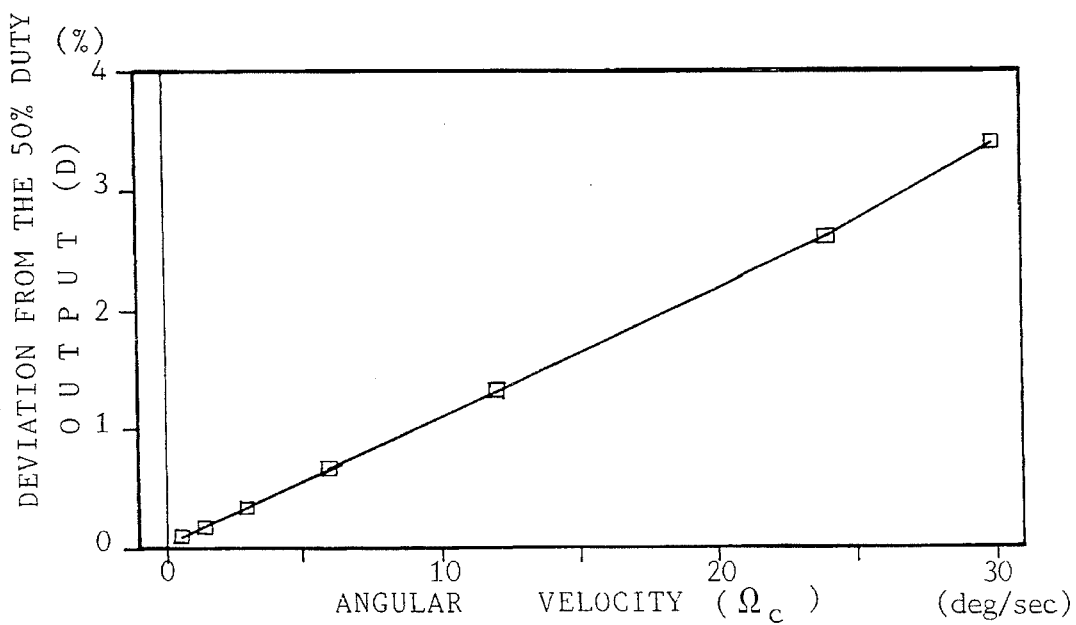
FIG. 15 is a graph of the deviation (%) of tile AC component from the duty 50% as a function of angular velocity $\Omega$ c (deg/sec).

FIG. 15 exhibits the result of measurement of the deviations of duty from 50% in the ½ divided pulse signal as a function of angular velocity $\Omega$ o. The abscissa is the angular velocity in a linear scale. The ordinate is the deviation of duty in a linear scale. The light power at the light source is 1.5 mW. The phase modulation coefficient $\xi$ is 2.3. $\Delta\theta=0.01$ corresponds to $\Omega$ o=1.5 deg/sec in the example. In FIG. 15, the angular velocity $\Omega$ o takes values from 0 to 30 deg/see. The result of the experiment clarifies an excellent linearity of this method as shown by the linearity of scale factor (linearity representation).

Figure 16:
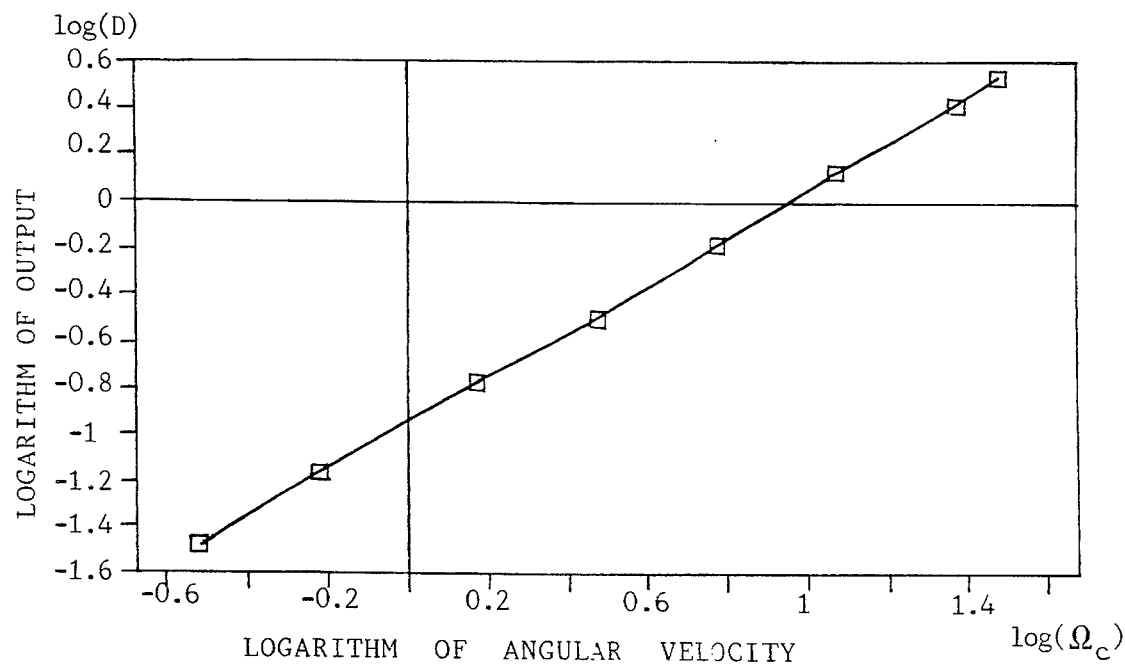
FIG. 16 is a logarithmic representation between the output (D), and the angular velocity ($\Omega$]c).

FIG. 16 shows the same relation between the angular velocity and the deviation of duty from 50% in logarithmic scale. The abscissa is the angular velocity $\Omega$ o in logarithm. The ordinate is the deviation of duty $(D-0.5)\times100\%$ in logarithm. The logarithmic representation also demonstrates well the wide range of linearity between the deviation of duty (D-0.5) and the angular velocity $\Omega$ o.

Figure 17:
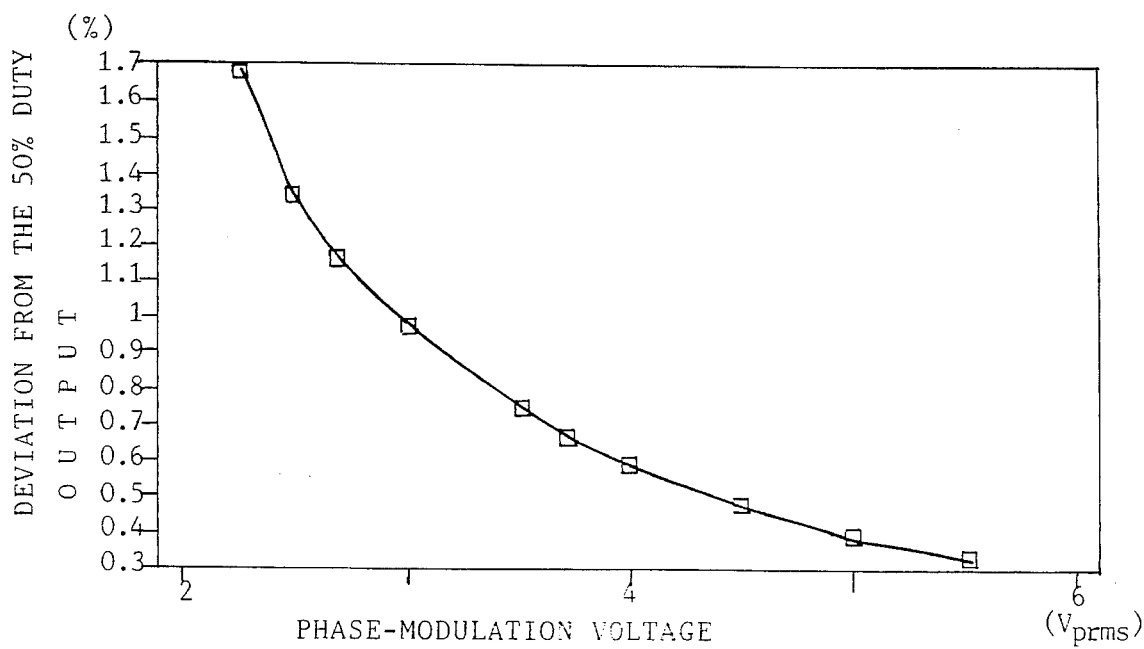
FIG. 17 is a graph showing the relation between the phase-modulation voltage and the deviation of the AC output from the duty 50% at the angular velocity of 6 deg/sec.

FIG. 17 is the graph of experimental results of the deviation Of duty $(D-0.5)\times100\%$ as a function of the phase-modulation voltage (Vprms) at the constant angular velocity $\Omega$ o=6 deg,/see ($\Delta\theta=0.04$ rad). The abscissa is the modulation voltage which is calculated by measuring from the peak to bottom heights anti taking an average of the square of the heights. The ordinate is the deviation of duty. The scale factor SF, i.e. the deviation of duty from 50% varies in accordance with the change of the phase modulation voltage in spite of the same a $\Delta\theta$.

Figure 18:
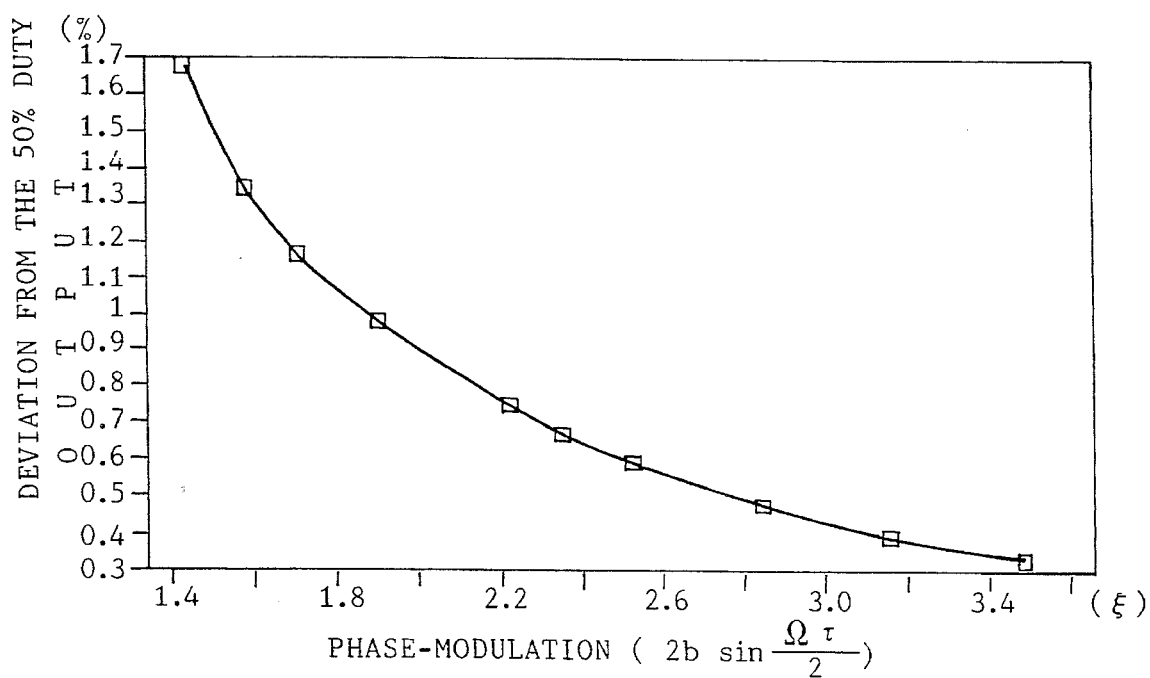
FIG. 18 is a graph representing the relation between the phase-modulation coefficient $\xi$ and the deviation of the output from the duty 50% at the angular velocity of 6 deg/sec.

FIG. 18 is the graph of the same result as FIG. 17. The abscissa is the phase-modulation coefficient $\xi$ instead of the voltage. $\xi=2b\sin(\Omega\tau/2)$. 37 b" is a strength of the phase-modulation. "$\Omega$" is the modulation frequency. "$\tau$" is the time in which light waves pass through the fiber coil.

The modulation voltage is in proportion to the modulation coefficient. The proportion constant includes piezoelectric parameters which cannot be specified clearly without difficulty. Thus the modulation coefficient $\xi$ is identified with 5.2, when the second harmonies vanishes $J_2(5.2)=0$. Thus the modulation coefficient $\xi$ is identified with the voltage applied by the equation of $\xi=5.2$ V/$V_{52}$, where $V_{52}$ is the modulation voltage at the vanishing of the second harmonics.

This invention features the immunity of the scale factor from the fluctuation of the light power. Light power has no influence Upon the measurement of the time durations $T_1$ and $T_2$. This fact enhances the stability of the scale factor to the greatest extent.

Figure 19:
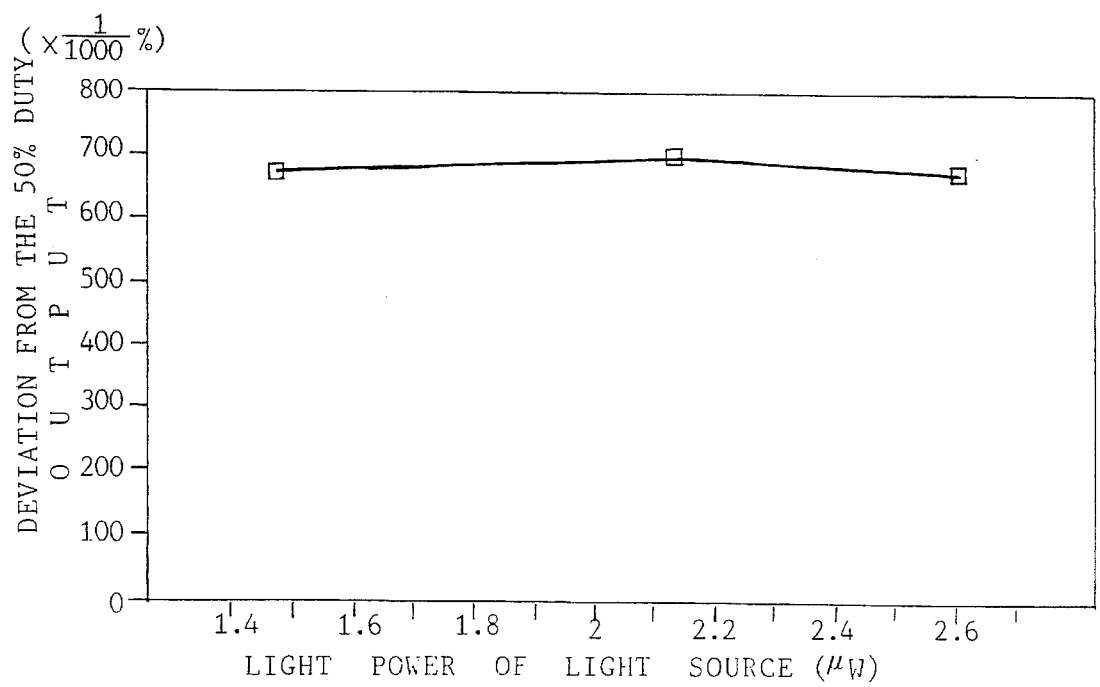
FIG. 19 is a graph showing the relation between the light power and the deviation of the output duty from the duty 50% at the angular velocity of 6 deg/sec.

FIG. 19 is the graph showing the experimental results of the deviation of duty as a function of the change of the power of the light source. The abscissa is the light power (μW) at the light source. The angular speed is 6 deg/sec in common. The change of the light plower causes no variation of the deviation of duty, i.e. the scale factor. The scale factor is independent of the strength of the light power.

[PROBLEM OF NOISE]

Figure 20:
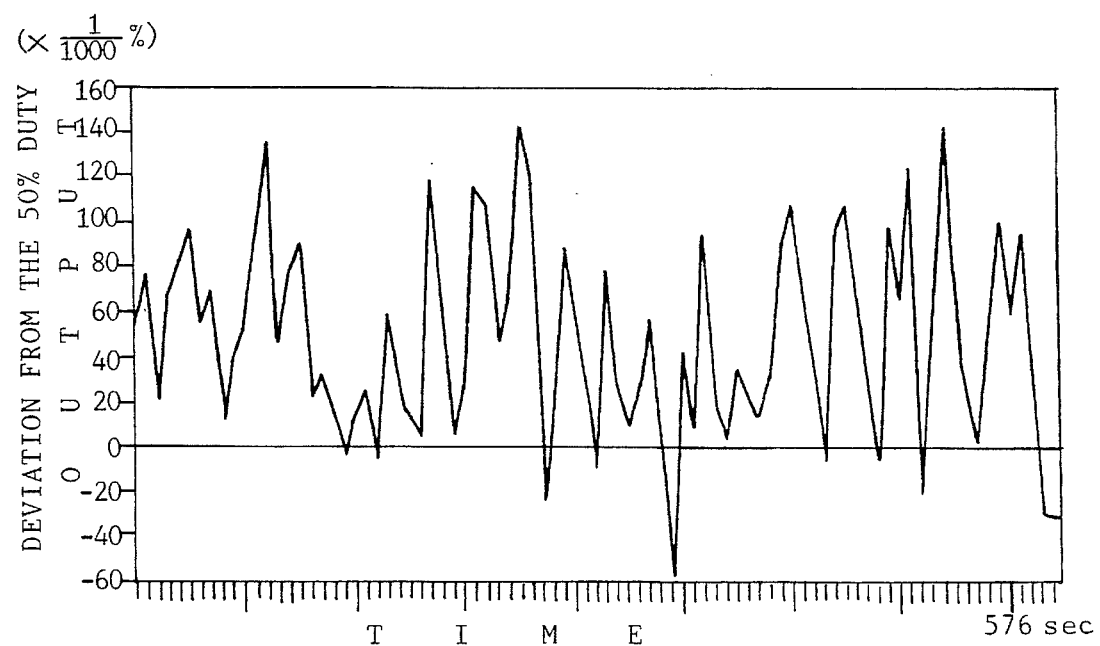
FIG. 20 is a graph showing a noise wave at rest in the deviation of the AC output from the duty 50% at the light power of 4mW and with the sample number N=100 for taking an average thereof.
Figure 21:
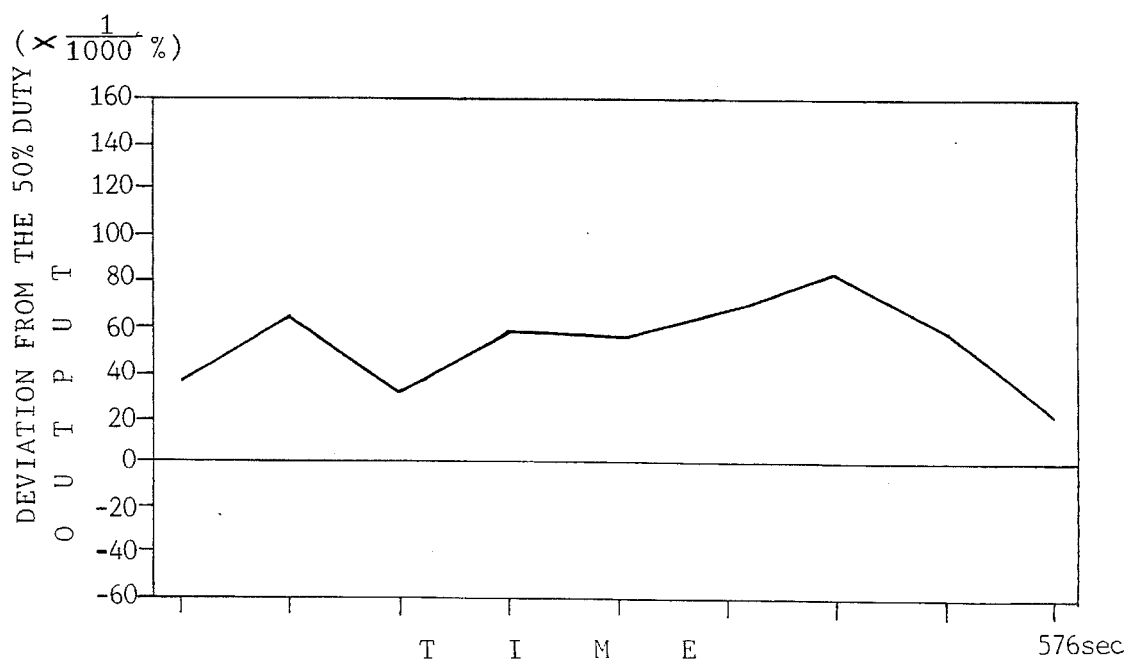
FIG. 21 is a graph showing a noise wave at rest in the deviation of the AC output from the duty 50% at the light power of 4mW and with the sample number N=1000 for taking an average.
Figure 22:
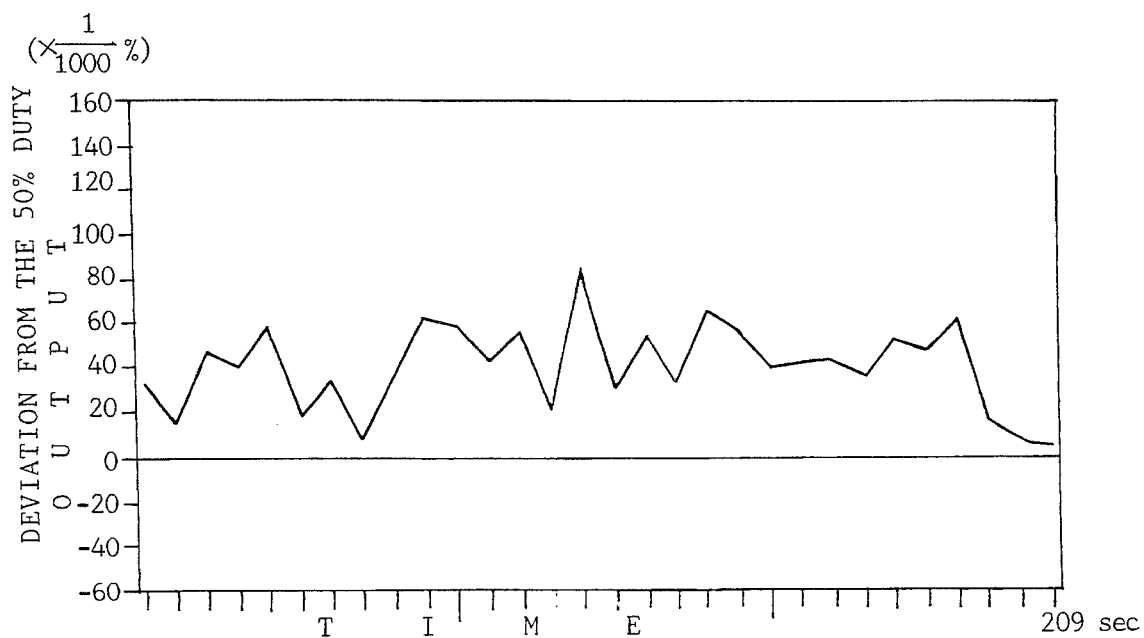
FIG. 22 is a graph representing a noise wave at rest in the deviation of the AC output from the duty 50% at the light power of 2mW and with the sample number N=100 for taking an average.
Figure 23:
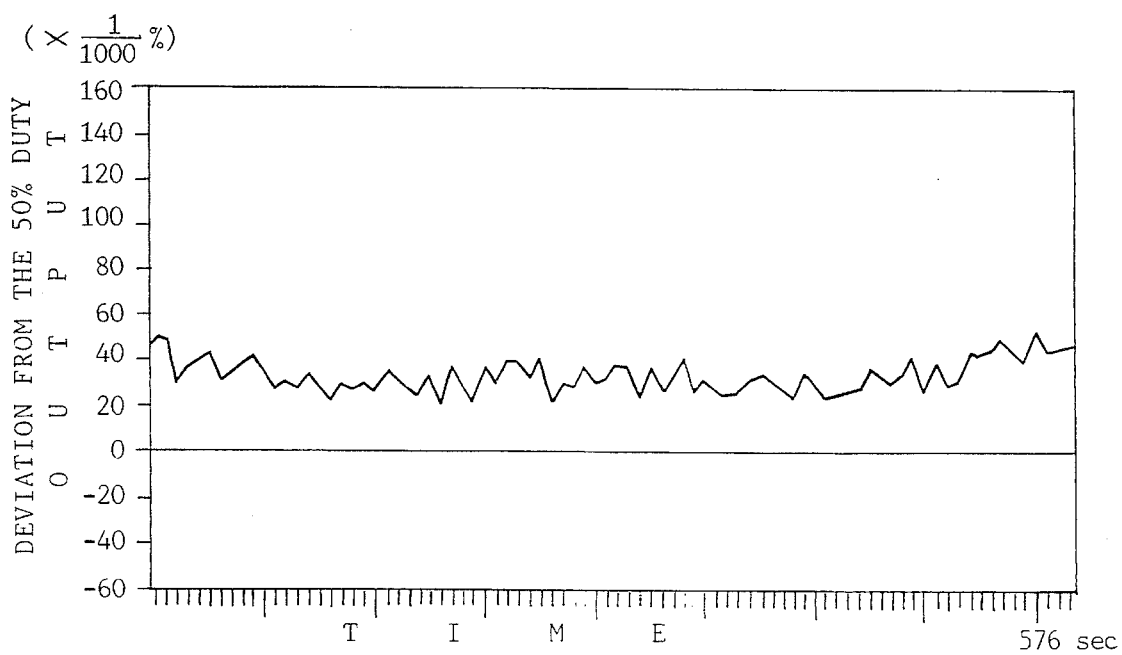
FIG. 23 is a graph showing a noise wave at rest in the deviation of the AC output from the duty 50% at the light power of 1.5mW and with the sample number N=100.
Figure 24:
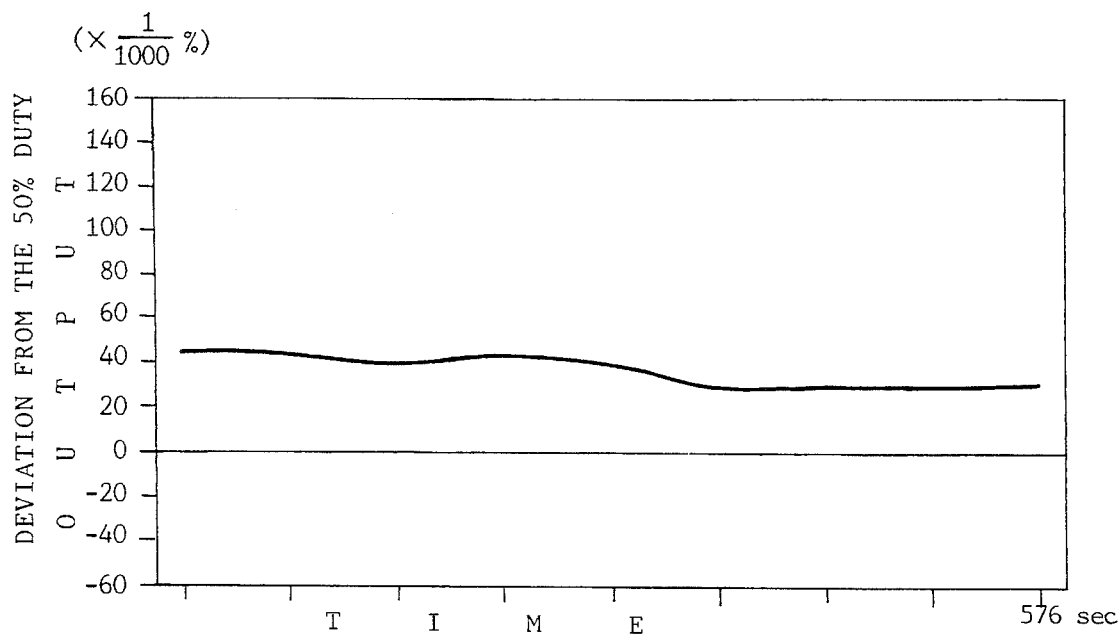
FIG. 24 is a graph showing a noise wave at rest in the deviation of the output from the duty 50% at the light power of 1.5 mW and with the sample number N=1000.
Figure 25:
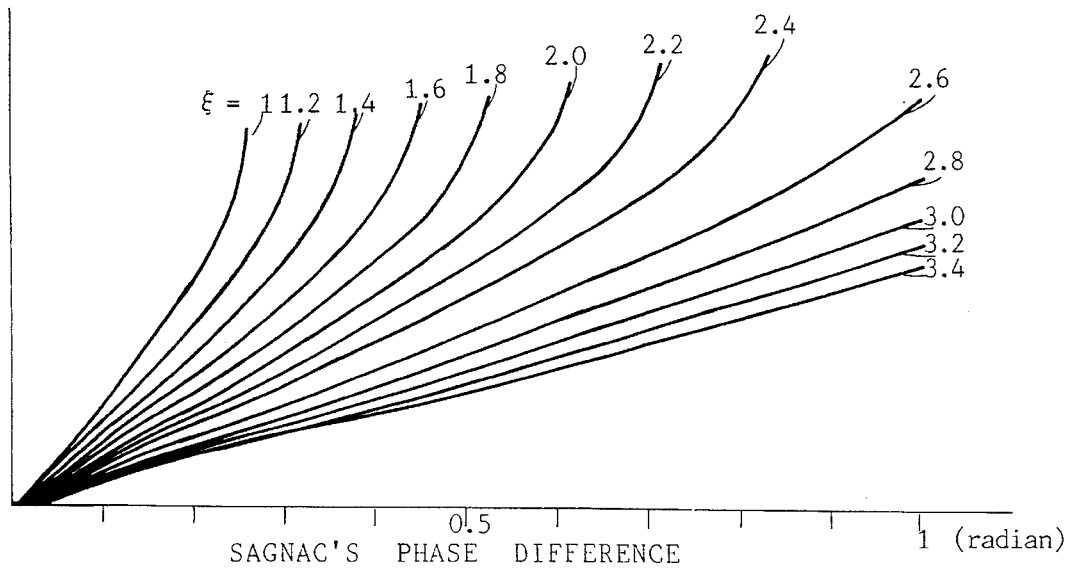
FIG. 25 is a graph expressing the deviation of the AC component from the duty 50% for different $\xi$ s as a function of $\Delta\theta$. That is.

FIG. 20 to FIG. 24 show the noise in the signal (deviation of duty) on the gyroscope at rest ($\Omega$ o =0). The abscissa is the time. The ordinate is the deviation of duty from 50% in 1/1000 scale. The data of FIG. 20 and FIG. 21 are measured at the light power of 4 mW. The data of FIG. 22 are measured at the light power of 2 mW. The data of FIG. 23 and FIG. 24 are measured at 1.5 mW. FIG. 20, FIG. 22 and FIG. 23 taken an average of 100 data in every 7.2 sec. 80 average values are denoted in the figures. The right end indication 576 see means the 80-th average (576 sec=7.2 sec×80). FIG. 21 and FIG. 24 demonstrate the result of taking an average of 1000 data in every 72 sec.

Table 1 shows the noise level at the light power 4.0 mW, 2.0 mW or 1.5 mW for the data number for averaging of N=100 or N=1000. The noise level is measured by the peak to peak (or peak to bottom) values. The root mean square (rms) of the noise is converted to the angular velocity (deg/sec). For the strong light source of 4.0 mW, the noise level is 1.7 deg/sec for taking an average of 100 data in 7.2 sec. This is a big noise. The noise is 0.7deg/sec for the light power of 2.0 mW. The noise is reduced to 0.25 deg/sec by decreasing the light power to 1.5 mW.

TABLE 1

| NOISE LEVEL OF GYROSCOPE AT REST | | |
|---|---|---|
| | NUMBER OF AVERAGE | |
| LIGHT POWER | N = 100 | N = 1000 |
| 4.0 mW | 1.7 deg/sec | 0.7 deg/sec |
| 2.0 mW | 0.7 deg/sec | — |
| 1.5 mW | 0.25 deg/sec | 0.06 deg/sec |

Figure 26A:
FIGS. 26A and 26B are wave forms explaining the difference of the phase errors due to digitalization for a low signal level and for a high signal level an analog signal being digitalized.
Figure 26B:
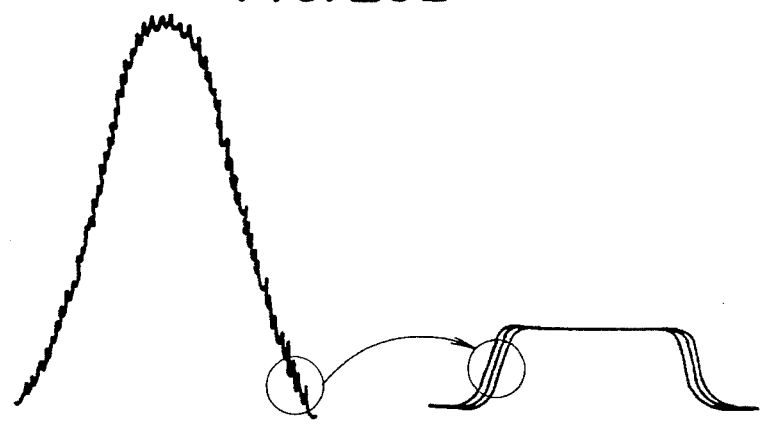

Comparison of the date of the cases of N–100 and N=1000 reveals the proportional decrease of the noise level to $N^{-1/2}$. Furthermore, the stronger the light power increases, the larger the noise level enhances. The noise level dependence on the light power will now be explained by referring to FIGS. 26A and 26B which provide a relation between signal level and digitalized signal. The light signal from the optical parts includes noise. FIG. 26 demonstrates signals with small noise. The noise increases in proportion to the signal. The upper one has a small signal level. The noise is also small. The analog signal is converted into a digital signal without ambiguity. The lower one has a big signal level. The noise grows also. The large noise blurs the timing of zero-crossing due to the jitters at the analog-digital conversion. The fluctuation of the rising points or falling points causes errors in measuring the duration $T_1$ or $T_2$. Since the S/N ratio is not changed in two cases, the noise growth incurs no serious problem in the conventional synchronous detection method. However, the large noise level causes difficulties in the method of this invention, because this method starts to count the time durations $T_1$ and $T_2$ from the zero-crossing points. The noise induces the fluctuation of the zero-crossing points. Thus too strong light source is disadvantageous for this invention in contradiction to the synchronous detection method. Then the light power shall be determined to an appropriate, not too strong power. Preferably the light power should be controlled by a feedback of the output of the monitoring photodiode.

Figure 27:
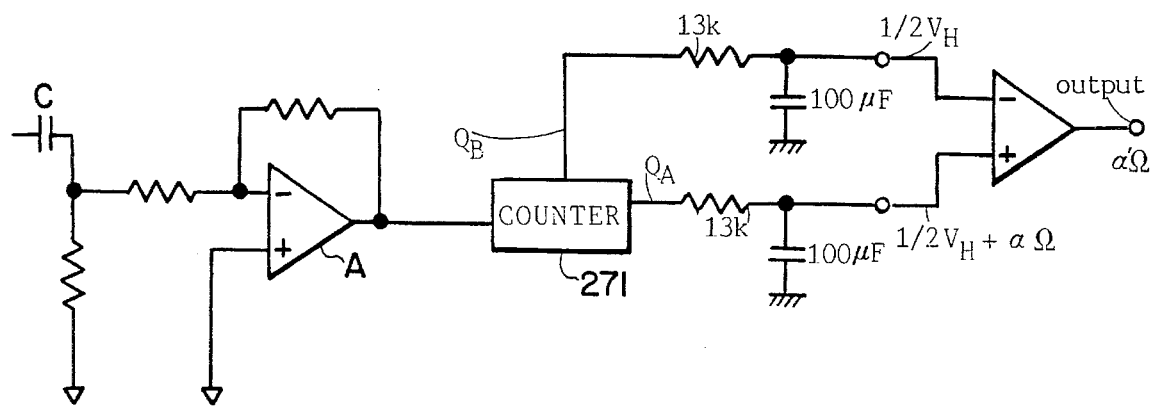
FIG. 27 is a drawing of an electric circuit for measuring the time a, zero-crossing.
Figure 28A:
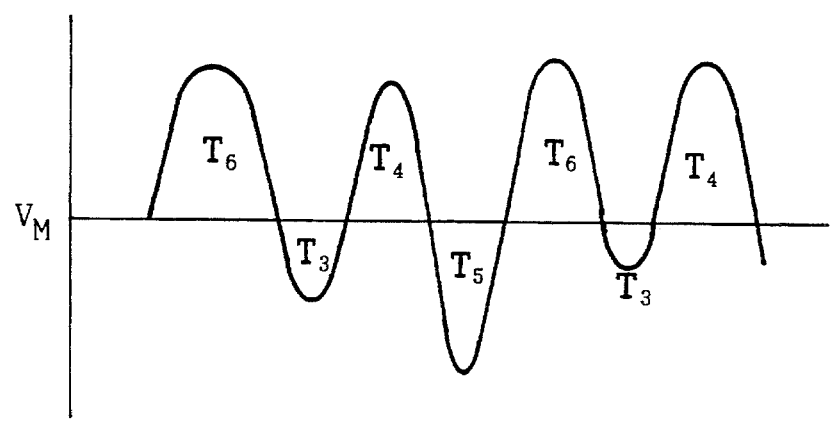
FIGS. 28A–28D are wave forms at terminals of the circuit of FIG. 27.
Figure 28B:
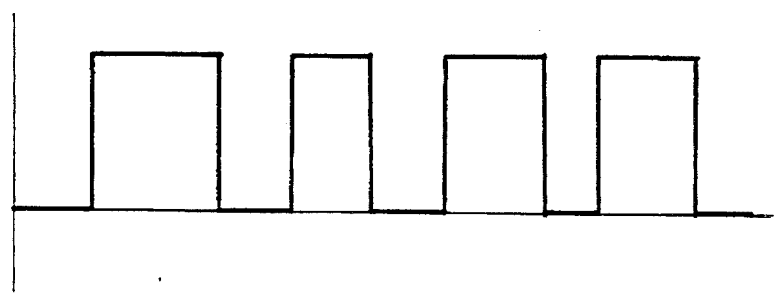
Figure 28C:
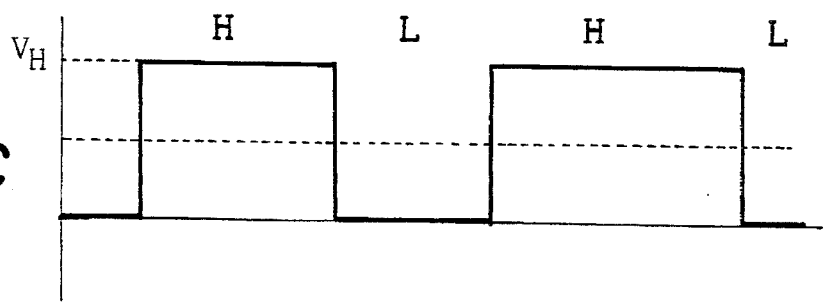
Figure 28D:
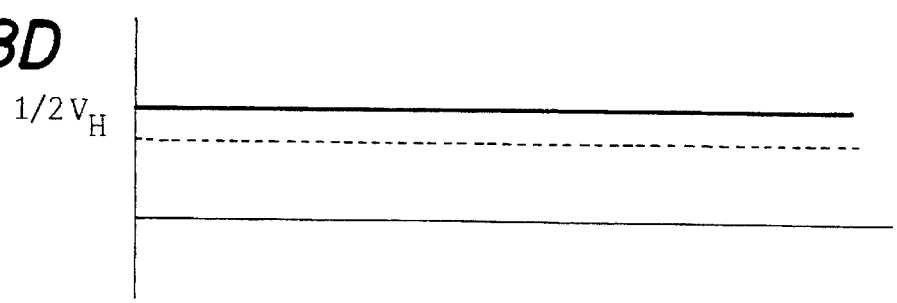
Figure 29:
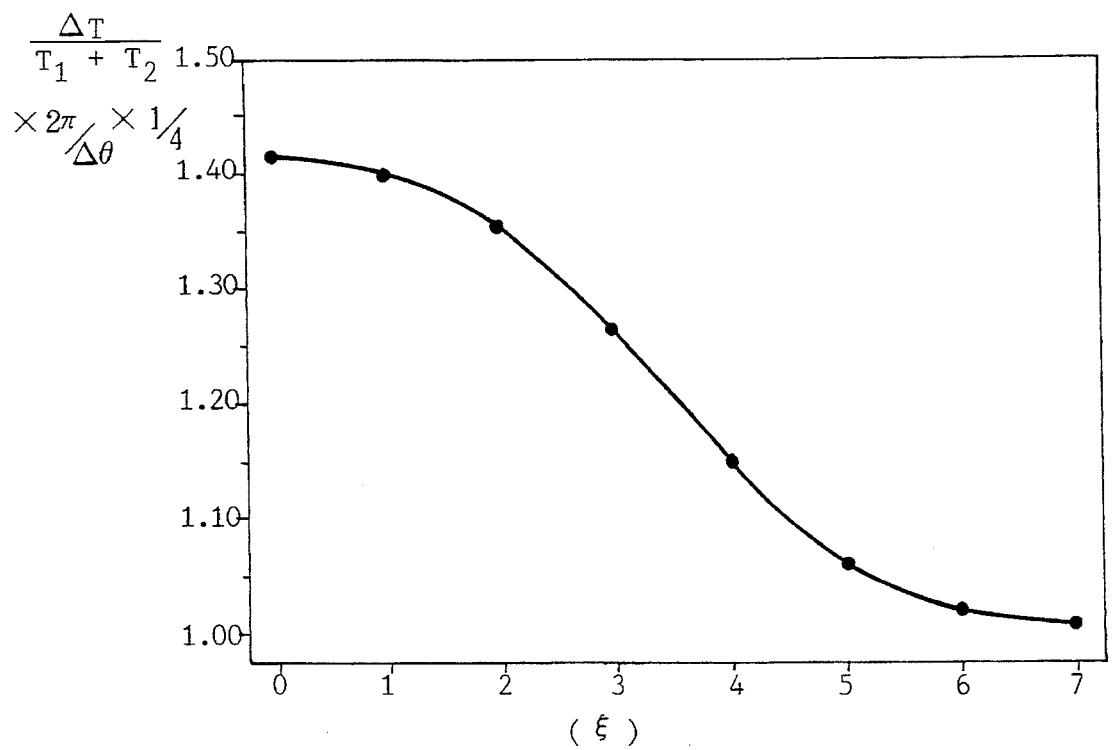
FIG. 29 is a graph showing the relation between the phase-modulation coefficient $\xi$ ($\xi$=0 to 7) and the scale factor on theory.

The next problem is an electric circuit for counting the pulse width of $T_1$ or $T_2$ for determining the angular velocity. FIG. 27 is an example of the processing circuit. The front half part is similar to FIG. 13. A capacitor C cuts the DC component. An amplifier A plays a role of a zero-crossing detector by changing the quasi-sine wave to a rectangular, pulse wave. A counter 271 divides the rectangular, pulse wave by frequency into ½ frequency pulse waves. The frequency-division is done for two waves. One $Q_A$ is a signal pulse. The other $Q_B$ is a 50% duty, regular pulse. The former output $Q_A$ is integrated by a 13k$\Omega$ resistor and a 100 mF capacitor. The latter one $Q_B$ is also integrated by the similar circuit. An amplifier substitutes the integrated $Q_B$ from the integrated $Q_A$. The result is designated by $\alpha'\Omega$ o. Thus the angular velocity $\Omega$ o is determined. FIGS. 28 A–D shows the wave forms at the parts of FIG. 27. FIG. 28A is the AC component. FIG. 28B is the rectangular wave form. FIG. 28C is the frequency-divided wave. FIG. 28D is the integrated wave.

[CLOCK PULSE FOR COUNTING]

Figures 30A, 30B, 30C, 30D, 30E:
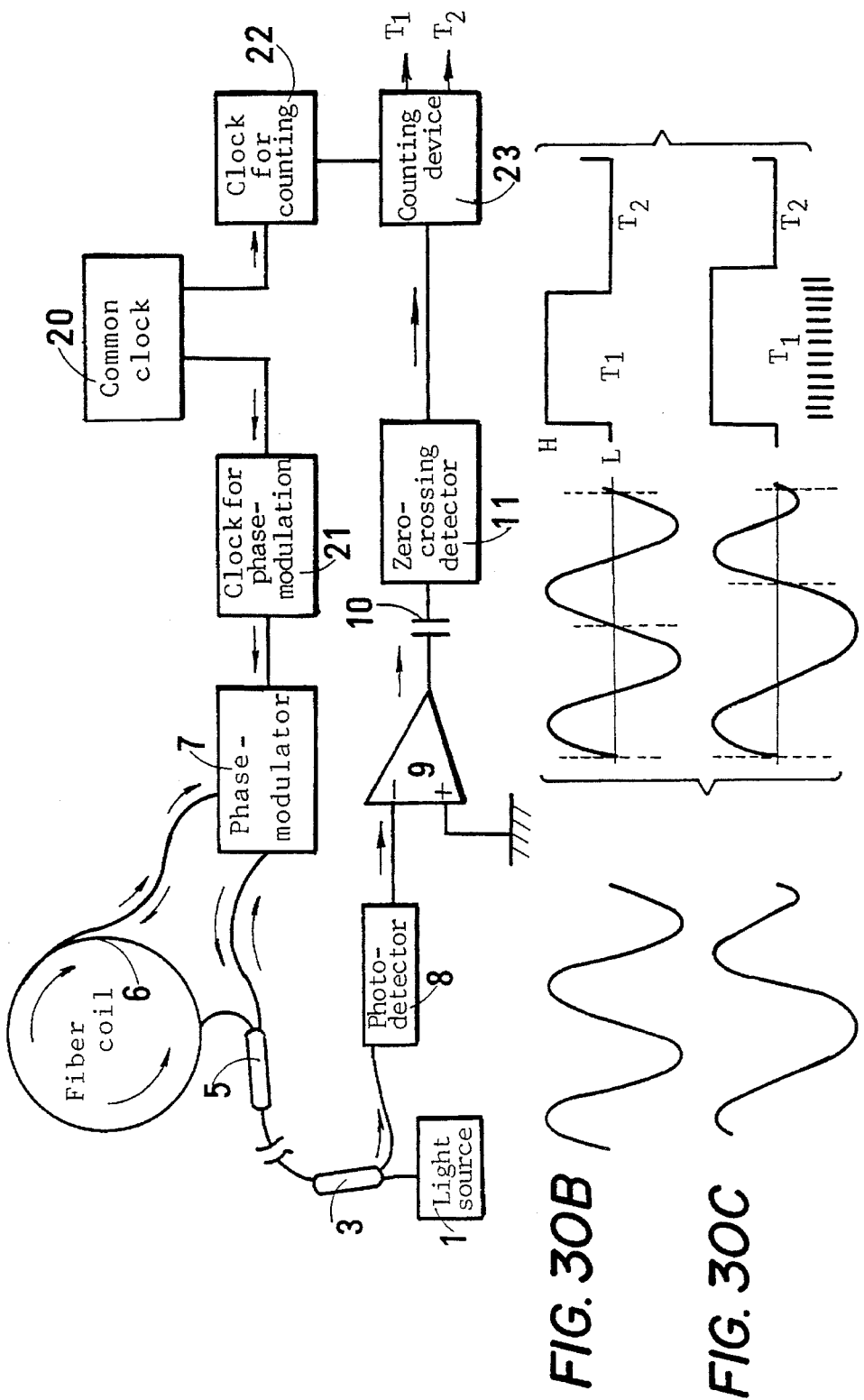
FIG. 30A is a schematic view of a fiber-optic gyroscope of an embodiment using a common clock both for the phase modulation and for the measurement of the time durations $T_1$ and $T_2$.
FIGS. 30B–30E sow relationships of input ant output waves at rest and in rotation.
Figures 32A, 32B, 32C, 32D, 32E:
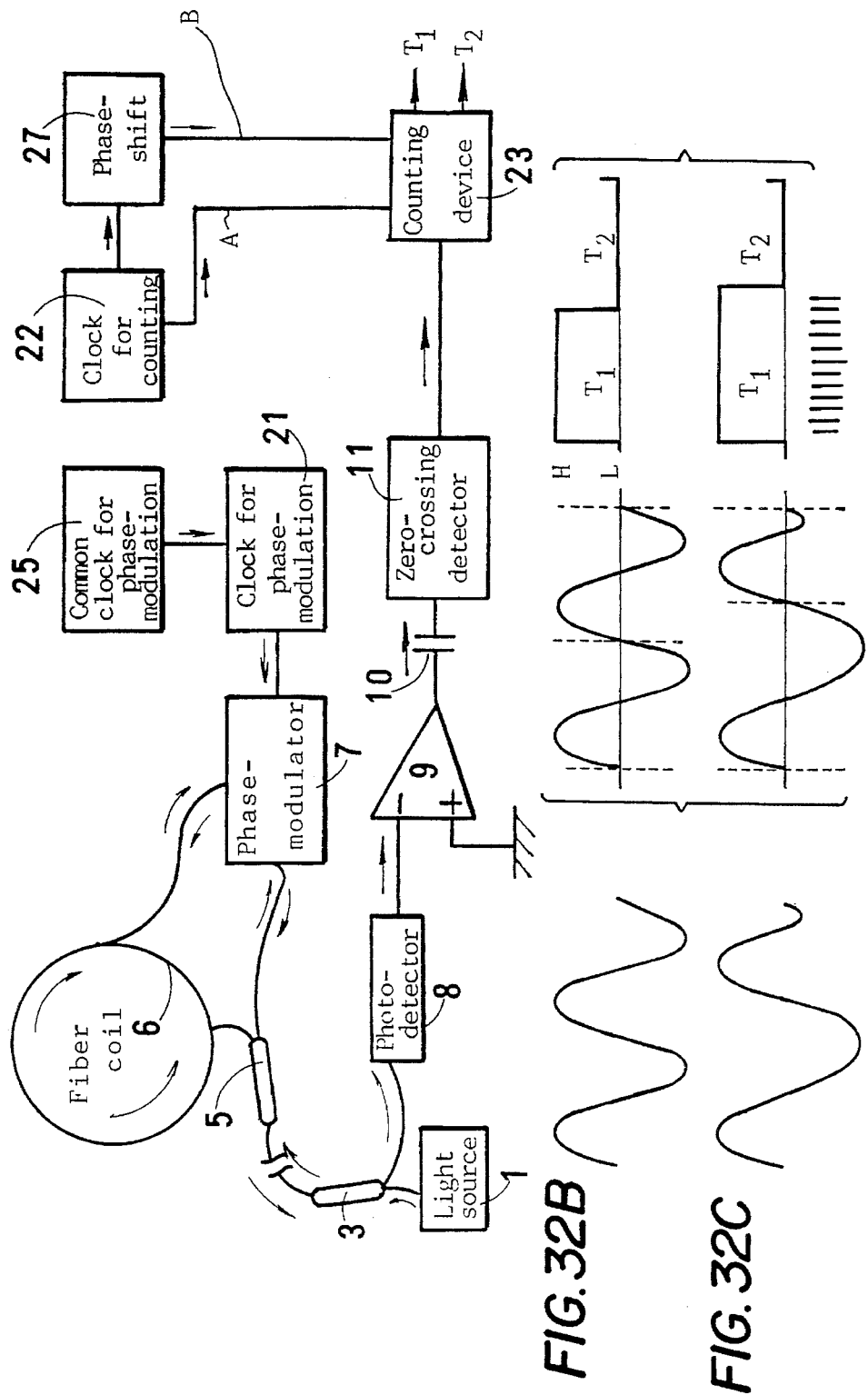
FIG. 32A is a schematic view of a fiber-optic gyroscope of another embodiment using two clocks with different phases for the measurement of the time durations $T_1$ and $T_2$.
FIGS. 32B–32E show relationships of input and output waves at rest and in rotation.

An embodiment will be explained for clarifying the measurement of the durations $T_1$ and $T_2$ by an appropriate clock pulse. FIG. 30A is the schematic view of such a fiber-optic gyroscope having a counting circuit by clock pulses. The embodiment uses a fundamental clock both for the phase modulation clock and the counting clock. The fundamental clock (20) is frequency-divided into a phase-modulation clock (21) and a counting clock (22). A phase-modulator (7) is driven by the phase-modulation clock (21). The phase-modulator (7) oscillates in $\sin\Omega$ t. A light source (1) emits light beams. The light waves travel through fiber couplers (3) and (5) and spread clockwise and counterclockwise in a fiber coil (6). The CCW and CW waves are modulated by phase at different times. The CW and CCW waves interfer at a photodetector (8), carrying the i influence of the phase modulation. The common clock type is also applicable to the gyroscope of FIG. 12 which does without a separated photodetector.

When the fiber coil is rotating, Sagnac's phase difference originated between the CW and CCW waves. Bringing the phase difference, the CW and CCW waves attain the photodetector (8). The CW and CCW wave packets interfer at the photodetector. The photocurrent is converted into a voltage signal by a preamplifier (9). A capacitor (10) extracts only the AC component, eliminating the DC part. The zero-crossing detector (11) detects the timing of crossing the 0-level upward (or downward). The timing is input to a counting device (23). Then the counting device starts to count clock pulses.

The waves shown in FIGS. 30B and 30C are the wave forms of the photo current of the photodetector and the output of the zero-crossing detector at rest and in rotation, respectively. FIGS. 30D and 30E show the corresponding input and output waves, respectively. A clock signal is shown at the bottom of FIG. 30E for counting. The zero-crossing detector raises the output when the input crosses the 0-level upward at the first time, and drops the output when the input crosses the same level at the second time. Thus the output rises at the beginning of $T_1$ and fails at the beginning of $T_2$ in every period $T_o$ of the phase-modulation. The output takes the H-level (high voltage) in $T_1$ and the L-level (low voltage) in $T_2$. The output of the zero-crossing detector will sometimes be called a "$T_1$–$T_2$ pulse" for simplicity because it consists of the $T_1$ H-levels and the $T_2$ L-levels.

When the fiber coil is at rest ($\Omega$ o=0), the lower half waves are the same as the upper half waves in length and $T_1$ is equal to $T_2$. When the fiber coil is rotating, the lower half waves deform. The lengths of the lower half waves become different for the $T_1$ and $T_2$ waves. One lower half wave decreases but the other lower half wave increases. $T_1$ deviates from a half of the modulation period $T_o=2\pi/\Omega$. Since the period $T_o$ of the modulation is exactly predetermined, the independent variable Is only one. Measurement of $T_1$ teaches the time length of $T_2$. Similarly $T_1$ may be determined by measuring $T_2$. Otherwise more exact result will be obtained by measuring both $T_1$ and $T_2$ and taking an average of $T_1$ and $(2 \pi/\Omega)$–$T_2$. The counting device (23) outputs $T_1$ and $T_2$.

The most precise measurement will be accomplished by the method of counting the durations by counting clock pulses. The error is 'smaller than one clock period (the inverse of the clock frequency). The higher the frequency of the clock pulse is, the more precise the measurement result becomes.

Figure 35:
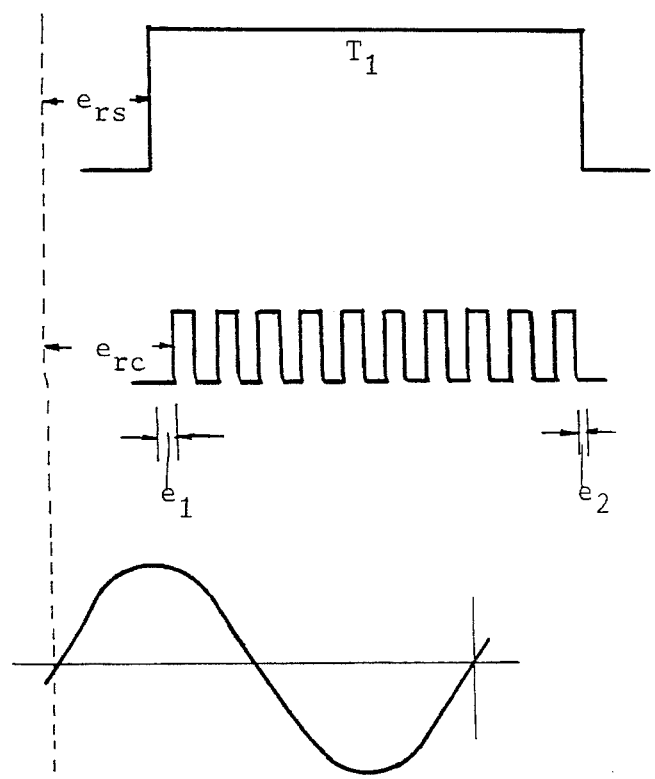
FIG. 35 is wave forms of the output of the zero-crossing detector, the clock signal and the phase-modulation wave for defining the initial gap $e_1$ and the final gap $e_2$ between the clock pulse and the timing pulse $T_1$.

On the contrary, when the clock pulse has a low frequency, and a small number of clock pulses are included in $T_1$, the time measurement will be plagued by an error which is not negligibly small. In the case of FIGS. 30A–30E which makes use of a common fundamental clock for counting and modulating, the delay from the rise of $T_1$ pulse to the first counting clock pulse is always constant. The constant delay is likely to accumulate the error by the repetition of measurements. FIG. 35 clarifies the accumulation of errors. The bottom sine wave is the phase-modulation signal. The middle shows a clock signal for counting and the top shows the output of zero-crossing detector. The zero-crossing detector starts the $T_1$ pulse at the delay time $e_{rs}$ from the zero-cross of the sine wave. The counting device begins to count the clock pulses with a delay $e_1$ at the rise of $T_1$ and stops counting at the fall of $T_1$. "$e_2$" is a short fraction of time from the end of the clock pulse to the fall of $T_1$. FIG. 30 employs a common, fundamental clock which originates both the modulation Clock and the counting clock by appropriate frequency divisions. The commonality keeps the delays $e_{rs}$ and $e_{ro}$ constant in any cases. Thus the front delay $e_1$ in $T_1$ is also constant, because $e_1=e_{ro}-e_{rs}$. If the front delay $e_1$ took random values less the half of a clock period, errors would cancel each other and the cancellation would lead to a more precise result by the random phase effect. Since FIG. 30 fixes the delay $e_1$ at a constant, the errors are simply accumulated for a lower frequency of the counting clock.

Figure 36:
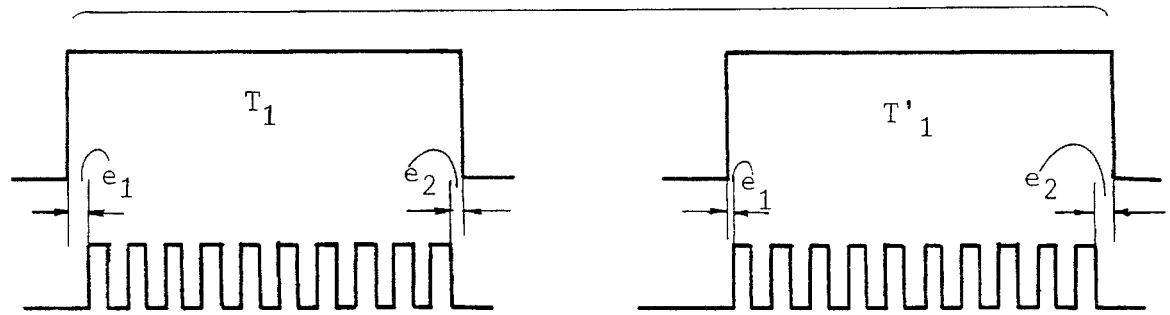
FIG. 36 is explanatory figures for showing the random lengths of the gaps $e_1$ between the rising edge of $T_1$ pulse and the first clock pulse, and the random lengths of the gaps $e_2$ between the final clock and the falling edge of $T_1$, values $e_1$ and $e_2$ varying at each period of $T_1$.

FIG. 31A gives an improvement for the problem. The gyroscope oscillates two different clocks for counting and modulating. A fundamental clock (25) for phase-modulation is frequency-divided into the phase-modulation clock (21) which drives the phase-moldulator (7). Another fundamental clock (26) for counting is Produced by another oscillator. The fundamental clock (26) for counting is frequency-divided into the counting clock (22). The counting clock is introduced into the counting device (23). There is no time correlation between two fundamental clocks. The phase delay between two clocks is entirely at random. The delay $e_1$ from the rise of $T_1$ to the start of the first counting pulse becomes random in FIG. 35. The delay $e_1$ freely changes at every cycle of the phase-modulation. FIG. 36 shows the random $e_1$ and $e_2$ for different cycles. The delay $e_1$ is a probability variable in FIG. 31A. The errors due to the delay $e_1$ cancel each other. Summing and averaging of the counting data allow the gyroscope to enhance the accuracy. Since the delay $e_1$ varies at random, the error due to the delay decreases in accordance with an increase of the number of the data to be summed or averaged. FIGS. 31B–31E show relationships similar to those shown by FIGS. 30B–30E.

Figure 37A:
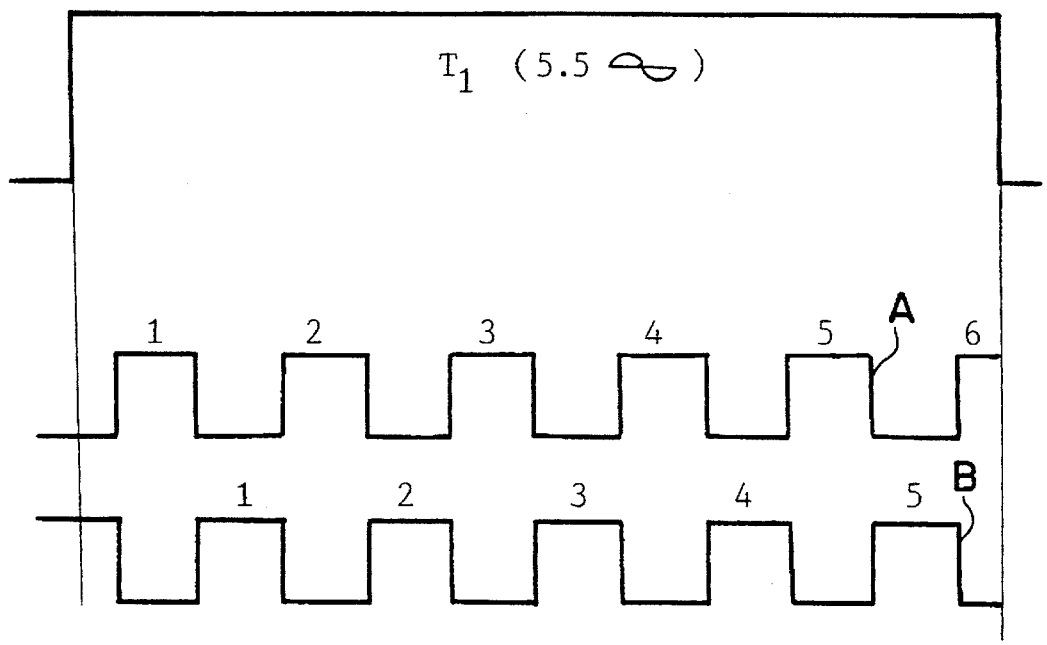
FIGS. 37A and 37B are wave forms showing the probability of higher precise measurement by two clock pulses with different phases.
Figure 37B:
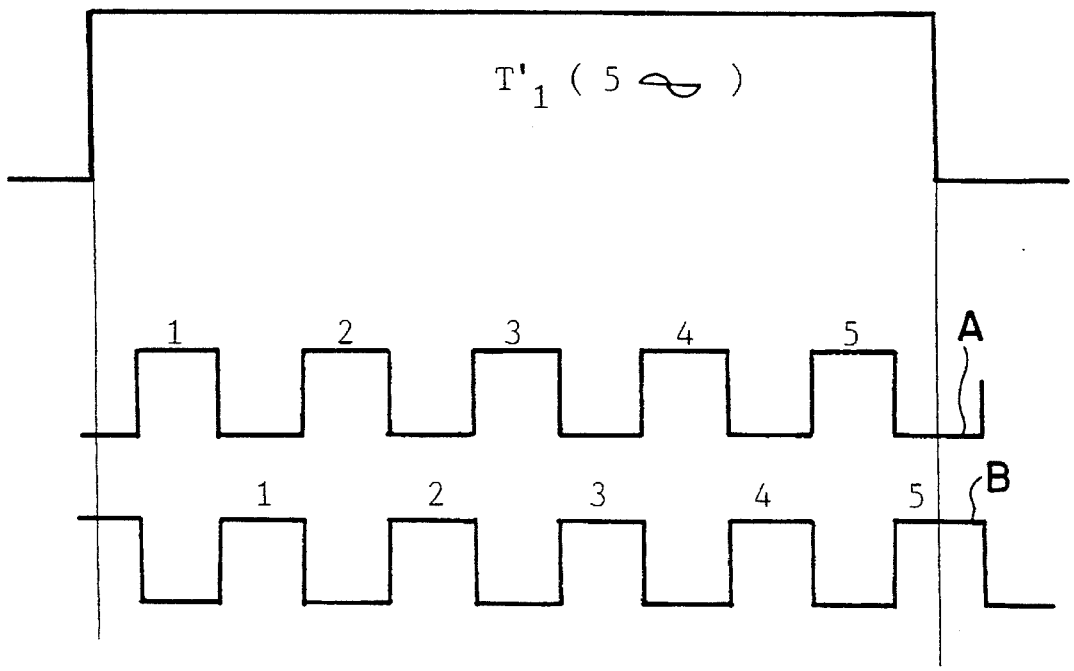

Only one kind of counting pulses is employed to measure the time length of $T_1$ or $T_2$ in the gyroscopes explained so far by FIGS. 30A–30E and FIGS. 31A–31E. The precision will be further enhanced by adopting two kinds of counting pulses. FIGS. 32A–32E designates such an embodiment. Two basic clocks are produced by two oscillators. One is a basic clock for phase-modulation. The other is another basic clock for counting. The latter clock is frequency-divided into the counting clock (22). The counting clock is called clock A. The counting clock (22) is treated by a phase-shifter (27). Another phase-shifted clock is obtained. This is called clock B. Preferably the phase shift is around 180 degrees. Clock A and clock B have the same repetition rate (frequency) but have different phases. The length of $T_1$ (or $T_2$) is measured both by clock A and clock B. Average or sum of the count by clock A and the count by clock B gives a more precise length of $T_1$ (or $T_2$) than the single clock counting. Utilization of two kinds of clocks with different phases heightens the accuracy of time measurement. FIGS. 37A and 37B demonstrates the complementary function of clock A and clock B. The upper $T_1$ duration includes six clock pulses A and five clock pulses B. Thus the upper $T_1$ has a length of 5.5 clock pulses by averaging pulses A and pulses B. If $T_1$ were measured by a single clock, $T_1$ would be designated to five or six. The lower $T_1'$ pulse is slightly shorter than $T_1$. Five clock pulses A are contained in $T_1'$. Five clock pulses B are also contained in $T_1'$. $T_1'$ is identified with a 5 clock length. $T_1'$ differs from $T_1$ only by half a clock pulse. In the multi-clock systems like that shown in FIG. 32A, the accuracy will be further improved by repeating counting of $T_1$, and summing the counts or taking an average of the counts.

Figure 33A:
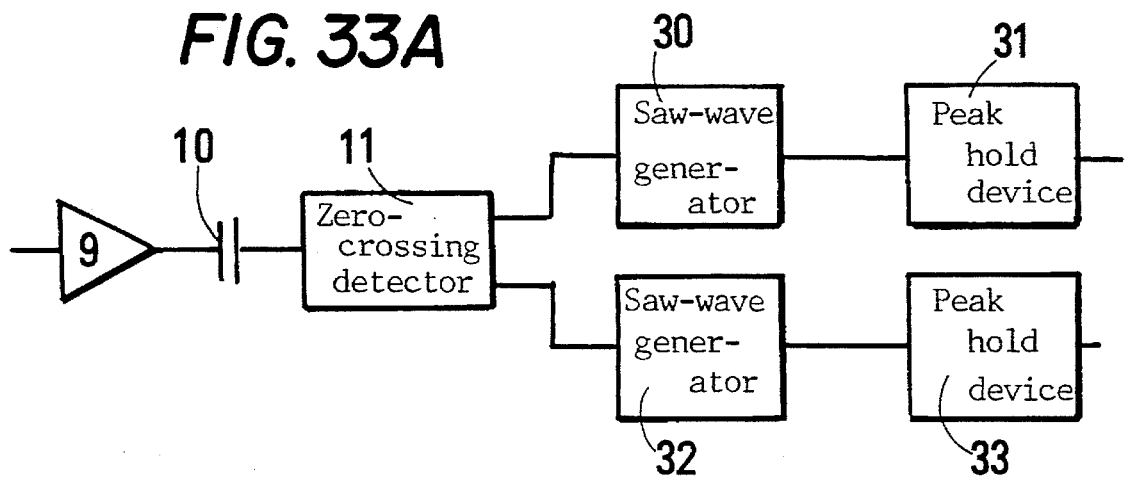
FIG. 33A is a schematic view of an electric circuit and the wave forms of the circuit which originates a saw-wave in the term $T_1$, $T_2$ or both in the terms $T_1$ and $T_2$, and measures the time difference between $T_1$ and $T_2$ by the final voltages of the saw-waves.

The time duration $T_1$ or $T_2$ can be also measured by analog methods instead of the digital methods by clocks which have been explained so far. For example, a method which measures the time length by saw-wave generation is shown in FIG. 33A.

Figure 33B:
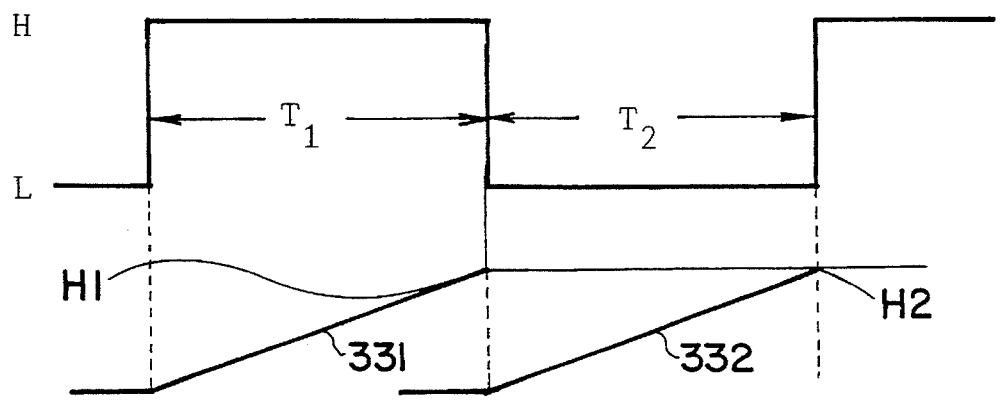
FIGS. 33B and 33C respectively show the saw wave generated at rest and in rotation relative to the input wave.
Figure 33C:
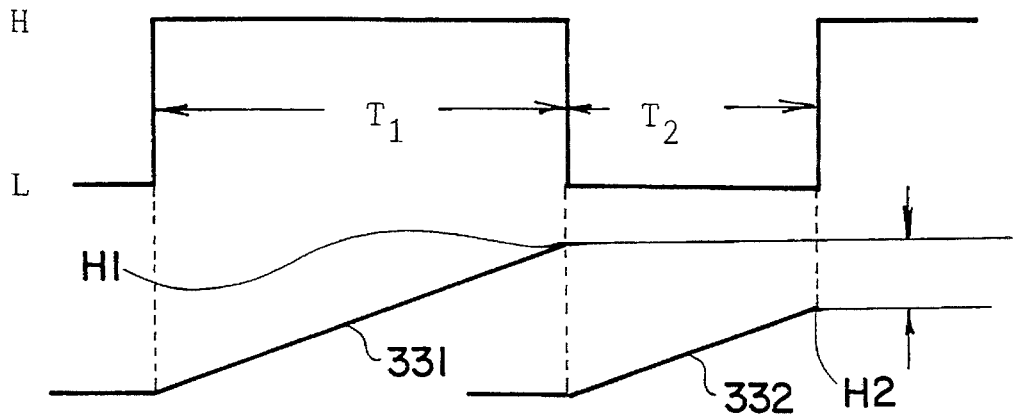

Synchronizing with the rise or fall of the $T_1$ pulse or $T_2$ pulse, a saw-wave generator (30) or (32) generates a saw-wave which raises voltage in proportion to time, i.e. V=kt. At the rise of $T_1$, the saw-wave generator (30) starts the generation of a saw-wave (or ramp wave) and raises the voltage in proportion to time during $T_1$. The voltage at the fall of $T_1$ is held by a peak-hold circuit (31). The saw-wave generator (30) is reset then. At the fall of $T_1$ (=beginning of $T_2$), the other saw-wave generator (32) starts the generation of another saw-wave and raises the voltage in the same proportion to time during $T_2$. The voltage at the end of $T_2$ (=rise of the next $T_1$ pulse) is kept by another peak-hold circuit (33). The final voltages signify the lengths of $T_1$ and $T_2$. The difference between two final voltages is proportional to ($T_1-T_2$). Similar way can be applied to the time measurement of $Q_1$ and $Q_2$ ($Q_1=T_4+T_5$, $Q_2=T_3+T_5$) for calibrating $\xi$. FIGS. 33B and 33C respectively show the wave generated at rest and in rotation relative to the input signals those figures showing saw-wave 1 (331) and saw-wave 2 (332) as well as first and second hold points (H1 and H2) relative to the falling edges of the input signal.

Figure 38A:
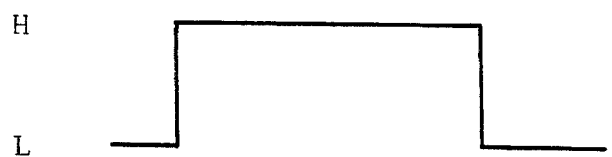
FIG. 38 is wave forms showing the measurement of the time length of pulse $T_1$ by saw-waves.
Figure 38B:
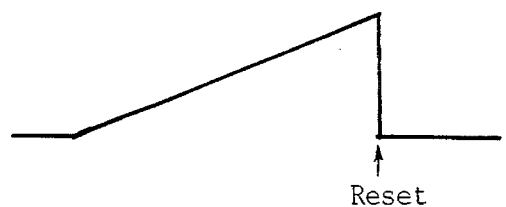
Figure 38C:
Figure 38D:
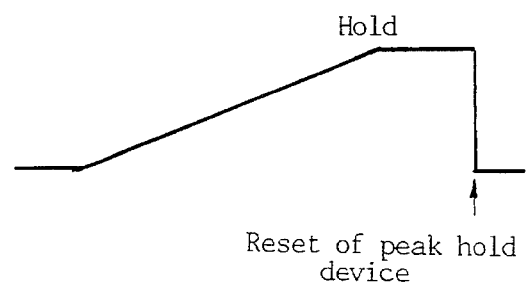

Since $T_1+T_2=T_o$, the measurement of $T_1$ or $T_2$ is enough to determine both $T_1$ and $T_2$. FIG. 33A has two sets of a saw-wave generator and a peak-hold circuit for measuring both $T_1$ and $T_2$. The difference ($T_1-T_2$) gives the angular speed $\Omega$ o. However, one set of a saw-wave generator and a peak-hold circuit is also satisfactory to determine the time difference ($T_1-T_1$). The saw-wave generator can be easily built up by resistors, capacitors and amplifiers. FIG. 38A demonstrates the wave forms at the zero-crossing detector, FIG. 38B output of the saw-wave generator, FIG. 38C input of the peak hold circuit and FIG. 38D the output of the peak hold circuit. Since this method belongs to analog measurements, this method is immune from the problem of the delay time between the rise of $T_1$ and the first clock pulse. However, in the case of weak resolution of voltage, it is preferable also for the analog method to repeat the same measurements several times and to sum or average the data for enhancing the precision.

Figure 34A:
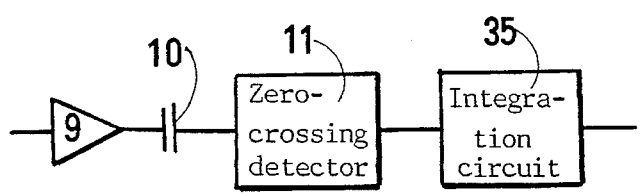
FIG. 34A shows a schematic view of an electric circuit and FIGS. 34B–34D show wave forms of the circuit which generates a constant high voltage in either of terms $T_1$ and $T_2$ and a constant low voltage in another term, and measures the time difference between $T_1$ and $T_2$ by integrating the two-value signal.
Figure 34B:
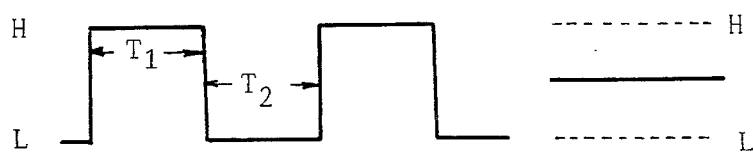
Figure 34C:
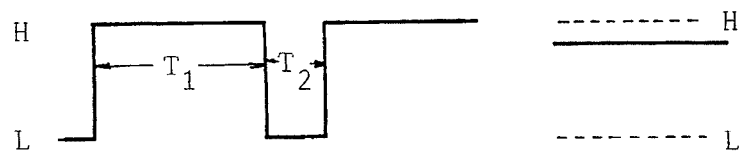
Figure 34D:
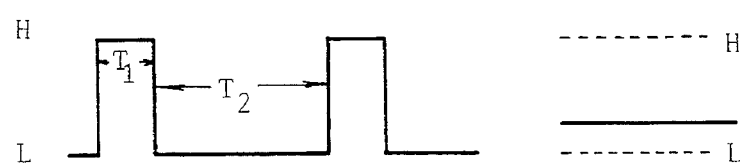
Figure 39A:
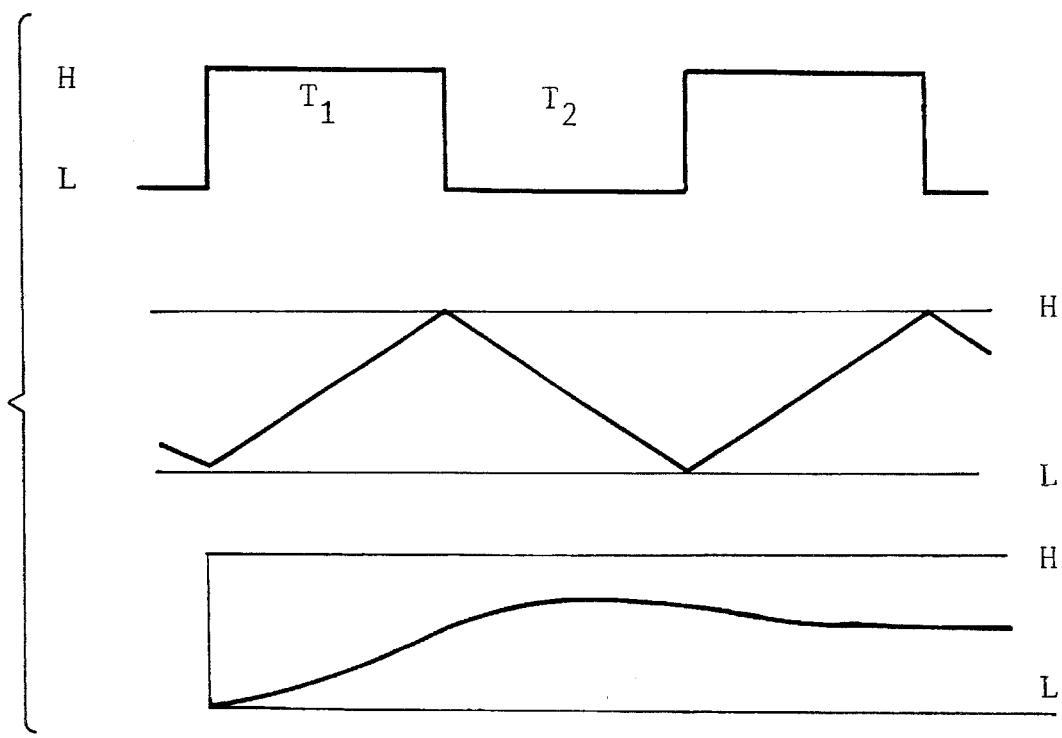
FIGS. 39A and 39B are wave forms of the AC output, an integration of the AC waves with a shorter time constant, another integration of the AC signal with a longer time constant at rest (a) and in rotation (b).
Figure 39B:
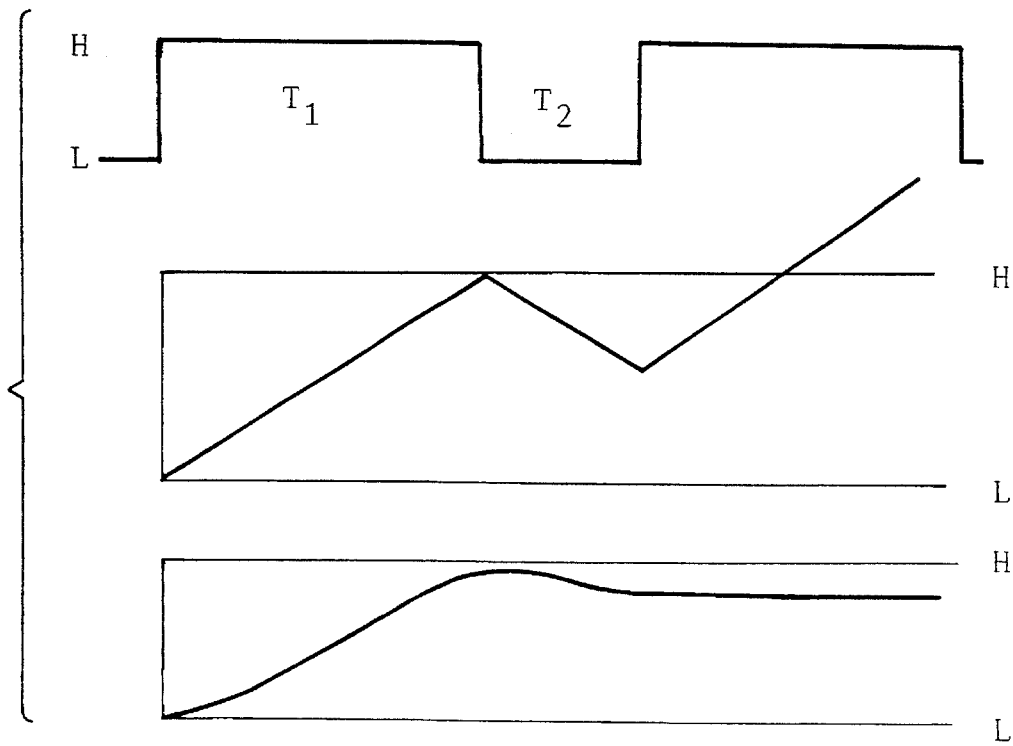

Another analog method is shown in FIG. 34A. The zero-crossing detector (11) originates the $T_1-T_2$ pulse wave which takes H-level in $T_1$ and L-level in $T_2$. An integrating circuit (35) integrates the output of the zero-crossing detector (11). FIGS. 39A and 39B show wave forms at rest or in rotation, respectively. In each the first line is the output pulse ($T_1-T_2$ pulse) wave of the zero-crossing detector. The second line is the integration of the $T_1-T_2$ pulse by a shorter time constant. The third line is the integration of the $T_1-T_2$ pulse by a longer time constant. The time constant is a standard of time length of the integration, i.e. the time of discharge. In an ordinary CR integration circuit, the product CR is the time constant. The integration differs according to the time constant.

At rest, the $T_1-R_2$ pulse wave has a 50% duty, i.e. $T_1:T_2=1:1$. The integration by a shorter time constant yields a saw-wave (or triangle wave) of the same frequency of the phase-modulation. The amplitude decreases in reverse proportion to the time constant. The integration by a longer time constant produces a short, transient rise and a stationary DC voltage which is in proportion to the duty of the $T_1-T_2$ pulse. For a 0% duty, the DC voltage is L-level. For a 100% duty, the final DC voltage is H-level. In general, the DC voltage Vd is equal to $V_d=D(H-L)+L$, where D is the duty ($0 \leq D \leq 1$), H is the H-level voltage and L is the L-level voltage.

When the fiber coil is rotating, the duty of the $T_1$-$T_2$ pulse wave differs from 50%. If $T_2<T_1$, in the integration by a shorter time constant, an irregular saw-wave is developing upward as shown in FIG. 39. The integration by a longer time constant gives the short, transient ascent, and a stable DC voltage $V_d=D(H-L)+L$. In practice the $T_1-T_2$ pulse generation continues at all times. The short transient part does not appear except the special moment of starting of motion with turning. The circuit employs a long time constant. The output of the integration circuit is substantially a DC voltage $V_d=D(H-L)+L$ as a function of the duty of the $T_1-T_2$ pulse. FIG. 34 teaches the relation between the $T_1-T_2$ pulse and the integrated DC voltage in three eases. ① when the fiber coil does not rotate, $T_1=T_1$. The integration is just half of H-level and L-level. ② when the fiber coil is rotating counterclockwise, $T_1>T_2$. The integration is higher than the middle. ③ When the fiber coil is rotating clockwise, $T_1<T_2$. The integration is lower than the middle.

In any ease, the integration takes a value between L-level and H-level. The value notifies the angular speed of the fiber coil. The middle value means that the fiber coil is at rest. The deviation from the middle value gives the absolute value of the rotation speed. The direction of rotation (or the sign of $\Delta\theta$) can be judged by the inequality of the integration to the middle value. The integration method also belongs to analog measurements which are immune from the difficulty of the fluctuation of the delay of the counting clock pulse. However, this method may incur a low accuracy, because all the scope of the angular velocity must be expressed by analog voltages between H-level and L-level. However, the preciseness of the analog method can be heightened by repeating thee same measurement a plenty of times, and summing the data or averaging the data in a sufficient time length.

Figure 40D:
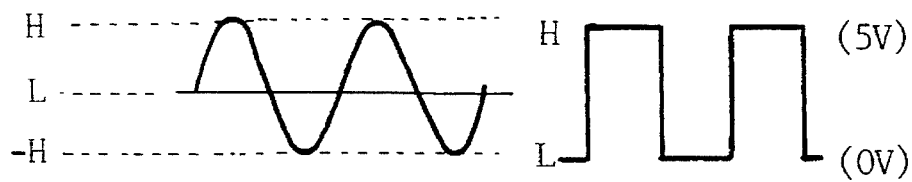
FIGS. 40B, 40C and 40D show waveforms associated with the circuit of FIG. 40A.
Figure 40A:
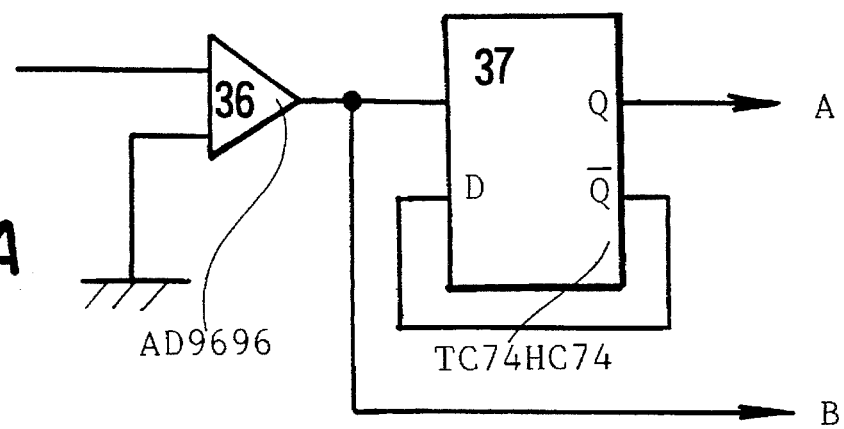
FIG. 40A is a figure of an example of a zero-crossing detector circuit.
Figure 40B:
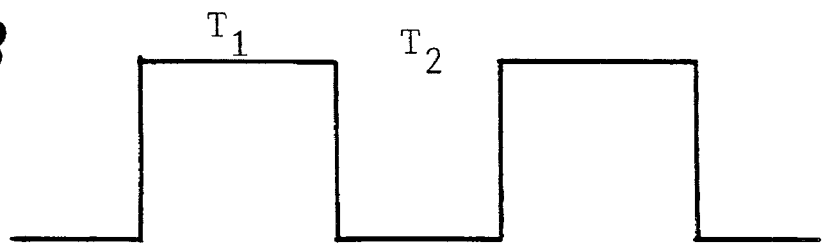
Figure 40C:
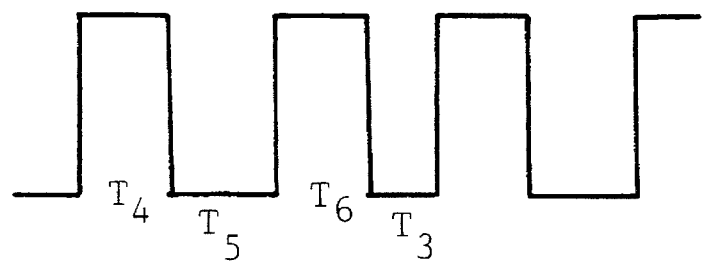

Various devices for measuring $T_1$ and $T_2$ have been explained hitherto. A zero-crossing detector will be demonstrated by referring to examples. FIG. 40A is an example of the zero-crossing detector which is constructed with a comparator (36) and a D-flip-flop (37). For instance, AD9696 is employed as the comparator (36). TC74HC74 is adopted as the D-flip-flop. Of course many other ICs on sale can be utilized as the comparator and the D-flip-flop. The input signal is akin to a sine wave. The comparator (36) converts the upper half to H-level and the lower half to L-level by amplifying the input wave with a very large amplification ratio. A rectangular wave (B) is formed. The D-flip-flop (37) has a D-input, a clock input, an output Q and an inverse output −Q. The inverse output −Q is connected to the D-input. The output (B) of the comparator (36) is introduced into the clock input of the D-flip-flop (37). Since a D-flip-flop transfers the D-input to the Q-output at the rise of the clock input, then Q-output produces a pulse wave which rises at the first rise of (B) and falls at the second rise of (B). Thus (B) is simply frequency-divided by half. The pulse waves (A) and (B) are shown at FIGS. 40B and 40C at FIG. 40(B) is the $T_1$–$T_2$ pulse. FIG. 40C is the original pulse wave. The zero-crossing detector makes both pulses shown in FIGS. 40B and 40C. FIG. 40B is used to determine the angular velocity. FIG. 40C is useful to adjust ξ. In short, a zero-crossing detector consists of a comparator and a ½ frequency divider. FIG. 40D shows an input signal and associated square wave representation for the circuit of FIG. 40A.

The comparator (36) reforms the quasi-sine wave into a rectangular, pulse wave which has twice as high frequency as the modulation frequency. The upper half waves are replaced by H-level. The lower half waves are replaced by L-level. Thus H-level of output (B) represents the upper half waves $T_4$ and $T_5$. L-level corresponds to $T_3$ and $T_5$. The upper half waves, i.e. H-levels, have the same length. The lower half waves, i.e. L-levels, have different lengths. Signal (B) is useful to monitor or control the phase-modulation coefficient.

The Q-input (A) of the D-flip-flop signifies $T_1$ by H-level and $T_2$ by L-level. The output (A) is the $T_1$–$T_2$ pulse which has already been defined and repeatedly referred to. FIG. 40 shows $T_1 = T_4 + T_5$ and $T_2 = T_5 + T_3$. This definition is slightly different from Eq. (39) and Eq. (40). The difference results from the difference of the definition of zero-crossing points. FIG. 40 defines the zero-crossing point where the AC input crosses the 0 level upward. On the contrary, Eq. (39) and Eq. (40) define the same point where the AC input crosses the 0 level downward. Both definitions are allowable.

Figure 41:
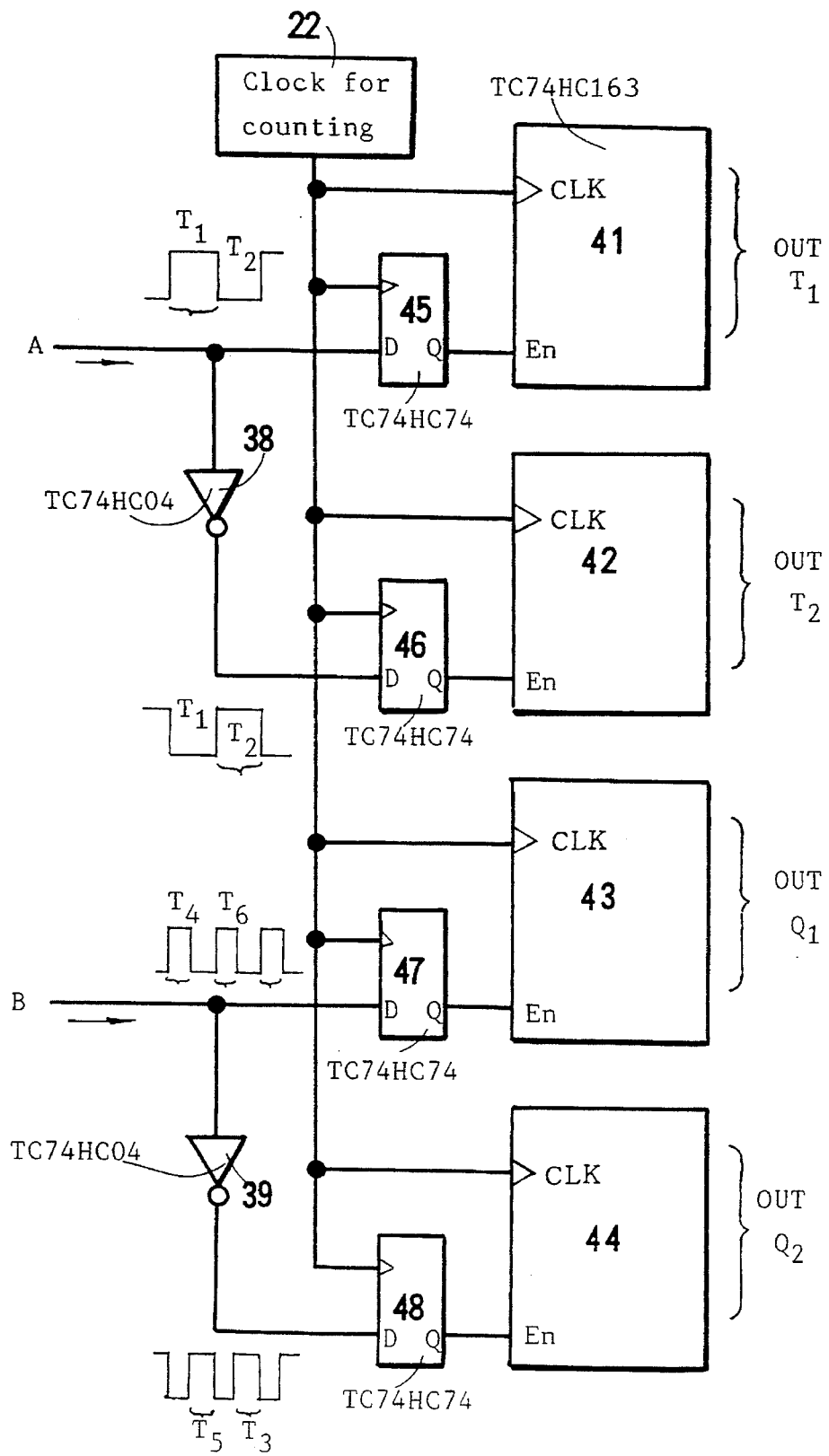
FIG. 41 is a figure of a counting circuit for $T_1$, $T_2$, $Q_1$ and $Q_2$.

FIG. 41 is a circuit of counter device. A counting clock (22) generates clock pulses for counting. The counting clock (22) is produced either by frequency-dividing the common fundamental clocks as shown in FIG. 30 or by frequency-dividing the independent fundamental clocks as shown in FIG. 31. The counting device treats with four signals A, −A, B and −B. "−" means an inverse. "−B" is an inverse of B. Inverters (38) and (39) make signal −A and signal −B from signal A and signal B. Four signals A, −A, B and −B are introduced into D-inputs of D-flip-flops (41), (42), (43) and (44). The counting clock pulses are led to clock-inputs of the same D-flip-flops. The counting clock (22) and signals A, −A, B and −B have no correlation in time. If two different kinds of signals were input in a counter IC, the lack of time correlation would cause instability Of the function of the counting IC. The D-flip-flops (45) to (48) are furnished to suppress the instability. The D-flip-flops synchronize the timing of the signals A, −A, B and −B with the counting clocks by connecting Q-inputs to En-inputs of counter Its (41), (42), (43) and (44). Thus the circuit of FIG. 30 dispenses with D-flip-flops, because the clock pulses are correlated to signals A, −A, B and −B by the common fundamental clock generation.

When the En-input (enable) is H-level, the counter circuit counts the number of clock pulses. The first counter (41) counts the number of clock pulses included in $T_1$. The inverter (38) makes −A from A. Q-input of D-flip-flop (46) takes H-level in $T_1$. Thus the second counter (42) counts the number of clock pules included in $T_2$.

Signal B is an output of the comparator. Signal B contains $T_4$ and $T_6$. The D-flip-flop (47) has a positive Q-output during $T_4$ and $T_6$. The counter counts the number of clock pulses included in $T_4$ and $T_6$. The output $Q_1$ signifies the time length $T_4+T_6$. The inverter (39) makes −B from B. Signal −B contains $T_3$ and $T_5$. The counter counts the number of clock pulses included in $T_3$ and $T_5$. The output $Q_2$ means $T_5+T_3$.

Figure 42:
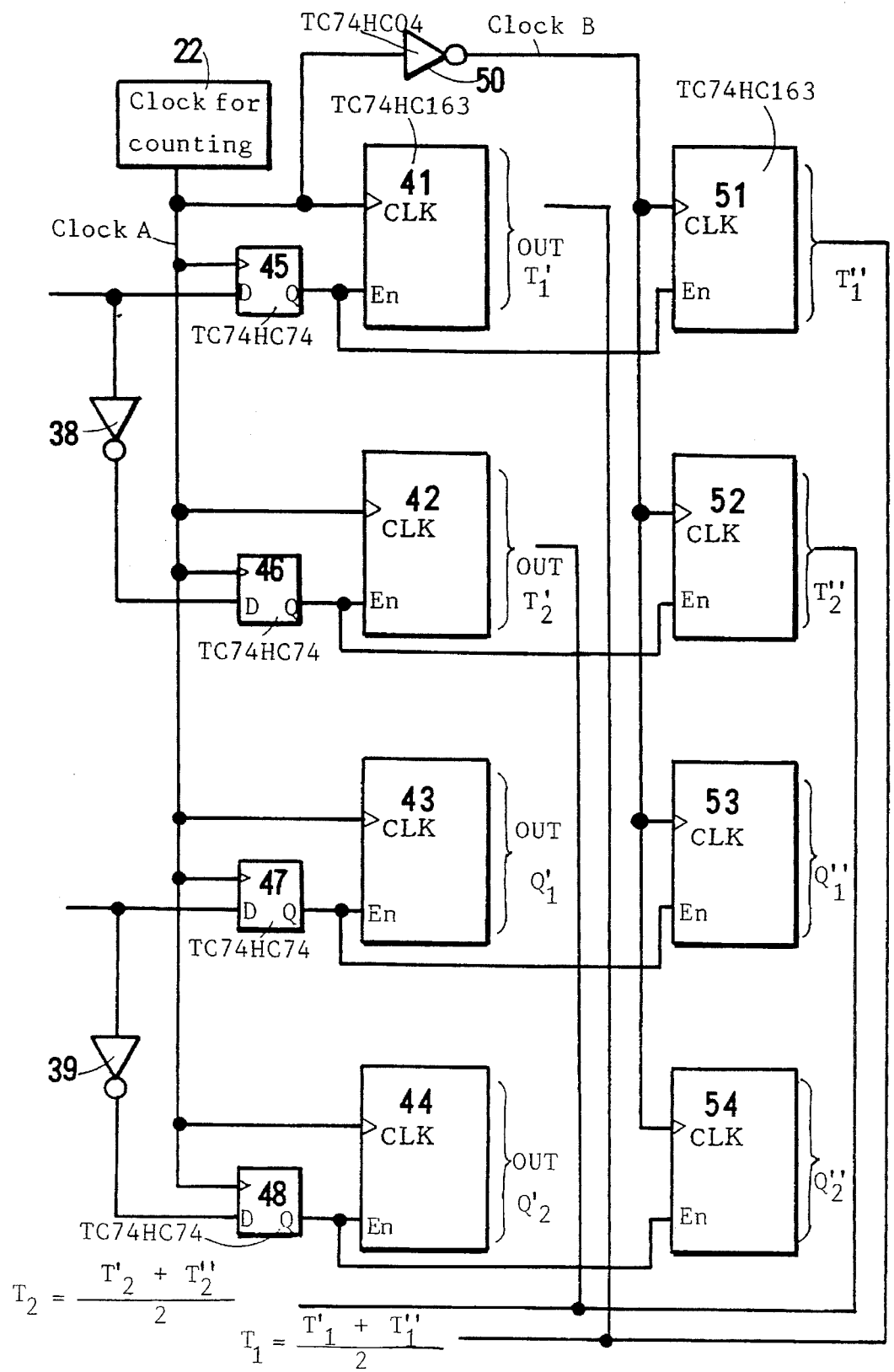
FIG. 42 is a figure of a circuit measuring $T_1$, $T_2$, $Q_1$ and $Q_2$ more precisely the pulse widths of $T_1$, $T_1$, $Q_1$ and $Q_2$ by two counting pluses with different phases and by taking an average of the counts.

FIG. 42 demonstrates another counting circuit for more precise measurement by making use of two clock pulses with different phases, as explained by FIG. 37. The counting clock (22) is now designated by clock A. Clock A is supplied to D-flip-flop (45), (46), (47) and (48) and counters (41), (42), (43) and (44). $T_1$ is the output of the counter (41). $T_1'$ means the number of pulses of clock A in $T_1$.

An inverter (50) inverts clock A into clock B. Clock B deviates from clock A by 180 degrees of phase. Clock B is introduced into clock-input of counters (51), (52), (53) and (54). En-inputs of the counters (51), (52), (53) and (54) are connected to the Q-input of the same D-flip-flops (41), (42), (43) and (44). The counter (51) counts the pulses of clock B included in $T_1$. The output is denoted by $T_1''$. Then $T_1$ is calculated by taking an average of $T_1'$ and $T_1''$. $T_1=(T_1'+T_1'')/2$. $T_2$, $Q_1$, and $Q_2$ are also determined by averaging two counts by clock A and clock B.

Figure 43:
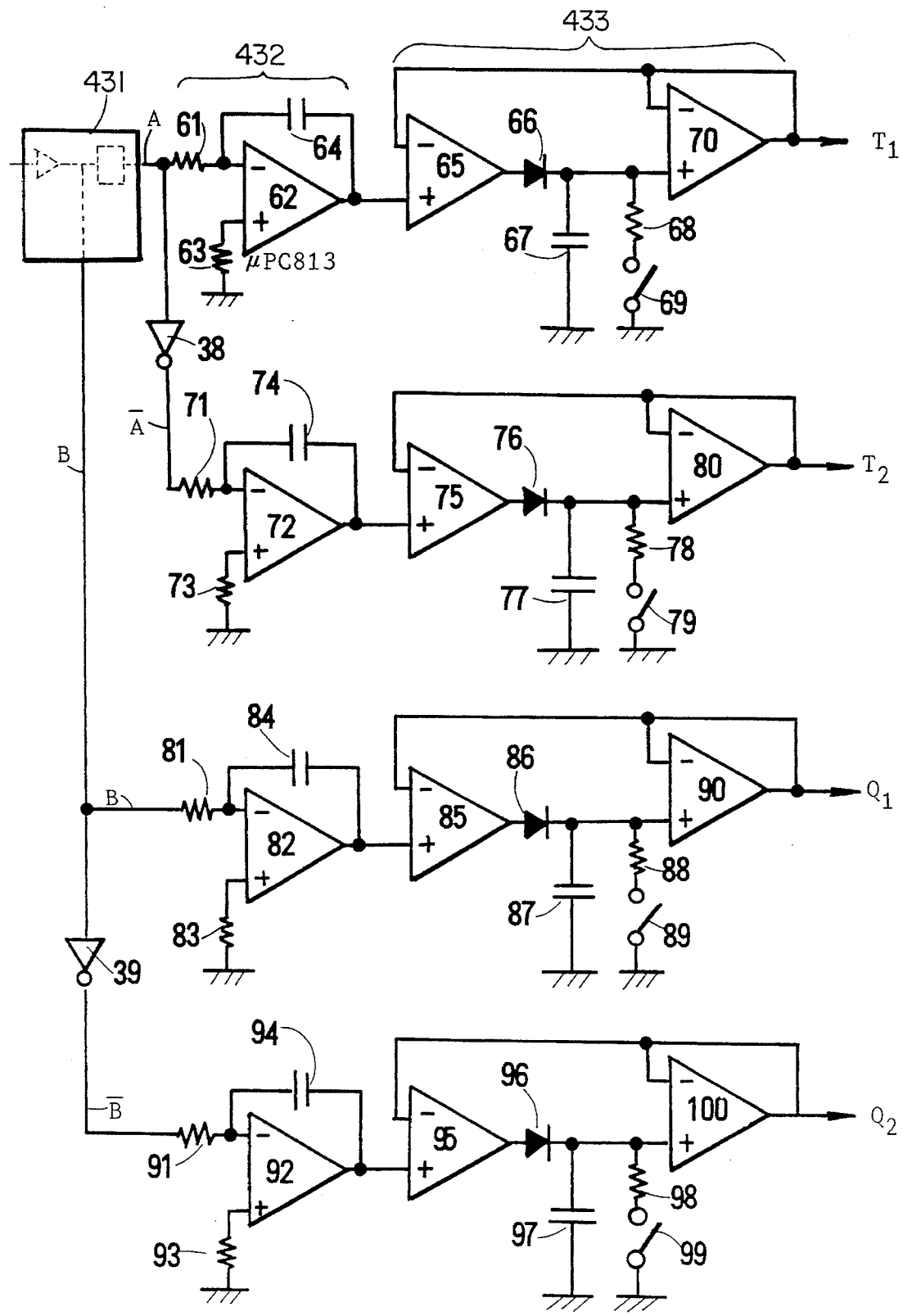
FIG. 43 is a figure of a measuring circuit of $T_1$, $T_2$, $Q_1$ and $Q_2$ by generating saw-waves which are rising in proportion to time.

FIG. 43 is an electric circuit for the saw-wave generating method. The zero-crossing detector 431 originates signal A and signal B Inverters (38) and (39) make signal −A and−B. Signal A is integrated by a saw-wave generator 432. The output of the saw-wave generator is led to a peak-hold circuit 433 (μPC814). The final voltage of the saw-wave is maintained by the peak-hold circuit. The voltage corresponds to $T_1$. Other signals −A, B and −B are treated by similar saw-wave generators and peak-hold circuits. FIG. 43 shows four equivalent sets of devices. The saw-wave generator is built by resistors (61) and (63), an amplifier (62), and a capacitor (64). A current through the resistor (61) and the capacitor (64) reduces the output voltage of the amplifier (62). The fall of the voltage is in proportion to time. The current is integrated by the circuit whose time constant is the product of the resistor and the capacitor. A ramp wave (saw-wave) is generated. The peak-hold circuit comprises amplifiers (65) and (70), a diode (66), a capacitor (67), a resistor (68) and a reset switch (69). Inversion inputs of the amp. (65) and (70) are connected to the output of the amp. (70). The saw-wave generator is led to a non-inversion input of the amp. (65). The output Of the amp. (65) is connected via the diode (66) to the non-inversion input of the amp.(70). The output of the amp. (65) is equal to the non-inversion input. The voltage is kept by the diode (66) and the capacitor (67) because of the high input impedance of the amp. (70). The same voltage appears at the output of the amp. (70). The voltage is maintained. The voltage is in proportion to $T_1$. The proportion constant is predetermined. Similar functions are done by other three sets of integration circuits and the peak-hold circuits. The outputs of the three are the voltages in proportion to $T_2$, $Q_1$ and $Q_2$. The output voltages of the peak-hold circuits are reset by discharging the capacitors by closing the reset switches.

Figure 44:
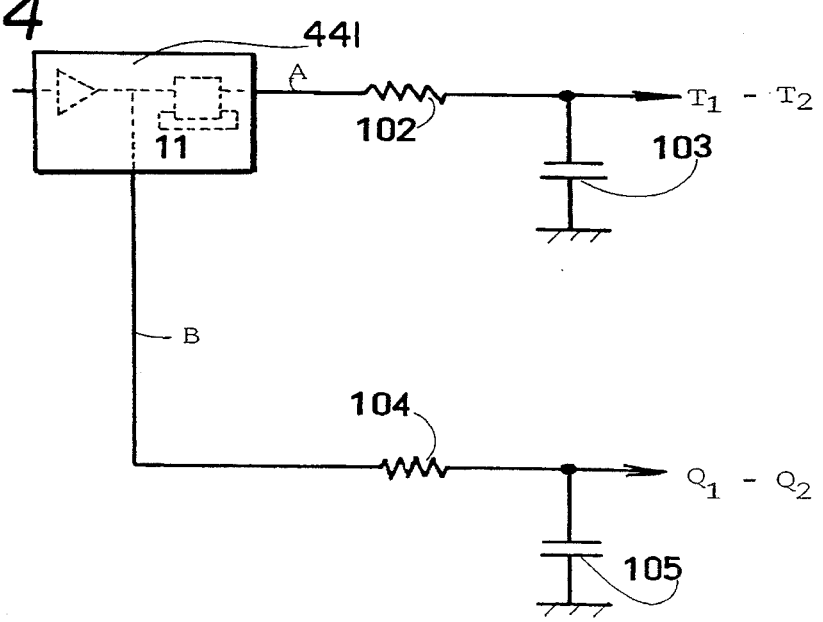
FIG. 44 is a figure of measuring the time difference between $T_1$ and $T_2$ or the time difference between $Q_1$ and $Q_2$ by integrating the output of the zero-crossing detector 441.

FIG. 44 shows another circuit which integrates signal A and signal B. The circuit corresponds to the integration circuit (35) in FIG. 34. Signal A (the $T_1$–$T_2$ pulse) is integrated by a resistor (102) and a capacitor (103). Signal B is integrated by a resistor (104) and a capacitor (105). As explained by FIG. 34 and FIG. 39, the voltage of the capacitor is in proportion to $(T_1-T_2)$. The voltage of the capacitor is in proportion to $(Q_1-Q_2)$.

This invention measures the time lengths of $T_1$ and $T_2$ pulses for determining Sagnac's phase difference instead of synchronous detection. This invention succeeds in stabilizing the scale factors which fluctuate in prior phase-modulation gyroscopes in spite of various improvements. Since this invention measures the time lengths between the points at which the AC signal crosses the 0 level, it is fully immune from the fluctuation of the light power or the gain of the circuit. This invention allows a gyroscope to measure an angular velocity with high stability and high preciseness.

What we claim is:

1. A method of deducing a signal from a phase-modulated Fiber-optic gyroscope comprising the steps of:
   propagating light waves clockwise and counterclockwise in a fiber coil;
   modulating the phase of the light waves in a sine function with a period of $T_O$ using a phase-modulator placed near an end of the fiber coil, the clockwise propagating waves and the counterclockwise propagating waves interfering with each other with Sagnac's phase difference $\Delta\theta$;
   transducing the intensity of the interfering light waves into an electric signal;
   extracting an AC component from the electric signal;
   detecting zero-crossing times twice a period $T_O$, the zero-crossing times being detecting when the AC component crosses 0 Volt in a certain direction;
   measuring a duration $T_1$ of a subwave from the first zero-crossing time to the second zero-crossing time, and another duration $T_2$ of another subwave from the second zero-crossing time to the first zero-crossing time of a next cycle; and
   calculating an angular velocity of the fiber coil based on the difference $(T_1-T_2)$ of the durations of two subwaves included in one period of modulation.

2. A method as claimed in claim 1, wherein a normalized difference $\{(T_1-T_2)/(T_1+T_2)\}$ between $T_1$ and $T_2$ gives Sagnac's phase difference $\Delta\theta$ according to the equation $$\Delta\theta=(\pi/2)\sin C\{(T_1-T_2)/(T_1+T_2)\}$$

where $C=\cos^{-1}55\ \xi^{-1}\cos^{-1}J_o(\xi)\}$, $\xi=2b\sin(nL\Omega/2c)$, $J_o(\xi)$ is the 0-th order Bessel function of $\xi$, $\xi$ is the phase-modulation coefficient, b is the amplitude of phase modulation, L is the length of the fiber coil, $\Omega$ is the modulation angular frequency, n is the refractive index of the fiber core, and c is the light velocity in vaccum.

3. A method as claimed in claim 1, wherein a normalized difference $\{(T_1-T_2)/(T_1+T_2)\}$ between $T_1$ and $T_2$ gives Sagnac's phase difference $\Delta\theta$ according to the equation $$\Delta\theta=(2^{-1}\pi)\{1-(\xi^{-1}\cos^{-1}J_o(\xi))^2\}^{1/2}\{(T_1-T_2)/(T_1+T_2)$$

where $\xi=2b\sin(nL\Omega/2c)$, $J_o(\xi)$ is the 0-th order Bessel function of $\xi$, $\xi$ is the phase-modulation coefficient, b is the amplitude of phase modulation, L is the length of the fiber coil, $\Omega$ is the modulation angular frequency, n is the refractive index of the fiber core, and c is the light velocity in vaccum.

4. A method as claimed in claim 3, wherein the normalized difference $\{(T_1-T_2)/(T_1+T_2)\}$ between $T_1$ and $T_2$ gives Sagnac's phase difference $\Delta\theta$ in the limit of $\xi\to 0$ according to the equation $$\Delta\theta=(2^{-3/2}\pi)\{(T_1-T_2)/(T_1+T_2)\}.$$

5. A method as claimed in claim 3, wherein the normalized difference $\{(T_1-T_2)/(T_1+T_2)\}$ between $T_1$ and $T_2$ gives Sagnac's phase difference $\Delta\theta$ in the limit of $\xi\to\infty$ according to the equation $$\Delta\theta=(2^{-1}\pi)\{(T_1-T_2)/(T_1+T_2)\}.$$

6. A method as claimed in claim 3, wherein the normalized difference $((T_1-T_2)/(T_1+T_2)\}$ between $T_1$ and $T_2$ gives Sagnac's phase difference $\Delta\theta$ for small $\xi$ according to the equation $$\Delta\theta=(2^{-3/2}\pi)\{1+(\xi/32)\}\{(T_1-T_2)/(T_1+T_2)\}.$$

7. A method as claimed in claim 1, wherein a scale factor S is defined as a quotient of a normalized difference $\{(T_1-T_2)/(T_1+T_2)\}$ divided by Sagnac's phase difference $\Delta\theta$, where the scale factor S is given by the equation $$S=\{(T_1-T_2)/(T_1+T_2)\}/\Delta\theta=(2/\pi)\text{cosec } C$$

where $C=\cos^{-1}\{\xi^{-1}J_o(\xi)\}$, $\xi=2b\sin(nL\Omega/2c)$, $J_o(\xi)$ is the 0-th order Bessel function of $\xi$, $\xi$ is the phase-modulation coefficient, b is the amplitude of phase modulation, L is the length of the fiber coil, $\Omega$ is the modulation angular frequency, n is the refractive index of the fiber core, and c is the light velocity in vaccum.

8. A method as claimed in claim 1, wherein the measurement of at least one of the time durations $T_1$ and $T_2$ is repeated many times to obtain a plurality of data the data being summed, and the angular velocity being calculated based on the summed data.

9. A method as claimed in claim 1, wherein clock pulses are generated for counting, and at least one of the durations $T_1$ and $T_2$ are measured by counting the number of counting pulses which are included in the duration being measured.

10. A method as claimed in claim 9, wherein the clock pulses for counting are produced from a common fundamental clock which makes a sine wave of the phase-modulation.

11. A method as claimed in claim 9, wherein the clock pulses are originated from an oscillator independent of the clock for the phase-modulation, the number of pulses included in the measured duration being counted multiple times to obtain a plurality of data, the data being summed, and the angular velocity being calculated from the summed data.

12. A method as claimed in claim 9, wherein two kinds of clock pulses having different phases are produced for counting, the number of pulses included in the measured duration being counted by each of the two kinds of clock pulses multiple times to obtain a plurality of data in terms of each kind of clock pulse, the data being summed independently with regard to th different kinds of clock pulses, the summed data corresponding to each kind of clock pulse being independently averaged, and the angular velocity being calculated based on an average of the independent averages of the summed data relative to each clock.

13. A method as claimed in claim 1, wherein saw-waves which increase in proportion to time are generated at the zero-crossing times of $T_1$ and $T_2$, peak voltages corresponding to $T_1$ and $T_2$ being measured at the next zero-crossing times, a difference between the peak voltages being produced, and the angular velocity being obtained based on the difference of the peak voltages., where the difference in peak voltages relates to the difference in durations $T_1$ and $T_2$.

14. A method as claimed in claim 1, wherein a saw-wave which increases in proportion to time is generated at the zero-crossing times of $T_1$ and $T_2$, a peak voltage corresponding to $T_1$ or $T_2$ is measured at the next zero-crossing times, the deviation of the peak voltage from a middle voltage is produced, and the angular velocity is obtained based on the deviation, the deviation in peak voltage relating to the difference in durations $T_1$ and $T_2$.

15. A method as claimed in claim 1, wherein a pulse signal is generated having a H-level voltage in $T_1$ and having a L-level voltage in $T_2$, the pulse signal is integrated by an integration circuit with a long time constant to produce a DC level voltage which is in proportion to $(T_1 - F_2)$, and the angular velocity is obtained based on the DC level voltage.

16. A method of detecting a modulation coefficient of a e-modulated fiber-optic gyroscope comprising the steps of:

propagating light waves clockwise and counterclockwise in a fiber coil;

modulating the phase of the light waves in a sine function with a period $T_O$ using a phase-modulator placed near an end of th fiber coil, the clockwise propagating waves and the counterclockwise propagating waves interfering with each other with Sagnac's phase difference $\Delta\theta$.

transducing the intensity of the interfering light waves into an electric signal;

extracting an AC component from the electric signal;

detecting four zero-crossing times in a period $T_O$ at which the AC component crosses 0 volt downward and upward;

measuring a duration $T_3$ of a first lower half wave, a duration $T_4$ of a s upper half wave, a duration $T_5$ of a third lower half wave d a duration $T_6$ of a fourth upper half wave, each duration be measured based on the detecting zero-crossing times;

summing the duration of upper half waves $Q_1 = T_4 + T_5$;

summing the durations of lower half waves $Q_2 = T_3 + T_5$;

determining a different between $Q_1$ and $Q_2$;

detecting a strength of the phase-modulation coefficient $\xi$ based on the difference between $Q_1$ and $Q_2$; and adjusting the voltage of the phase-modulation in order to return the phase-modulation coefficient to a predetermined value.

17. A method as claimed in claim 16, wherein a normalized difference is determined based on the phase-modulation coefficient $\xi$ in accordance with the equation $$(Q_2-Q_1)/(Q_1+Q_2)=4\pi^{-1}[\cos^1\{\xi^1\cos^{-1}J_c(\xi)\}-\pi/4],$$

where $\xi = 2b\sin(nL\Omega/2c)$, $J_o(\xi)$ is the 0-th order Bessel function of $\xi$, $\xi$ is the phase-modulation coefficient, b is the amplitude of phase modulation, L is the length of the fiber coil, $\Omega$ is the modulation angular frequency, n is the refractive index of the fiber core, and c is the light velocity in vaccum.

18. A method as claimed in claim 16, wherein a normalized difference is estimated according to the approximate equation $(Q_2-Q_1)/(Q_1+Q_2)=\xi^2/24\pi$ for small $\xi$, where $\xi$ is the phase-modulation coefficient.

19. A method as claimed in claim 16, wherein clock pulses which are generated for counting and the durations of $Q_1$ and $Q_2$ are measured by counting the number of counting pulses which are included in $Q_1$ and $Q_2$.

* * * * *